United States Patent [19]

Duisberg

[11] Patent Number: 4,821,220
[45] Date of Patent: Apr. 11, 1989

[54] SYSTEM FOR ANIMATING PROGRAM OPERATION AND DISPLAYING TIME-BASED RELATIONSHIPS

[75] Inventor: Robert A. Duisberg, Seattle, Wash.
[73] Assignee: Tektronix, Inc., Beaverton, Oreg.
[21] Appl. No.: 891,071
[22] Filed: Jul. 25, 1986
[51] Int. Cl.⁴ .................... G06F 3/153; G06F 15/40
[52] U.S. Cl. .................................. 364/578; 364/491
[58] Field of Search ............... 364/480, 488, 489, 490, 364/491, 578, 200, 300, 900

[56] References Cited

U.S. PATENT DOCUMENTS 4,604,718  8/1986  Norman et al. ...................... 364/578
4,635,208  1/1987  Coleby et al. ........................ 364/491
4,656,603  4/1987  Dunn .............................. 364/488 X Primary Examiner—Felix D. Gruber
Attorney, Agent, or Firm—John P. Dellett; Robert S. Hulse

[57] ABSTRACT

In a computerized simulation system, the behavior of a model comprising a group of interrelated objects in an object oriented programming environment is defined by a constraint network including temporal constraints, which the future behavior of the model must satisfy following triggering events. Following a triggering event, time stamped representations of messages are created and stored in a queue. The value of a time variable representing time is progressively incremented and the message indicated by each enqueued representation is sent to the model as the value of the time variable surpasses the value of the time stamp of the representation. The message representations and the value of their time stamps are created according to the requirements of the constraint network such that the messages cause the model to perform the appropriate actions at the appropriate times in order to satisfy the temporal constraints defined by the constraint network.

16 Claims, 11 Drawing Sheets

SYSTEM FOR ANIMATING PROGRAM OPERATION AND DISPLAYING TIME-BASED RELATIONSHIPS

BACKGROUND OF THE INVENTION

This invention relates in general to computer-based simulation systems and in particular to a system employing constraint satisfaction for temporizing a simulation.

Computer programs have long been used for simulating the behavior of a "real world" apparatus or process and an "animation" is a simulation which includes a graphical display representing the behavior of the apparatus or process. A computer simulation of a bouncing ball might include an algorithm for computing data representing the vertical position of the ball as a function of time. The data may then be used in a display.

In addition to simulating real world appearance of things, animation is a powerful means for representing the inner workings of a process which in itself does not have a visual aspect. For example, data structures are often represented by two dimensional diagrams because they are most easily apprehended in spatial, visual form rather than as a textual description or bits in a memory bank. By extension, understanding obscure algorithms operating on data structures could be assisted through simulation of dynamic motion in such diagrams and images.

Much of the appeal of animation is in being able to simulate the behavior of an experimental design to "see how it works." For instance, if an algorithm sorts bars by length, it is helpful to see the bars move about as they are sorted. However, this appeal is diminished if an animation is laborious to construct.

Experience has shown that about 80% of the code in computer-based animation merely implements animation graphics, even in an object oriented computer language like Smalltalk-80 (hereinafter referred to as "Smalltalk") which offers a high level graphics interface. ("Smalltalk-80" is a registered trademark of the Xerox Corporation and the Smalltalk computer language is described in the book *SMALLTALK-80 The Language and Its Implementation*, by Adele Goldberg and David Robson, published in 1983.

Animation difficulties are further magnified if one insists an animation must be more than pictures on a screen, and that the pictures should create the illusion of things they represent for allowing a user to interact with them. For example, an animated spring desirably acts like a real one in that a user should be able to "push" it or "pull" it and observe the response. This means the animation must be designed as a fully interactive interface and the user should be able to gain access to the code which drives the animation.

The requirements outlined above suggest the components for assembling an animation should be self-contained objects simulating "things" they represent. The internal state of each object should be self-consistent, in keeping with the real-world laws governing the item being simulated, and the picture of the object should change state consistently, according to the rules of some representational scheme. One may think of an animation as the creation of an image whose state is "constrained" to bear some specified relation to the state of an object simulating a "thing".

This need for consistency of state and representation makes the use of a constraint language desirable to implement animation. Constraint languages allow the programmer to declare relations that a system of objects must satisfy; it is the job of constraint satisfaction algorithms to automatically find a way to satisfy those relationships. The declarative character is attractive since it tends to reduce the creation of an animation to the writing of an executable specification, which one may expect to be simpler than writing out detailed graphics instructions in an imperative language.

One existing constraint oriented computer programming system, "ThingLab", is described in "ThingLab—A Constraint-Oriented Simulation Laboratory", by A. H. Borning, published July, 1979 by Xerox Corporation, in *Xerox Palo Alto Research Center Report SSL-79-3*, and in an article entitled "The Programming Language Aspects of ThingLab, A Constraint-Oriented Simulation Laboratory", also by A. H. Borning, published in *ACM Transactions on Programming Languages and Systems*, October, 1981. Constraints in ThingLab are implemented as objects that represent some relation as a predicate and contain a variety of methods as code fragments which can be used to establish the relation under different circumstances, depending on what is known. For example, a constraint predicate that $a=b+c$ would contain the expressions $a \leftarrow b+c$, $b \leftarrow a-c$ and $c \leftarrow a-b$, any one of which may be used to satisfy the constraint. But depending upon what values are known or have just been changed, only one expression may be appropriate. The goal of constraint satisfaction techniques is to choose and order appropriate methods so that relations throughout a network of constraints are reestablished following a change.

The act of programming in a constraint oriented system consists of specifying, preferably in a graphical way, the interconnections among objects containing code fragments embodying the functionality of the part. The job of the constraint system then is to sort out and order those code fragments so that the composite shows the desired behavior of a coherent whole. One of the most attractive features of constraint languages is that they are fundamentally descriptive as opposed to imperative. The drudgery of hand-coding animations is in having to give explicitly imperative commands for everything that is to happen and appear on the screen. It is easier to merely describe in general terms how things should appear and let the system generate the code that would make it so.

The animated, dynamic responses of a system like ThingLab are user driven in response only to a command to "satisfy all constraints with these values now". Constraints in ThingLab are "static" rather than "temporal" in that they are satisfied in the same way for all time and are independent of time. There can be no history-dependent specifications because there is no history.

SUMMARY OF THE INVENTION

According to the present invention, a constraint system models time in order to provide meaningful and realistic animation. Time requires special treatment and cannot simply be inserted as another variable in a constraint relation. Static constraints have the property of satisfying themselves in multiple directions depending on computational circumstances. If time were treated as a static constraint, time could be set forward or backward erratically because of changes occurring to values dependent on time, unless time were given special treatment to insure its steady monotonic advance. Also there is a disjunction between the inherently discrete frameby-frame, time-slice character of computation, and the kinds of continuum statements one would like to make in describing rates of change, e.g. V=dx/dt. One must consider how to provide a system to construct discrete approximations of continuous processes, and how to treat any errors in these approximations.

According to one aspect of the invention, a group of interactive elements is simulated by utilizing a model embodied within an object oriented computer programming system and the temporal behavior of the model is controlled by a further time management object. The time management object is adapted to execute a procedure for incrementing a simulation "time" by adjusting the value of a variable representing time, and maintains an "event queue" for storing events, wherein an event comprises a representation of a message and a "time stamp" indicating a time at which the message is to be sent to the model. The time management object is further adapted to transmit any message represented by an event in the event queue to the model when time represented by the time variable surpasses the time indicated by the time stamp associated with the message. Each such message sent to the model causes the model to carry out some procedure.

The model is made to respond to a triggering message in a temporal fashion by storing one or more events in the event queue in response to the triggering message. Each event stored in the event queue includes a time stamp indicating a future time at which a response message is to be sent to effect a particular response. As the time management object increments the time variable, the response messages described by the enqueued events are sent in the order that the events are time stamped. Thus the model can carry out an action or a sequence of actions in the future in response to a current triggering event.

According to another aspect of the present invention, the behavior of the model is described according to a set of temporal constraints on the future behavior of the model (e.g., on the assignment of values to variables it controls) which are invoked in response to a triggering message. When a triggering message is sent to the model for which no procedure has been compiled for satisfying temporal constraints, a response procedure is compiled for execution by the time management object which causes one or more events to be stored in the event queue. Each of these events includes a time stamp indicating a future time and a representation of a temporal constraint satisfaction message to the model for causing the model to satisfy the requirements of the temporal constraints triggered by the triggering message.

Thereafter, as the time management object increments the simulation time, it transmits to the model a message described by an event in the event queue whenever the simulation time surpasses the time indicated by the time stamp of the event, thereby causing the model to carry out an action in satisfaction of its temporal constraints.

Thus the present invention not only temporizes the behavior of the model by providing the time management object for controlling the actions of the model to be performed at a specified future time, it also automatically determines what those actions will be in order to satisfy a set of temporal constraints on the behavior of the model.

It is accordingly an object of the present invention to provide a method for controlling the behavior of a model embodied in an object oriented computer programming system such that the model operates in satisfaction of a set of one or more temporal constraints.

The subject matter of the present invention is particularly pointed out and distinctly claimed in the concluding portion of this specification. However, both the organization and method of operation of the invention, together with further advantages and objects thereof, will best be understood by reference to the following description taken in connection with accompanying drawings.

DETAILED DESCRIPTION

Figure 1:
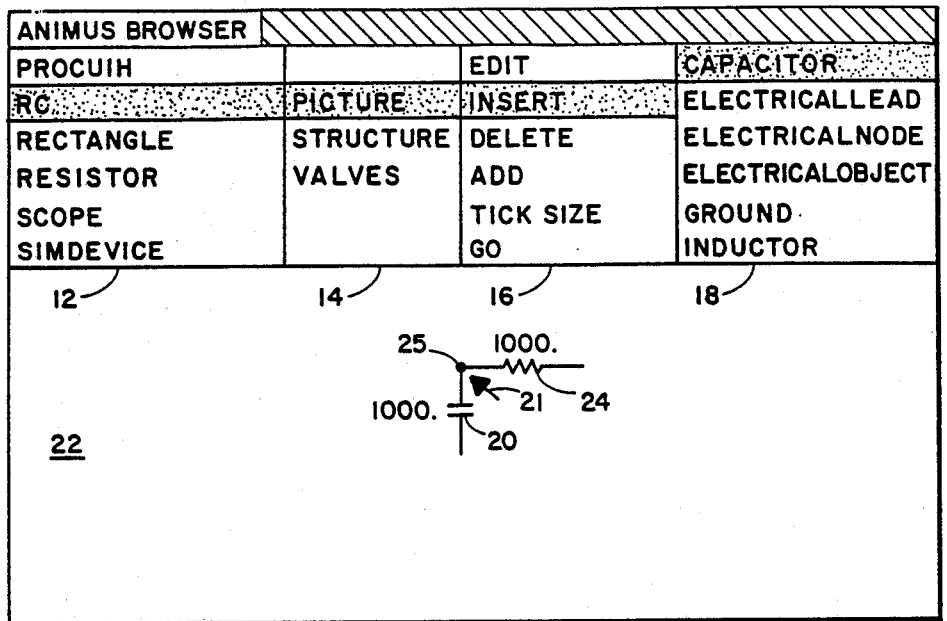
FIGS. 1–17 depict displays on a computer graphics terminal illustrating the operation of the present invention.

The preferred embodiment of the present invention is implemented as an improvement to the ThingLab constraint satisfaction programming system, which in turn is based on the Smalltalk programming language. Accordingly, the basic principles of Smalltalk and ThingLab will be briefly discussed in order to provide a foundation for the detailed description of the present invention. Smalltalk is an object oriented computer programming language wherein computer software is organized into "objects" each comprising a block of program instructions describing various computer operations ("methods") to be performed in response to "messages" sent to the object. Such operations include, for example, the manipulation of variables and the transmission of messages to other objects. The "state" of an object is defined in terms of the values of variables that it controls and the methods associated with each object define its "behavior" in response to the messages it receives. Thus one may "program" in the Smalltalk language by writing individual blocks of code each of which defines (or creates) an object.

The Smalltalk programming language can be used to facilitate the modeling of interactive systems in that each component of the system can be modeled with an object, the behavior of each component being simulated by the methods of the corresponding object and the interactions between components being simulated by the messages transmitted between objects. A user may also communicate with an object through its image on a computer terminal screen, utilizing a mouse to control a cursor on the screen to point to the object and buttons on the mouse or a keyboard to transmit messages to the object. An object may also provide information to the user through its image on the screen, using data readouts or graphical changes to the object image. Although the object oriented environment of Smalltalk makes simulation development more intuitive, Smalltalk programming may be considered as relatively difficult to learn.

ThingLab is a "higher level" programming language based on Smalltalk wherein a user may specify the behavior of a system of interrelated objects by indicating "constraints" that the state of each object must satisfy, rather than by directly encoding the methods which define or control each object's behavior. Once the constraints are specified, ThingLab generates the necessary code for methods which cause the network to satisfy the constraints. In ThingLab, a constraint is itself implemented as an object "owned" by an object being constrained, the constraint object comprising a set of code fragments which can be used to establish various methods for satisfying the constraint. For example, an object might be required to control the values of three variables (a, b, and c) such that a=b+c. Accordingly, the associated constraint object would contain the expressions a←b+c, b←a−c, and c←a−b, any one of which may be used to satisfy the constraint. But depending upon which values are known or have just been changed, only one of the three methods for satisfying the constraint may be appropriate.

When a system of interrelated objects is specified in terms of a network of constraints, a change in state of any one object may trigger changes in the states of other objects in order to satisfy the constraint network. ThingLab chooses and orders appropriate methods for each object so that relations throughout the network of constraints are reestablished after a change to the constraint network.

In ThingLab, the state of such a system of objects changes only when a constraint is changed or when the value of a variable is changed by some stimulus event. However, an object cannot be "constrained"to behave in a temporal fashion by changing state at some future time in response to some event which happens now, but rather can only be constrained to fully respond "now" to an event that happens now. Therefore ThingLab is not suitable, for example, for modeling an RC network since the behavior of a capacitor in such a network is necessarily temporal. When a voltage across a capacitor changes abruptly, the current through the capacitor changes not abruptly but smoothly over time according to the constraint relation that I=C*dV/dt.

In accordance with the preferred embodiment of the present invention ThingLab is utilized as the basis of a programming system, hereinafter referred to as "Animus". A Smalltalk listing implementing Animus within the ThingLab environment is included as Appendix I to this application. Like ThingLab, Animus permits a user to describe systems of Smalltalk objects according to the static constraints that they must satisfy, but in addition thereto Animus also permits systems to be described in terms of "temporal constraints" wherein objects are constrained to carry out one or more actions in the future in response to a stimulus event occurring in the present.

The Animus system is well suited to creating animated simulations of physical systems. Continuous physical processes may be described by differential equations, as for example the equations of motion for a mechanical system. Animus provides the Smalltalk class TimeDifferentialConstraint which allows the user to specify such differential equations as constraints on the system's behavior. (Standard Smalltalk typographical conventions are used throughout this application. Class names are capitalized and may be shown in bold face while instance variable names begin in lower case.) The mechanism contained in TimeDifferentialConstraint satisfies a constraint by automatically generating and executing a finite difference approximation to the behavior specified. Thus, for example, in the definition of a class MechanicalNode one may find the constraint that v=dx/dt. That is, the prototypical instance of MechanicalNode has an instance variable representing a position whose value is constrained, as time advances, to be derived from the value of the instance variable for velocity. These constraints are "simple" because the response to satisfy them consists of a single event to adjust the object's state in the next instant, as contrasted with a more complex animation response such as sending an icon out on a trajectory of many step-wise time sequenced moves.

Typical Operation

There will first be described a number of examples of how the present invention might be used, followed by a more in-depth discussion of implementation. Suppose we wished to demonstrate or investigate the behavior of a capacitor discharging through a resistor. Referring to FIG. 1, showing an "Animus Browser window" 10 displayed on the screen of a computer terminal, we would begin by defining a new prototype class, selecting "define new thing" from a menu that pops up with a mouse button click in a first pane 12 of window 10. A dialog window then appears and asks for the name of the new prototype class, to which we respond by using a keyboard to type in "RC". The line "RC" will then appear in the first pane 12 as part of a list of prototypes. We select "RC" using the mouse and begin to build a prototypical RC network by selecting picture" in a second pane 14 listing formats, and "insert" in a third pane 16 listing operations. Operations of this general type are common to ThingLab.

Prototype constraint classes for electronic components are advantageously provided in a "kit" of such classes provided within Animus and includes such things as capacitors, inductors, oscilloscopes, and signal generators, with time dependent behavior built in.

A resistor prototype kit component, for example, includes the necessary Smalltalk code for controlling the display of a representation of a resistor on the screen as well as code for maintaining variables describing the state of the resistor (such as its resistance, terminal voltages and current through the resistor) and code describing the behavior of a resistor in terms of constraints its variables must satisfy (e.g. Ohm's law). The Ohm's law constraint (V=IR) describing the behavior of a resistor is "non-temporal" in that it does not involve time: a resistor fully responds to a change in one variable such as terminal voltage) by instantaneously changing one or more other variables (such as current or another terminal voltage) in order that the constraint is satisfied. The prior art ThingLab system includes kit components such as resistors which have non-temporal constraints.

On the other hand, constraints defining a capacitor have a temporal aspect because a capacitor behaves in a temporal fashion. The relationships between voltage, current, and charge variables which describe the state of a capacitor are modeled by differential equations involving time and therefore a change in any of these variables must cause a time dependent change in one or more of the other variables in order to satisfy the constraints which define the behavior of the capacitor. Thus, in addition to the necessary Smalltalk code for controlling the display of a representation of a capacitor on the screen, for maintaining variables describing the state of the capacitor and for describing non-temporal constraints on the behavior of a kit component as provided for in the prior art ThingLab system, a prototype kit component such as a capacitor desirably also includes code describing the temporal constraints on the behavior of the capacitor. This additional code, beyond what is presently included in ThingLab kit components, is embodied by the Animus system of the present invention by an instance of a TimeDifferentialConstraint class (described in detail hereinbelow) which forms an additional part of each kit component representing an object exhibiting temporal behavior.

To construct an RC network from such kit components, we select the object "Capacitor" from a kit of previously constructed prototypes in fourth pane 18. A flashing image of a capacitor 20 will follow a cursor 21 in a display area 22 of window 10 and allow us to locate the capacitor image 20 wherever desired in area 22 by moving the cursor and clicking a mouse button. We then insert a resistor 24 into display area 22 in a similar fashion by selecting "Resistor" from pane 18. (The lists in panes 12, 16, and 18 are scrollable and only a portion of each list is displayed.) The endpoints of each lead of resistor 24 are considered "sticky" and one will "merge" with a capacitor lead to form a circuit node 25 when brought close to the capacitor lead.

Figure 2:
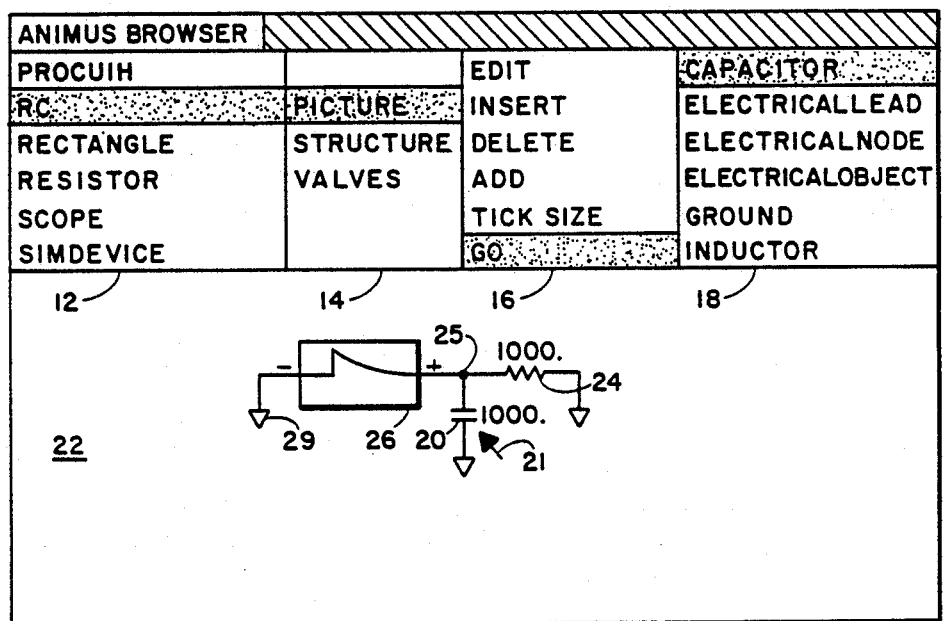

FIG. 2 shows a latter stage in the construction of the RC prototype. Once the RC prototype has been assembled, it may be desirable to probe it with an oscilloscope 26 (another prototype object available in the kit) inserted into the RC prototype to view the voltage between a circuit node 25 and ground 29. The "beam" of the oscilloscope 26 is constrained so that its vertical displacement is proportional to the voltage difference between its leads, and so that its horizontal displacement tracks the value of time.

To start the animation going, we simply select "go" in the third pane 16 in order to send messages to advance a "clock", an object in Animus which maintains a global variable called "time". The capacitor prototype 20, as the charge is discharged through resistor 24, constrains the current through it to equal the change in its charge with respect to time ($i=dq/dt$) which is provided with an initial condition charge (which may be adjusted by the user as discussed hereinbelow). When the clock is sent a message to increment time, constraint satisfaction requires that time may only be advanced in consideration of the constraint that $i=dq/dt$ in the capacitor. When a time incrementing message is sent, Animus compiles a new method to respond to this message which, in addition to incrementing time, enqueues an "event" in an "event queue" (discussed in detail hereinbelow). An event is a description of a message to be sent upon the next increment of time ("tick" of the clock) to adjust the charge on the capacitor 20. This change to the charge in turn triggers other constraints which define the behavior of the RC network. Animus plans and compiles the necessary methods to implement this behavior based on the constraints triggered. These include methods to change the voltage on the capacitor ($V=q/C$), to change text displayed adjacent to the capacitor which indicates the charge on the capacitor 20, to move the beam on the oscilloscope 26, and to change the current through the resistor 24, along with text adjacent to the resistor indicating the resistor current. This planning and compilation phase takes about 30 seconds for the circuit of FIG. 2. After the methods are once compiled they may be executed without recompilation thereafter, and once the animation begins to run, clock ticks come with a satisfying swiftness and the motion of the oscilloscope beam attains a reasonable degree of smoothness. The resulting exponential decay seen on the oscilloscope 26 is not the result of any analytical calculation of exponentials, but occurs naturally as a result of finite-difference approximations embodied in the methods generated by the system to satisfy a specified TimeDifferentialConstraint associated with each time dependent element of the RC network.

Figure 3:
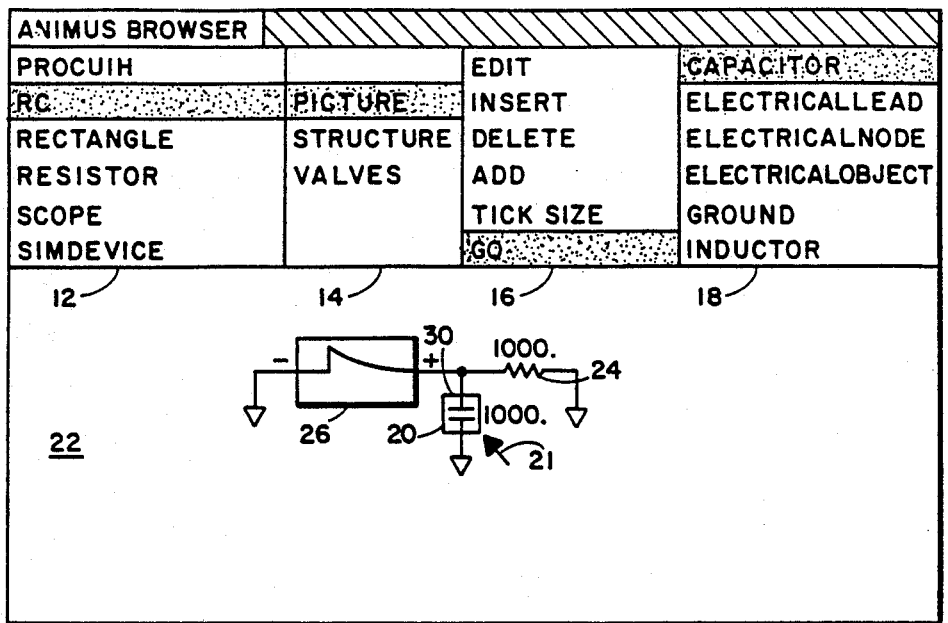
Figure 4:
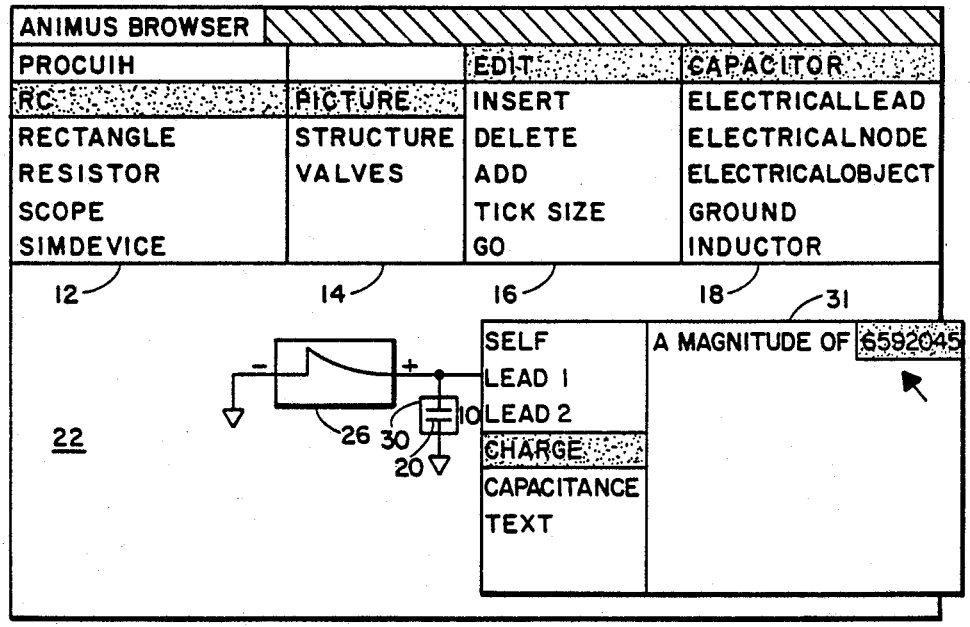

The capacitor 20 is suitably provided in the "kit" with an initial charge. To reinitialize the charge, the user can edit the capacitor directly and simply assign a new value to the charge, whereupon the animation may proceed. To perform the edit we select "edit" in the third pane 16, and in the fourth pane 18 we select the kind of object we want to edit, in this case "Capacitor." We then obtain a cursor moveable flashing image of a capacitor in area 22 that will "stick" to any capacitor we select. Animus shows us the selection by displaying a box 30 around the selected element, as illustrated in FIG. 3. Clicking a mouse button on the selection now brings up a standard Smalltalk Inspector window 31 as shown in FIG. 4 in which values of the instance variables of the selection may be examined and edited. We select the text for the magnitude of the charge by selecting "charge" in window 31, edit it, accept it, and close the window. We may then resume the RC system operation by selecting "go" in third pane 16.

The new initial charge on the capacitor changes the initial voltage across the capacitor so that the exponential decay of that voltage, viewed by the oscilloscope 26 as capacitor 20 discharges through resistor 24 following the "go" command, begins at a voltage level which may be higher or lower than the previous initial charge. The implementation of this software to bring about these results is hereinafter more fully described.

Figure 5:
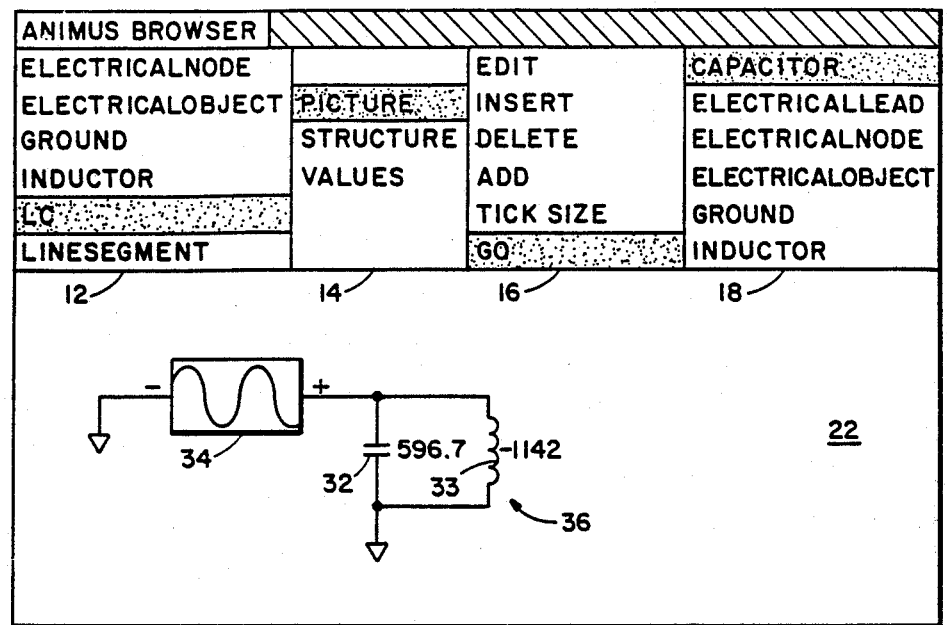

As another example, referring to FIG. 5, we may build an electrical oscillator by selecting from the "kit" an inductor 33 and connecting it with a capacitor 32 and an oscilloscope 34 to build an LC circuit 36 in window 10. The "gain" and "sweep" of the scope 34 may be adjusted by editing the instance variables for the scope in the same way that the capacitor's initial charge was changed. Numbers printed beside the components are suitably constrained with each "tick" (i.e., increment of time) to indicate the charge on the capacitor 32 and the current through the inductor 33 in arbitrary units. The inductor 33 behavior is described by a TimeDifferentialConstraint indicating that $V=L*di/dt$, where "L" is inductance, "V" is the voltage across the inductor and "i" is the current through the inductor. When the LC circuit 36 is built and told to "go", temporal constraints for both the capacitor and the inductor must be satisfied. The method to increment time now enqueues two events, one describing a message to adjust the charge on the capacitor 32 and another describing a message to adjust the current in the inductor 33. These messages trigger other constraints so that a reasonable set of finite difference functions are effectively generated. After the LC circuit 36 has operated for many time increments, the oscilloscope 34 shows that the voltage across capacitor 32 varies in a smooth sinusoid.

Figure 6:
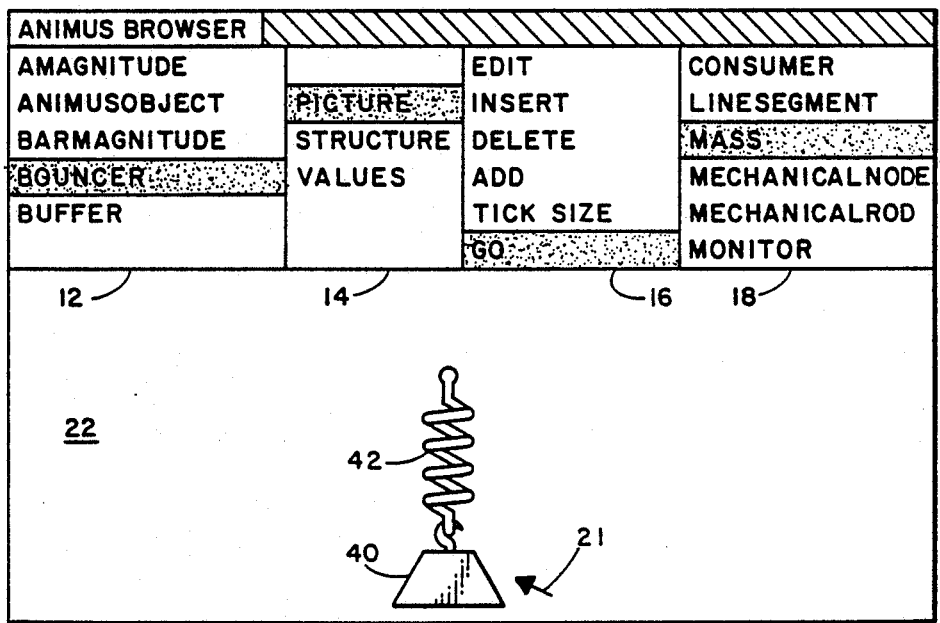

FIG. 6 shows an animation of a mechanical analog to the electrical oscillator of FIG. 5, comprising a mass 40 on a spring 42. A spring prototype containing a constraint modeling Hooke's Law $F=-k/x$ (where F indicates a vector force and X indicates a distance vector) is provided in the kit. Hooke's Law is expressed as a static constraint between the spring's extension and the force it contributes. The mass object 40, containing constraints expressing Newton's Law $F=ma$ and the basic kinematic relations $V=dx/dt$ and $a=dv/dt$, may be attached to the end of the spring, where these kinematics are described by TimeDifferentialConstraints as above. When the system is told to "go" methods are compiled that solve the constraints directly in two dimensions. If we graphically edit the mass's position by selecting "move" in pane 16 and "MechanicalNode" in pane 18, and utilize the cursor 21 to push the mass, the system will continue to oscillate, but in a way that can account for the "push" from the cursor.

Figure 7:
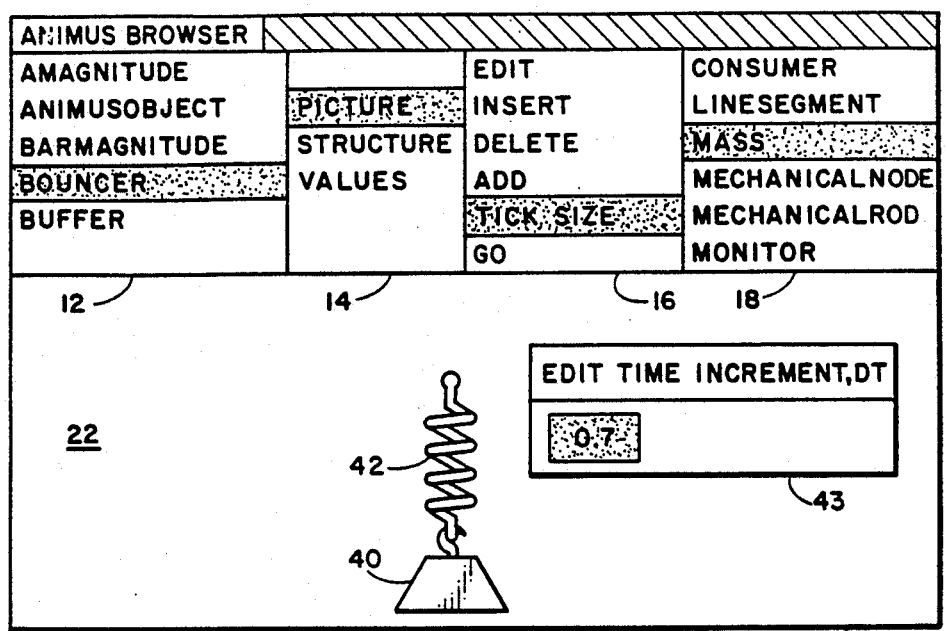

If the motion of the bouncing mass seems too jerky, we can adjust the granularity of the clock increment by selecting "tick size" in the third pane 16 as shown in FIG. 7. This brings up another prompt window 43 in which one can edit the size of the "dt" time increment. A smaller value for "dt" tends to make the animation look smoother, though of course it runs more slowly in real time.

Figure 8:
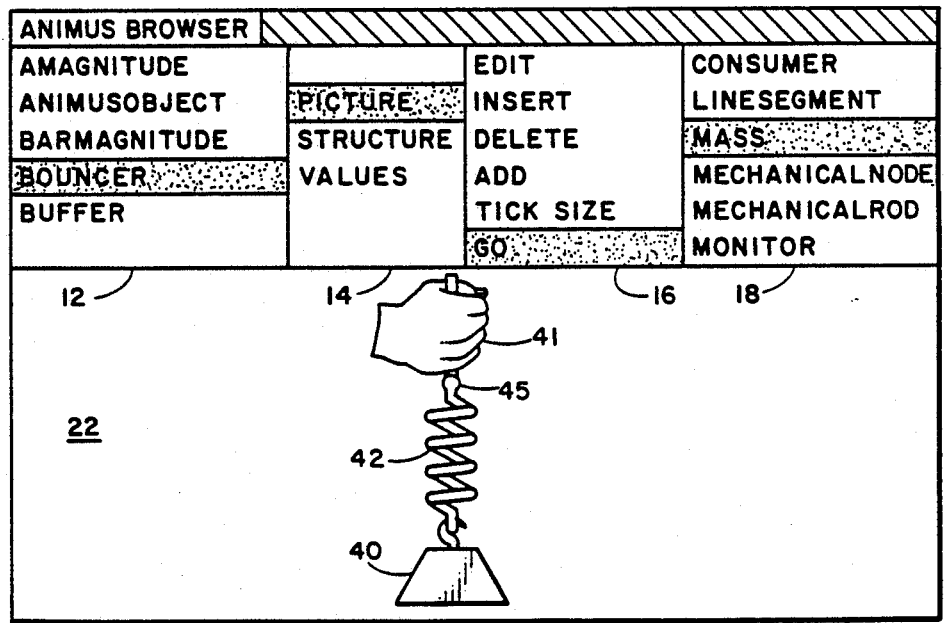

In FIG. 8 a "hand" object 41 from the kit (pane 18) may be inserted in the prototype which is constrained to drive the spring/weight system by moving the upper end 45 of the spring up and down at a fixed sinusoidal frequency. This enables observation of the transient behavior of the spring/weight system and also demonstrates resonance phenomena. The hand 41 introduces into the system a "scripting" TimeFunctionConstraint in which the value of a variable is determined by evaluating some function of time. That is, the hand prototype definition has an instance variable, "verticalOffset," defined by a sine function, A*sine(wt).

When time is incremented, constraint satisfaction enqueues a message that assigns the value of the function at the current time into the constrained variable, the vertical offset of the hand 41 from its initial position. Since the driving hand 41 is steadily adding "energy" to the system, the oscillation amplitude would increase without bound in the absence of damping such a that due to friction, air resistance or spring inelasticity. Such damping is conveniently modeled in the mass 40 itself as a slight modification to the constraint determining the acceleration. A term f * v, is simply subtracted from the value of acceleration, where v is a vector velocity, scaled by a damping coefficient f, yielding a force component proportional to velocity and opposing the direction of motion.

The animation of discrete processes such as algorithms poses a new set of problems. It is no longer so easy to describe temporal evolution using equations, but rather one encounters event-driven causes and effects. A principal means for describing responses to events is provided by the mechanism of TriggerConstraints. A discrete process is described by its "trace", the stream of events comprising it, and a TriggerConstraint allows the animator to specify certain graphical responses to the occurrence of particular events.

Figure 9:
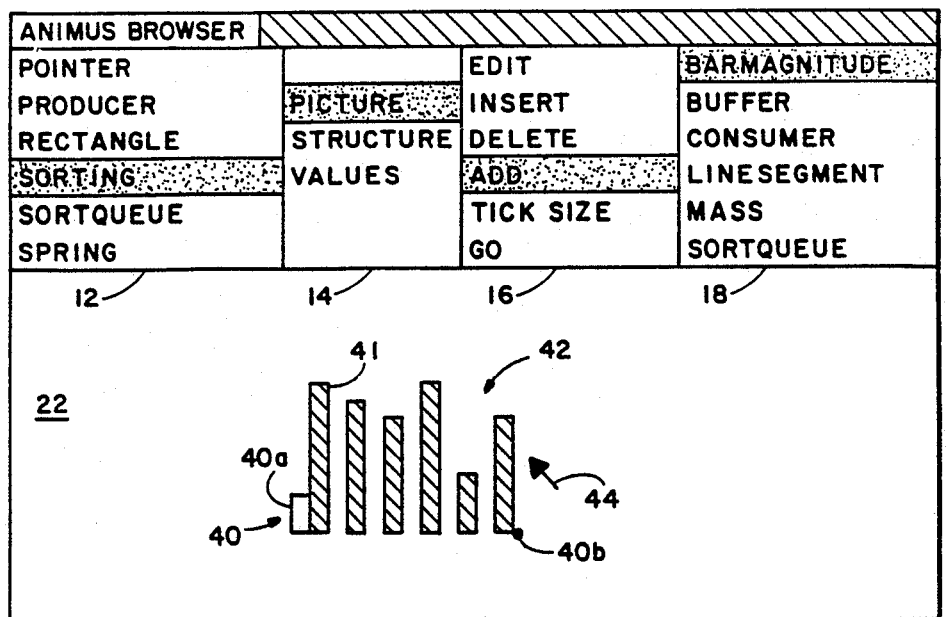

FIG. 9 shows an Animus Browser window 10 displaying an animation ("sorting") created to test an algorithm for sorting numbers by magnitude. The animation consists of representing each number by a bar of height proportional to the magnitude of the number, bars being placed a graphical queue in the order that the numbers are arranged before the sort. As the algorithm reorders the numbers, the animation graphically swaps the positions of the bars in the queue to show how the sorting algorithm sorts. To build a sorting animation in Animus we select an item from the kit (pane 18) called a SortQueue which causes a queue symbol 40 including a small rectangle 40a, indicating the start of the queue, and a dot 40b, indicating the end of the queue, to be placed in the display area 22 of window 10. We then graphically add elements (bars) to be sorted, each an instance of BarMagnitude (a kit item) represented by a bar 41 in a queue 42 of such bars, each bar being inserted between the queue start symbol 40a and the queue end symbol 40b. The height of each bar may be changed utilizing cursor 44, the magnitude represented by each bar being constrained to be proportional to the bar's height. The bar width remains constant.

Figure 10:
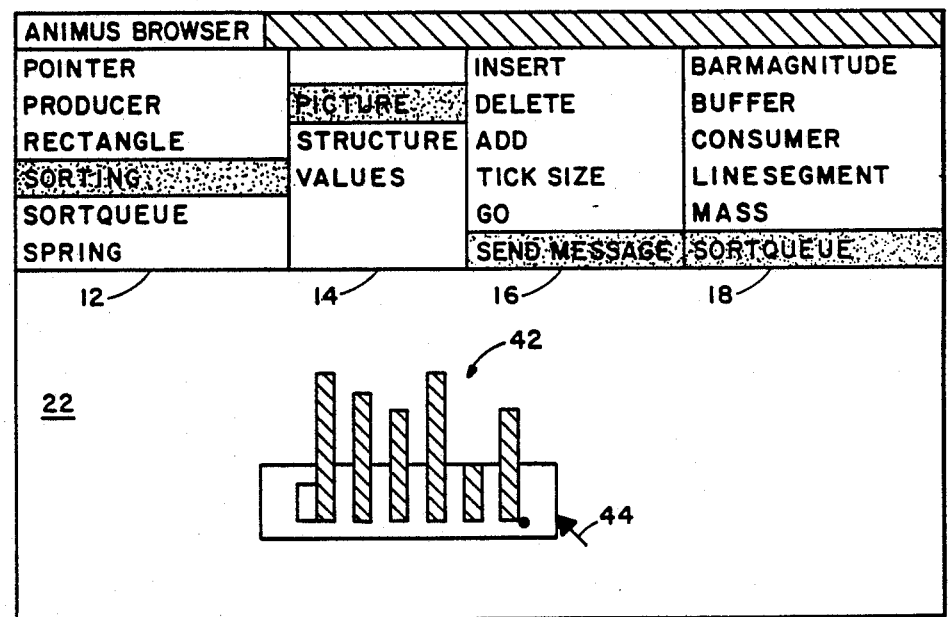
Figure 11:
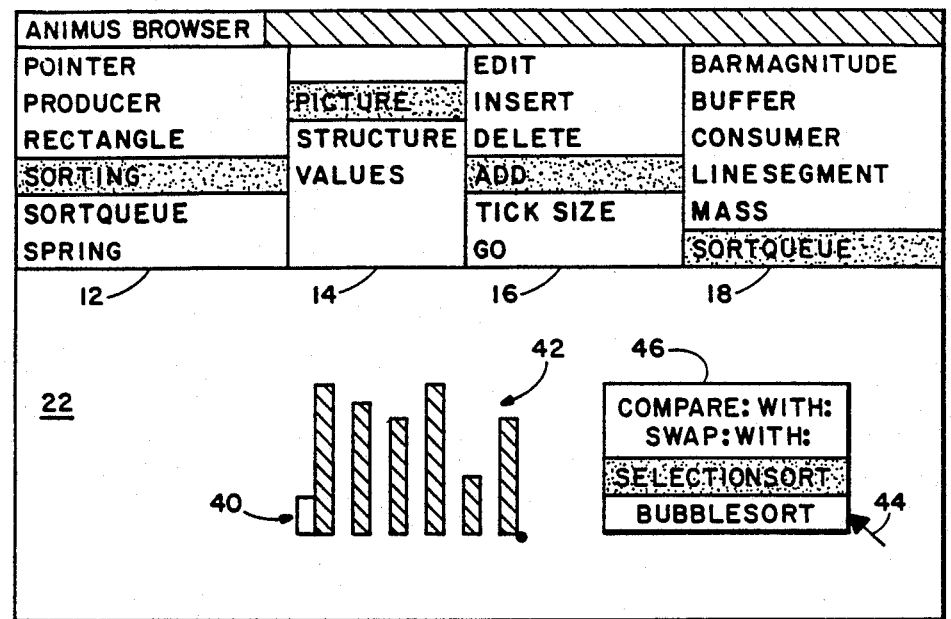
Figure 12:
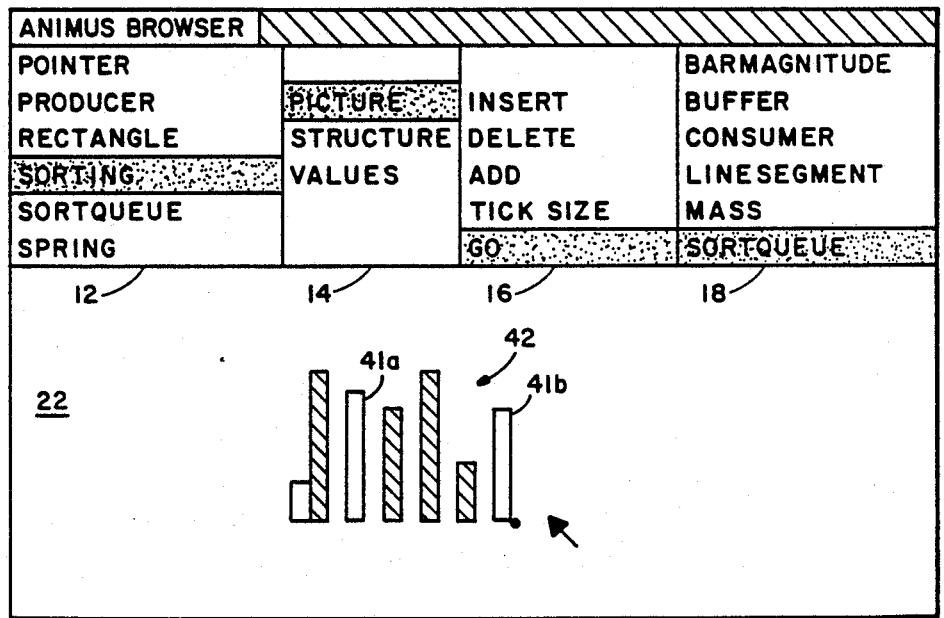
Figure 13:
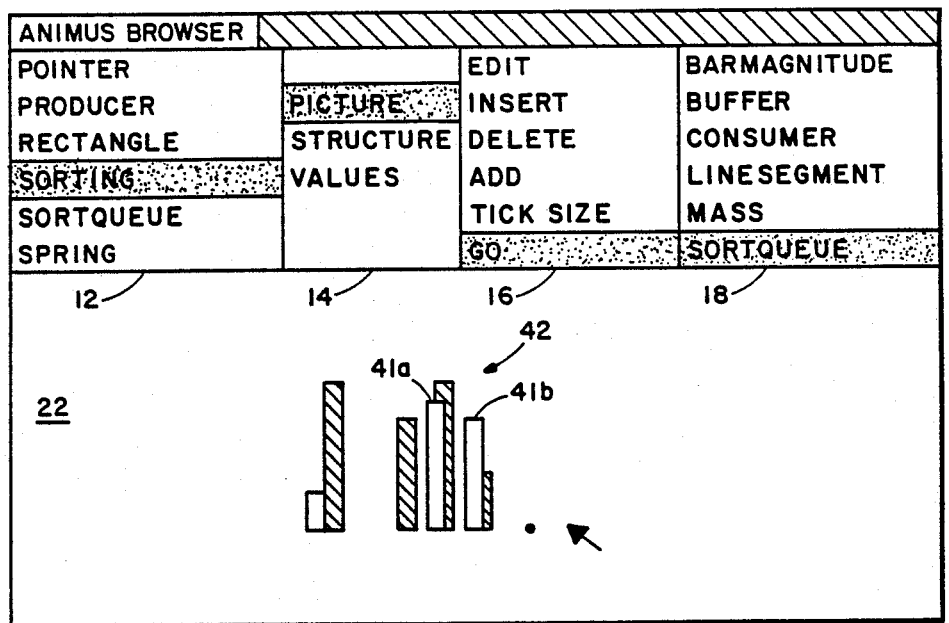

After bar elements have been added to the queue 42, the algorithm to be animated may be invoked, as shown in FIG. 10, by selecting "send message" in the third pane 16 and "SortQueue" in the fourth pane 18 of window 10, and by pointing with the cursor 44 to the queue to receive the message. The system ascertains what messages the queue can understand and presents the user with a menu 46 (as shown in FIG. 11) from which to choose a sorting algorithm. We select a sorting algorithm "selectionSort" from menu 46 and the sort begins. As the algorithm compares the heights of two bars 41a and 41b (or in actuality compares the values of two numbers constrained to correspond to the bar heights), the bars "flash" (alternate between black and white fill) as seen in stop-action in FIG. 12. When the sorting algorithm decides that positions of two bars 41a, 41b are to be swapped, the bars are graphically moved past one another to exchange positions as shown in mid-swap in FIG. 13.

The bars could be swapped instantaneously but it is more difficult for a viewer to comprehend the procedure than when the bars move smoothly past one another over a period of time. The movement is simulated by "stepping" each bar across the screen using steps small enough so that the viewer perceives continuous movement. The movement of the bars in the sorting animation is an example of converting a discrete process (such as a swap) into a stream of events (display steps) which happen over a period of time. This capability is provided by the TriggerConstraints mechanism.

Figure 14:
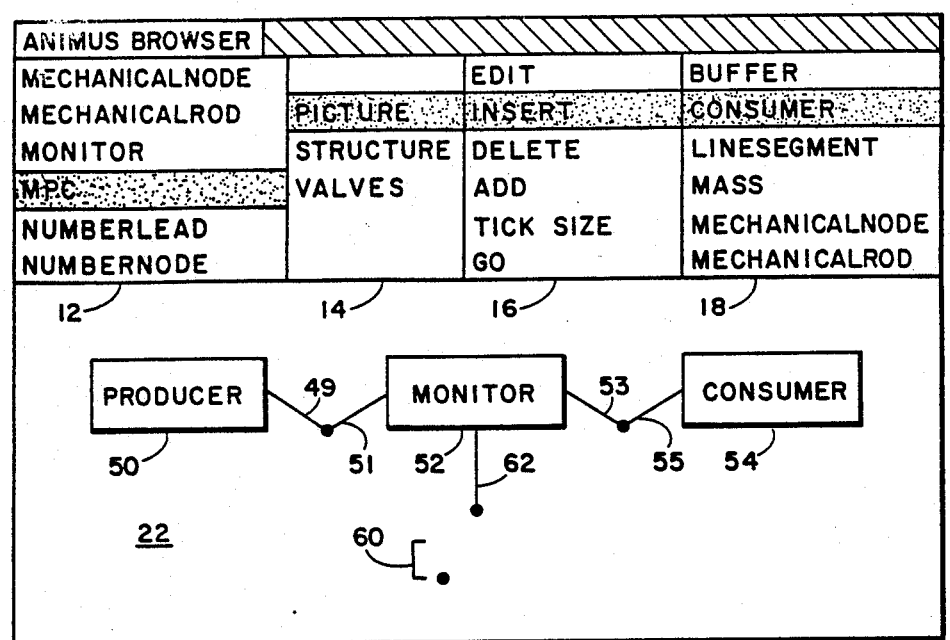

Let us now consider how one might use the Animus system to construct an animation of a system problem comprising a producer and a consumer. The producer produces goods and transmits them to a distributor (monitor) which stores them in a warehouse (buffer) until purchased by the consumer. When the buffer is full, the monitor sends a "full" signal to the producer which then stops production until the monitor sends a "not full" signal, indicating the buffer can accept more goods. The Animus "kit" provides prototypes for the consumer, the producer, and the monitor processes as well as for the buffer. Referring to FIG. 14, depicting an Animus Browser window 10 showing a producer/consumer animation under development in area 22, the producer is represented by a block 50, the monitor is represented by a block 52, the consumer is represented by a block 54, and the buffer is represented as a queue 60 similar to the queue of the previously discussed sorting example. An output lead 49 of the producer 50 is connected to an input lead 51 of the monitor 52 and an output lead 53 of the monitor is connected to an input lead 55 of the consumer 54. An input/output lead 62 of the monitor 52 is connected to the buffer 60. The lead connections define the paths of goods through the system and each lead is an instance variable such as "dataLead", similar to instances of NumberLead in ThingLab, which enables a user to indicate that the output of a producer 50 is to be sent to a monitor 52 by graphically interconnecting leads.

We provide the producer, monitor and consumer processes with their specialized behavior by inserting bits of algorithmic code into the prototype definitions. For example, the monitor must handle the signaling embodied in the algorithm, so it will need protocols and variables for handling the signals, such as

```
notEmptySignal
    notEmptyCondition ← true
notFullSignal
    notFullCondition ← true
```

Likewise the buffer will need to signal the monitor when it is full or not.

Figure 15:
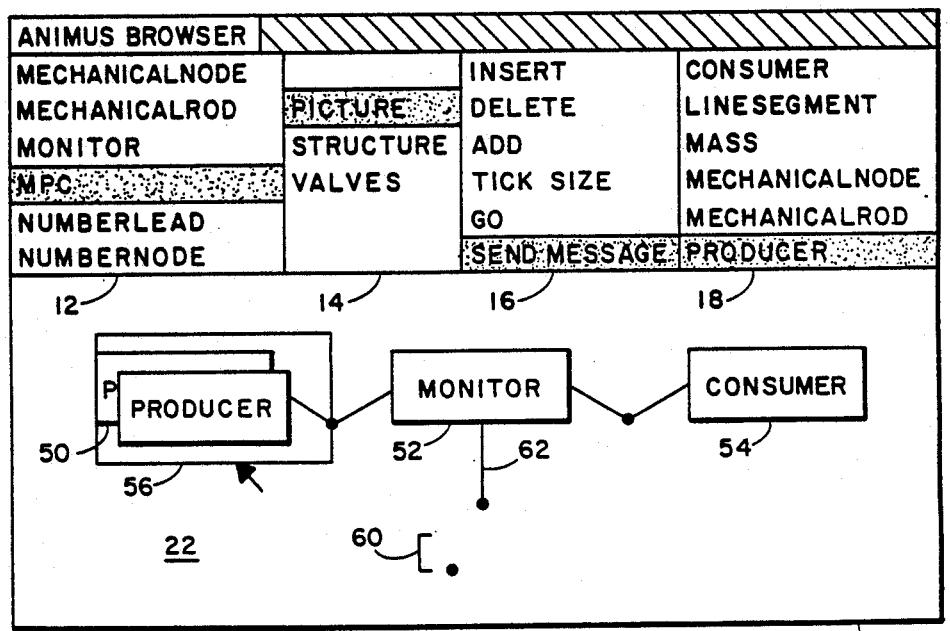
Figure 16:
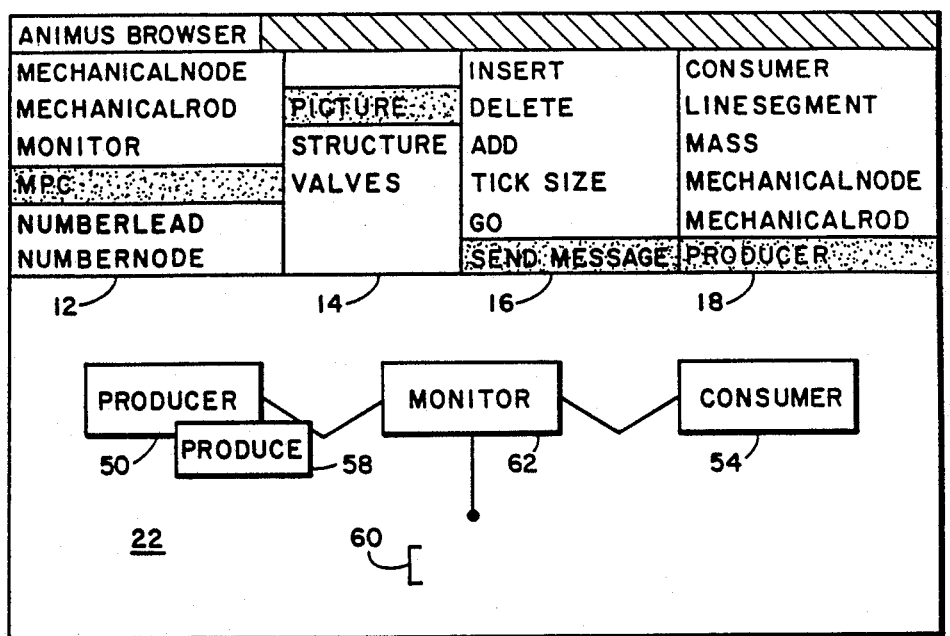

To build the Monitor-Producer-Consumer (MPC) prototype animation we begin by inserting the Producer 50, Consumer 54 and Monitor 52 as shown in FIG. 14. The leads stick when moved together by a cursor, their connection in this context indicating data pathways. Having assembled the structure of the MPC prototype, we start the action by sending "produce" messages to the producer 50 as shown in FIG. 15, selecting "send message" in the third pane 16 of the browser and "Producer" in the fourth pane 18. As we move the cursor into area 22 we obtain a flashing image 56 of the Producer 50 prototype which will stick to the producer instance we wish to address. Releasing the mouse button on the selected Producer causes the system to recompile all the methods for which responses are specified to be triggered, and then presents us, as shown in FIG. 16, with a menu 58 of messages which may be sent to the selected producer. In this case only the message "Produce" may be sent.

Figure 17:
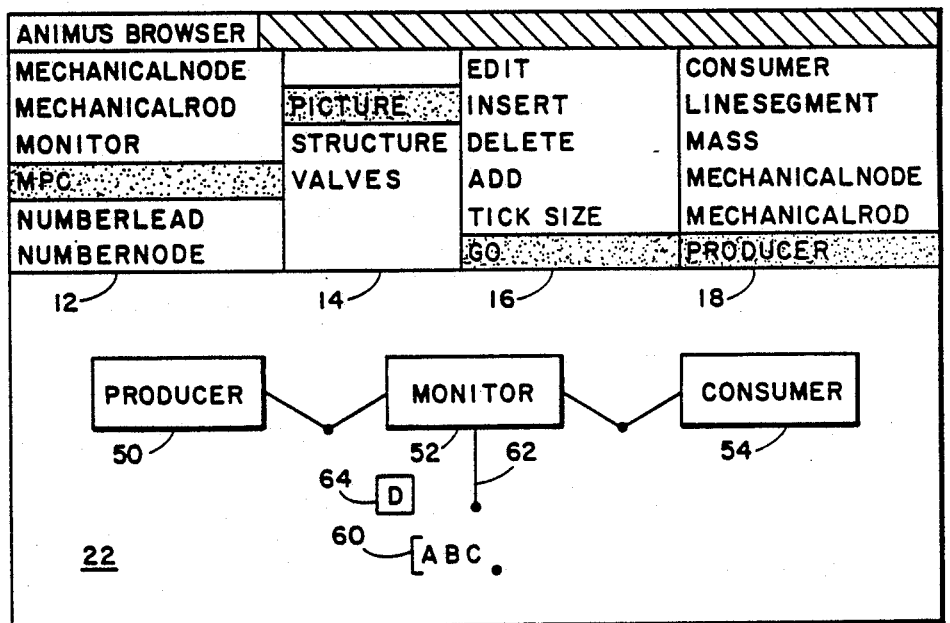

When we select the "produce" message to be sent to the producer 50, two distinct but related things happen to the producer which provides a "datum", represented by a black dot 64 (as shown in FIG. 17) containing a letter indicating a product. In FIG. 17 four "produce" messages have been sent. Three products (A, B and C) have been stored in buffer 60 while a fourth product D, provided in response to the fourth "produce" message, is shown "en route" to the buffer 60. The Producer, consumer, monitor and buffer prototypes include constraints which require certain graphical events to occur when the Producer produces a datum, namely that the dot 64 representing the datum be displayed as "moving" from Producer 50 and into buffer 60. Animus compiles methods for the MPC prototype which ensure the constraints are satisfied when the Producer is sent a "produce" message. The movement of the dot 64 is an example of a temporal response occasioned by temporal constraints.

If the producer 50 is told to produce when the buffer is full, then the monitor 56 signals the producer 50 to wait. A graphical constraint is provided in the producer such that when its "blockingCondition" is set, the producer displays itself video inverted. Then if the consumer consumes an element, the monitor 52 receives a "notFullSignal" message from the buffer 60 and in turn wakes the producer 50 which then resends its datum.

Implementation

An operator utilizes Animus to create a model which simulates the behavior of a collection of interactive elements such as a process or an apparatus. The model is assembled from Smalltalk objects instantiated from preexisting prototypes in the Animus kit wherein each prototype simulates a part of the process or apparatus.

Once the model is created, it may itself be used as a prototype in the kit for an element of a more complicated model. The temporal behavior of the model is controlled by a time management object (hereinafter referred to as the "anima"), an instance of a subclass of a new Smalltalk class Anima. The anima is adapted to execute a procedure for incrementing a simulation "time" by incrementing the value of a variable representing time. The anima also maintains an "event queue" for storing "events", wherein an "event" is a representation of a message, and a "time stamp" indicating a time at which the message is to be sent to the model. The anima is further adapted to transmit any message represented by an event in the event queue to objects of the model when the time represented by the time variable surpasses the time indicated by the time stamp associated with the message. Each such message sent to the model causes the model to carry out some procedure which satisfies constraints on its behavior.

In order to cause the model to behave in a temporal fashion in response to some triggering message, one or more events are stored in the event queue in response to the triggering message wherein each event includes a time stamp indicating a future time at which its message is to be sent to the model in order to effect a particular response. As the time management object increments the time variable, the messages described by the events in the event queue are sent in the order that the events are time stamped. Thus the model carries out an action or a sequence of actions in the future in response to a current triggering event.

In creating the model, temporal behavior of the model is described by temporal constraints on the behavior of its parts, the temporal constraints being described by instances of temporal constraint classes which are instantiated when the kit prototypes are instantiated and inserted into the model. The temporal constraint classes include descriptions of triggering messages which invoke constraints. When a triggering message is sent to the model for which no procedure has been compiled for satisfying temporal constraints triggered by the message, Animus compiles a response procedure for execution by the time management object (the anima) which causes one or more events to be stored in the event queue. Each of these events includes a time stamp indicating a future time and a representation of a temporal constraint satisfaction message to the model for causing the model to satisfy the requirements of the temporal constraints triggered by the triggering message.

Thereafter, as the anima increments the simulation time, it transmits to the model any message described by any event in the event queue for which the simulation time surpasses the time indicated by the time stamp of the event, thereby causing the model to carry out actions in satisfaction of its temporal constraints. Thus Animus not only temporizes the behavior of the model by providing the anima for controlling the actions of the model to be performed at a specified future times, it also automatically determines what those actions will be in order to satisfy a set of temporal constraints on the behavior of the model and embodies those actions in the form of time stamped events in an event queue.

In discussing the behavior of constraints, especially temporal ones, it is important to distinguish four distinct periods in time. The distinctions are important with respect to when objects and responses come into being, and when methods become defined. These times are used to structure the discussion of the behavior of constraints and they are:

Definition Time—The time at which the textual definition of a constraint becomes instantiated as an instance of a Constraint class and becomes incorporated into the prototype being defined.

Compile Time—The time at which a message is sent to some node in the constrained structure which is not defined in the MethodDictionary for that object, but which is recognized as a method for which a response can be generated given the constraints. At this time a new method is compiled by the Animus system to respond to that message such that all constraints are satisfied.

Run Time—The time at which the new method (compiled at compile time) is executed. In the case of a temporal constraint this execution results in the creation of a response which can only occur in the future.

Future Time—The time at which a temporal response (created at run time) unfolds.

The first three times are sufficient for describing the important events of a static constraint system. However, a static constraint is not concerned with the future behavior of the system; it is concerned only with the current state of the system and says nothing about what states the system must assume in the future. In contrast, a temporal constraint is satisfied by the future behavior of a system and has no effect on its current state.

All time management protocols and controls for compiling temporal constraints are implemented as instance methods in the Smalltalk class Anima. Anima, of whose presence the user is generally unaware, is in some sense the "soul" of the animation. The simulation time as well as the event queue are instance variables of, and are managed by, the anima. When the user defines a new prototype in the browser, such as the "Circuit" prototype, Animus automatically defines a new class called CircuitAnima as a subclass of Anima into which methods for the response and temporal behavior of the particular circuit become compiled. An anima that is an instance of this new subclass is automatically instantiated when the user constructs a new prototype, and is initialized and assigned as the value of the instance variable "anima" of that prototype when time first advances.

An "event" is an instance of class Event and is a representation of a Smalltalk message along with a time stamp specifying a time at which that message will be sent. A message in Smalltalk semantics consists of a reference to an object designated the receiver, a symbol serving as a message "selector", and an array of arguments. When a message is sent to a receiver object, the receiver determines from the selector what method it is to execute and makes use of information contained in the arguments of the message when executing the method. The time stamp of an event serves to defer transmission of the message until time has a value greater than the time stamp. The "event queue" is a variable ("eventQueue") comprising a linked list of events in which insertions and removals of events may be done efficiently. Responses are represented as prototypes which, upon the occurrence of a designated trigger event, are realized as a stream of events, which are placed in the event queue. Any instance of Anima responds to the message "tick: dt," by first checking to find all events in the event queue with time-stamps less than the current value of time, sends off the messages represented by the events, and finally increments the value of time by the value of dt.

Since enqueued events are explicitly time stamped, and management of all events and responses occur in one time-ordered queue, there is no need for synchronization primitives. An arbitrary degree of concurrency may be handled by the event queue, since any number of events may be stamped to occur at the same time. In particular, by interleaving complex responses, such as movement of many different icons across the screen, a series of single-step events are specified to begin at specific times with durations such that they overlap. The constituent events are inserted time-ordered in the queue and executed in that order, thus interleaved.

A temporal constraint is a relation that is required to hold between the existence of a stimulus event and a response in the form of a stream of one or more new events. The statement of a temporal constraint must include a description of the stimulus event and some representation of the abstract response prototype from which the response stream of events can be instantiated at a particular time. The stimulus event may simply be a tick of the clock or it may be the receipt of some specified message by a particular object in the model.

Definition Time

Temporal constraints are expressed locally in the components which are to exhibit the specified behavior, and these components are then combined (for instance by "merging" leads in the RC network example) so that the constraints interact in a network. Unlike ThingLab, where static constraints are satisfied more locally (in the least common ancestor of the affected parts), in Animus time is considered global and time as well as the single eventQueue variable are managed by the single instance of Anima which is contained in the ancestor to all parts of the animated structure. Therefore at the time of prototype initialization the animated structure must be traversed and all temporal constraints caused to migrate up to the anima, since the anima is the owner of the constrained variable, time. This process is detailed hereinbelow. Any message that would increment time thus must consider the constraints on time and a new method must be compiled to respond to that message which in addition to incrementing time guarantees that the constraints are satisfied.

The textual definition of a static constraint, for example the Ohm's Law constraint for V=IR defining the Resistor prototype (or kit object), appears as an instance creation and initialization message to the constraint class as follows:

```
Constraint Owner:Resistor prototype
    rule: '(lead1 node voltage − lead2 node voltage)
            = (lead1 current * resistance)'
    methods:
        #('lead1 node set.voltage:
                lead2 node voltage + (lead1 current
                *resistance)'
            'lead2 node set.voltage:
                lead1 node voltage − (lead1 current
                *resistance)'
            'lead1 set.current:
                (lead1 node voltage-lead2 node voltage)
                resistance' 'resistance reference')
```

The string argument designated as the "rule" represents the relation or predicate that the static constraint is to maintain (i.e., that V=IR). The strings provided in the array of "methods:" are code fragments that the constraint might utilize to reestablish the rule in the event of a change. Typically a number of different methods are supplied to enable the constraint to be satisfied in different ways depending upon what variables are known. Here, the constraint is given the option to adjust the voltage at either lead, or to change the current through the resistor. The string 'resistance reference' indicates that the instance variable "resistance" is reference only, that is the constraint should not change the value of resistance to satisfy itself. However an outside reference to the resistance, for example if the user were to edit its value, would nonetheless cause the constraint to fire.

When the Resistor prototype (or kit object) definition is instantiated, the "owner:rule:methods" message is sent to an instance of class Constraint which responds by sending messages to an instance of Compiler which in turn parses the rule and method strings in the definition. The compiler returns an instance of a class MethodNode from which a parse tree representing each message string can be extracted. The intermediate representation used by the Smalltalk compiler is a tree of ParseNodes (of which MethodNode is a subclass) which (recursively) know how to emit byte-codes. The parse trees are then stored as initial values of instance variables in a new Constraint instance. Finally, the class sees that this new Constraint instance is inserted into the class definition of the prototype Resistor.

The goal of temporal constraint satisfaction, in the case of a TimeDifferentialConstraint, is to generate a set of methods that embody a finite difference approximation for a stated differential equation. One way to perform such an approximation is to consider the derivative value (for example the current, i, in the capacitor's constraint relation $i=dq/dt$ case) at the onset of each discrete time interval dt to be good for the duration of that interval. Then the new value for the differential variable (charge q) may be calculated for the beginning of the next interval, after which other values (such as the current) may be updated according to the constraints for static consistency. Relying on this method, the user need not specify a series of options in the constraint definition, but only the variables so constrained. Thus the definition of a TimeDifferentialConstraint in the Capacitor prototype (i.e., kit object) appears simply as:

TimeDifferentialConstraint owner:Capacitor prototype timeDerivativeOf:'charge'equals:'lead1 current'

As for a static constraint definition this "owner:-timeDerivativeOf:equals:" message calls on a compiler to return a parse tree, but the string to be parsed is only implicit in the definition. Additional string elements are added to the information given in the definition so that the compiler returns a parse tree standing for the code fragment:

```
delta.charge: t1
   |delta|
   delta ← lead1 current * t1.
```

The value of the time increment t1 is not known until run time and so is expected as a parameter. This code fragment is incorporated into a new method created at compile time, as described hereinbelow. In the new method, the local temporary variable "delta" is passed as an argument in another message to increment the charge. This parse tree is inserted as a field in the new constraint instance in the new prototype class definition, but not directly as before, but rather packaged inside an object called a Response. An instance of class Response is an abstract representation of some possibly complex behavior to occur in the future, and becomes realized at run time as a sequence of events to be stored in the event queue.

Compile Time

At compile time a message that was not understood has been sent to a part of the structure. The method defined in Smalltalk class Object for "doesnotUnderstand," which normally puts the user into a debugger, has been overridden in the Animus system so that it first checks whether the message selector was of a form (such as "delta.charge:" above) for which the Animus system should try to compile a method from constraint information. If so, an instance of class ConstraintSatisfactionPlanner is created and told to collect together all constraints that might have to be satisfied or checked because of the potential change. Such a planner maintains a queue of methods contributed by affected constraints. The planner tries to find an ordering of these methods that will satisfy those constraints. The first step taken by the planner is to expand the message recursively to all parts of the receiver, so that a message affecting the whole structure, such as moving the entire object, may be implemented by messages to the parts, ultimately moving each point comprising the object by the same amount. For example, if a quadrilateral object consisting of four line segment objects were to receive the message "moveby:delta" it would expand this into four "moveby:" messages, one to each line segment. Each of the four messages to line segments would in turn be expanded to two messages, one for each of the endpoint objects of the segment.

Next for each message in the planner, the path to the receiver is checked for any constraints that might no longer be satisfied, and these constraints are told to add their methods to the planner. For example, if two resistors were connected to the same electrical node whose voltage is to change, then the methods for each resistors Ohm's Law constraint must be added to the planner. When a constraint is told to add its messages to the planner queue it checks to see whether it has already done so via a different access path to a merged object. The constraint also checks whether it "overlaps" the receiver of the message being planned for, that is, whether any of the constrained parts are going to be affected by the planned changes. The messages in the planner's queue are then processed to delete duplicates (arising because of merged parts being accesses via more than one path in the recursive expansion) and, if possible, to find a one-pass ordering for sending the messages in the queue so that changes can propagate through the system leaving all constraints satisfied. Finally, a new method is compiled into the receiver's class definition whose statements are the messages of the planner's queue in the appropriate order.

In the case of a temporal constraint the receiver of the initial message is the global entity "time", located in the anima, which is an implicit variable in all simulation objects. This means that at compile time, upon receipt of a message to time by "incrementby: dt," the anima must first gather together all the temporal constraints that are defined in parts of the prototype object since time and the constraints on time are going to be globally managed by the anima. The anima then sends itself a message to "compileResponseFor" the temporal constraints it has just gathered. This means that the code fragment contained in the response of each temporal constraint becomes augmented and placed in context. For example, if a capacitor is added to a circuit the anima compiles a response method derived from the last mentioned code shown which now reads:

```
delta.thing.capacitor3.charge:t1
    |delta|
    delta ← thingcapacitor3lead1current*t1.
    thing capacitor3chargeprimitiveIncrement:delta.
```

Notice that this differs from the earlier code fragment in that both the method selectors and the reference to the current have had path names prepended to reflect the position of the specific capacitor in a larger context. Also the calculated "delta" is now passed as an argument to "capacitor3chargeprimativeIncrement:", a system compiled method insuring static constraint satisfaction in the circuit, to make things consistent once the charge has been changed. It is a method which has been compiled via the prior art static constraint satisfaction mechanism of ThingLab, taking care of such things as adjusting the voltage across the capacitor to reflect the change in charge (C=q/V), propagating voltages along wires, and finally adjusting the current in the circuit due to Ohm's Law in the resistor. Upon the triggering of a temporal constraint, messages are connected in a queue in the satisfaction planner, and constraints similarly checked. Now the "overlaps:"check is trivial; one simply looks to see whether the receiver of the message is time. A temporal constraint is also asked to place its methods into the planner, but instead of doing so directly, it compiles another method which at run-time enqueues the response method to occur in the future. For example, the method "incrementby:" is defined in the anima's class as

```
Incrementby: t1
    time primativeIncrement: t1
    thingEvents enqueue:
        (Array with:
            (Event new
                atTime: time value + t1
                receiver: self
                selector: #delta.thing.capacitor3.charge:
                arguments: (Array with: t1))).
```

Thus the change to the value of charge is enqueued to occur in the following instant. This effectively implements the finite difference approximation; the value of the current has been left untouched for the duration of the time interval, and a new value of current is then derived from this first approximation to the new value of charge. This delay of the response for one clock tick breaks the circularity inherent in the statement i=dq/dt, wherein the charge is dependent on the current and vice versa, which would otherwise force the constraint satisfier into costly relaxation methods. Other temporal constraints may entail more elaborate responses such as scripts or graphical trajectories involving the enqueuing of many events stretching out into the future, in contrast to the single event of this example.

Run Time

At run time, static constraints are satisfied by simply running the compiled method generated at compile time. However, in the case of a temporal constraint the method generated at compile time is itself a method to generate a set of new messages that will form constituent events of the run-time response to occur in the future. These new messages appear as time-stamped events which are placed into the event queue. That is, in our example, "time" receives the message "incrementby:d1" given above. This enqueues an event so that the anima executes the "delta.thing.capacitor3.charge" method at the next tick of the clock.

Future Time

The future is represented by the event queue maintained by the anima. As previously mentioned, the eventQueue is an instance variable of anima comprising a linked list of time-stamped messages which will be sent when time catches up to the time-stamp.

Types of Temporal Constraints

In some cases it is possible to describe temporal behavior in terms of real-valued functions of time or differential equations involving time. In these cases the systems being simulated and animated are continuous processes and the problem for the system in satisfying the constraints is to generate a discrete approximation of the continuous specification. Alternatively, the simulated process may be discrete, in which case the constraints and their satisfaction must conform to an event-driven, cause-and-effect model. However, one may wish to represent evolution that is explicitly discrete with as much visual smoothness and continuity as possible, as for example in the previously discussed sort animation wherein discrete swaps of bar position in a queue were represented by apparently continuous movement of bars from one queue position to another. In such case, intermediate graphical states for a thing being animated must be interpolated which in fact have nothing to do with any actual state of the thing itself.

Continuous Evolution

Of the simpler kinds of temporal constraints are those that explicitly determine the states of objects as functions of times. An example is the constraining of the position of the hand 41 that drives the bouncing spring 42 of FIG. 8 to follow a sinusoidal functions of time. The definition of the constraint appears as

```
TimeFunctionConstraint owner: Hand prototype
    timeVariable: 't'
    timeFunction: '(t * frequency) sin * amplitude'
    constrains: 'verticalOffset'.
```

In this definition the variable 't' is actually just a place holding dummy variable, since there is no instance variable referring to time in the Hand prototype itself. Later, at compile time this dummy variable is replaced by "time" which is an instance variable of the automatically generated subclass of Anima for the animation prototype into which the Hand is inserted. When this definition is filled in, the constraint which is installed into the Hand prototype constructs a parse tree representing the code fragment:

```
delta.verticaloffset
    |delta|
    delta ← (thing anima time * frequency) sin *
```

-continued

| amplitude |
| --- |

Finally all at compile time, this fragment becomes recompiled into the anima as before, in the form of another method that actually performs the assignment, while also satisfying any other constraints on the variable being assigned into. Thus the method appears as follows:

```
delta.thing.hand3.verticalOffset
    |delta|
    delta ← (thing anima time * thing hand3 frequency)
        sin * thing hand3 amplitude.
    ↑ thing hand3verticalOffsetprimitiveSetTo: delta
```

With each tick of the clock this new method is called, the specified function of time is evaluated, and the constrained variable is set to the result.

The situation is not quite so simple when continuous evolution is to be described by time-differential constraints, e.g., v=dx/dt. This case presents some special problems arising from the fact that the continuous and exact analytical description must be mapped into an implementation of a finite difference approximation. Since digital technology requires building a movie out of discrete frames, a continuous process must be modeled discretely. Furthermore there is an inherent circularity in a statement such as v=dx/dt; it states that velocity depends upon position, but position also clearly depends upon velocity. According to a finite difference approximation method, the old value of velocity would be considered to be valid for the duration of the incremental time interval, dt, in order to calculate the new position, and only after the approximate new position is established would the velocity be updated.

The implementation of TimeDifferentialConstraints effectively achieves this behavior. The constraint is triggered initially by any message that would increment the value of time in the global clock. That is, a message to increment time is reinterpretted in view of the constraint, and a new method is compiled that increments time as well as enques an event embodying the constraint's response. This event is the incrementing of the value of the differential i.e., dx) by the specified amount (i.e., V*dt). But the event is enqueued to occur in the following instant, thereby generating the standard approximation by considering the old value of the derivative as valid throughout the time interval.

One detail appearing in the syntax of TimeDifferentialConstraint declarations is that one may not constrain expressions, but only instance variables. Thus in the Inductor prototype, when one would like to express the constraint V/L=di/dt, one must create a new instance variable "deltaVoverL" and write:

TimeDifferentialConstraint owner: Inductor prototype timeDerivativeOf: 'current' equals: 'deltaVoverL'.

One must further constrain this new variable to the described expression thus:

```
Constraint owner: Inductor prototype
    rule: 'deltaVoverL =
        (lead1 node voltage — lead2 node voltage) / inductance'
    methods:
        #('self set.deltaVoverL:
        (lead1 node voltage — lead2 node voltage) / inductance'
```

```
'lead1 node voltage reference'
'lead2 node voltage reference'
'inductance reference').
```

This simplifies the implementation of the constraint. Whereas static constraints may satisfy themselves by incorporating expressions in-line into newly compiled run-time methods, a temporal constraint creates a run-time method which itself enqueues another method to be executed at a later time, and this latter method can only refer to its receiver and arguments, not expressions.

Discrete Evolution

The specification of responses to discrete events is implemented by the class TriggeredConstraint. The trigger event is a message with the specified selector sent to the owner of the constraint. The constraint owner's behavior upon receiving the trigger message takes the constraint into account by first enqueuing the specified response events and then performing the primitive method associated with the message. This technique allows particular instances of a class to have individualized responses to a given message, unlike the usual situation in Smalltalk where all instances of a class have the same behavior.

Each temporal constraint possesses a Response by which it satisfies itself. In a constraint for continuous evolution the response is relatively simple, involving the sending of a single message to perform an assignment. The response triggered by a TriggerConstraint is often more involved, entailing the enqueuing of many events, or starting up a procedure implementing an algorithm being animated. For example, a response that is an instance of class Flasher enqueues a series of events which alternately paint a region of the screen black and then white. Flashing may be used, for example, to highlight some object the user should notice, like the elements of an array as they are being compared in a sort.

The technique used to insure the execution of responses takes advantage of the recompilation and relocation of methods at compile time to insert the code fragment given as the response into the newly compiled method. Thus, the definition for a trigger constraint for making bars flash when they are compared in a sorting algorithm is:

```
TriggerConstraintowner: SortQueue prototype
    to: 'list'
    trigger: #compare: with:
    causes: '(Flasher with: (list at: a1)) enqueueEvents.
        (Flasher with: (list at: a2)) enqueueEvents'.
```

This code fragment in the trigger constraint causes the following method to be compiled into the anima class for the sorting animation:

```
thingsortQueue3list.compare: t1 with: t2
    (Flasher with: thing sortQueue3 list at: t1))
        enqueueEvents.
    (Flasher with: thing sortQueue3 list at: t2))
        enqueueEvents.
    selftick: 1
    ↑ thing sortQueue3 listcompare: t1 with: t2.
```

This method is executed instead of the original "compare: with:" method since all messages to the constrained object to invoke the original method have been recompiled, and rerouted to the anima with the new extended selector substituted. Notice that in the recompilation, the message "selftick: 1" has also been inserted by the compiler so that the events that are enqueued for the response are immediately executed. This is necessary since, when control is given over to an executing algorithm, the browser no longer sends tick messages to the prototype, as was the case when we selected "go" in the spring/weight simulation. Conceivably this problem could be solved by "animating the program counter," and using advances in the counter to send off tick messages. But object oriented languages such as Smalltalk typically do not have a program counter in the usual sense. Messages are simply passed around. The explicit insertion of tick messages by the system into the recompiled messages forces the animated responses to occur as they are needed in a temporal fashion.

Another way to generate a response is to refer directly to a Script to be enqueued, rather than creating a Trajectory or Flasher which then enqueues events. Most simply a script may be a stream of events, that is, time stamped messages. Typically a script is accessed as a Stream that is opened onto a file. Instances of a script respond quite simply by placing their own sequence of events into the event queue at run time. In order to accomplish this the events are represented as SmallTalk parse trees at definition time in the same way that constraint methods and response methods are represented. Then when the structure is built and the anima is initialized, the event messages are relocated to reflect the context.

The mechanism of TriggerConstraint allows for even more elaborate responses including initiation of an algorithm. A TriggerConstraint definition could contain code for the algorithm in the "causes:" field. Thus the selection sort algorithmic code appears in the definition of the SortQueue prototype as:

```
TriggerConstraint owner: SortQueue prototype
   to: 'list 'trigger: #selectionSort causes:'
      |least|
      (1 to: listsize)
         do: [:i | least ← i.
         (i + 1 to: list size)
            do: [:j | (list compare: least with: j) ifTrue:
               [least ← j]]
            (least = i) ifFalse: [list swap: i with: least]]'.
```

This code is recompiled in the same way as other responses. The references to selectors such as "compare:with:" and "swap:with:" can be designated as triggers to be changed during compilation to refer to the new methods which also contain the specified responses, as described in the next section. The algorithm is then typically invoked by sending a message to an instance owning the constraint by pointing at the object using a "Kicker" tool described hereinbelow. Conceptually the constraint satisfies itself by enqueuing its expressions upon having been "kicked", but those expressions must first be relocated into the particular context in a manner described below.

A problem may arise in building animations in which one part of the system wants to send a message to another part which is not a subpart of the first part. For example, in the aforementioned Producer-Consumer animation, when the Buffer has been told to enqueue or dequeue an element, it must indicate to the Monitor whether it is not full or not empty. Thus the Buffer prototype contains the methods:

```
enqueue: element
   list add: element.
   (dataLead ancestral: 'Monitor') notEmptySignal.
   list size = maxSize ifTrue:
      [(dataLead ancestral: 'Monitor') fullCondition]
dequeue
   (dataLead ancetral: 'Monitor') notFullSignal.
   listsize = 1 ifTrue:
      [(dataLead ancestral: 'Monitor') emptyCondition].
   ↑ list removeFirst
```

The Producer prototype contains the following method: produce

```
produce
   dataLead node ancestral: 'Monitor'
      send: 'enq:' with: currentDatum.
   currentDatum ← (currentDatum asInteger + 1)
      asCharacter
```

The receiver of the producer's production is intended to be the monitor itself, but graphically, we are only able to merge part of these objects, their dataLeads, to indicate this. Access to parts in ThingLab is strictly top-down via name paths, for example "MPC producer1 dataLead node value." There are no back-pointers from parts to their ancestors in the hierarchical structure. The "ancestral:send:with:" message allows us to send a message indirectly, again via the root where global responses are compiled so that constraint satisfaction is guaranteed.

Method Relocation

Important to the implementation of either kind of temporal constraint is the process of reinterpretation of messages. New methods must be compiled in which actions are taken to satisfy the constraints (i.e., to enqueue the appropriate responses) while executing a received message. This is managed through a convention established in Thinglab that messages to a part in the structure are all sent through the root of the structure via a path consisting of part names, Furthermore if a method defined or used in a part is constrained (i.e., is the trigger of TriggerConstraint) or affects constrained parts, then a new method is compiled into the anima with a unique selector constructed by prefixing the path names to the original selector.

This convention of access via root and paths is a very natural approach in Thinglab where user requests drive the changes in the constrained structure. Access by the user to the structure is through the browser having an instance variable pointing to the root object of the structure. The constraint satisfaction mechanism depends on the passage of the message down through the network, checking at each node whether the message pathway overlaps the path to some constrained part, and thus whether that constraint should be added to the list of those whose satisfaction must be assured.

In Animus more often messages causing changes in the structure come from within the structure itself, from the execution of the algorithm being animated. A knowledgeable part of the structure can only send a message directly to another part at the risk of subverting the constraint mechanism altogether. Constraint satisfaction can only be guaranteed if message passing among parts of the structure is done by sending messages to the root anima and from there via a path down another branch, which of course entails overhead. Specifically this means that not only must any method whose selector is a trigger be relocated, but any method that uses a triggered method (i.e., sends a message with a selector to an object owning a triggerConstraint on that selector) must also be relocated so that those calls on the triggered method can be routed through the anima. Fortunately the user need see none of the relocated methods and need only concern himself with the simple forms of methods he may define local to components. Once the network of paths is established upon construction of a new prototype object from kit components, the system takes care of interactions and relocations.

Suppose for example that one wishes to send a message to change the value of the current through a capacitor in the aforementioned RC circuit. Access to the object representing the current would be via the path "thing capacitor1 lead1 current". Each path name is both the name of an instance variable and also the selector of an automatically generated access function which simply returns the value of the named variable. Thus the path is in fact an executable message, or sequence of messages, which will return the desired part. During the process of relocation, after a component is inserted into a structure (such as the capacitor into the RC circuit) the paths to its parts must be extended to reflect its position in the structure. Thus in constraint methods defined local to the capacitor, there may be references to "lead1 current", and all such references will be extended as above to "thing capacitor1 lead1 current".

Trigger selectors are similarly treated upon relocation in that they are extended by the path names to the part where the trigger is defined. However, the path names are no longer executable per se, but rather are joined together into a single long selector without spaces in order to provide a unique selector in the anima for that trigger. The system then compiles a new method for that selector into the anima. For example, assume that one wishes to animate the swap of two elements in a list which is part of a larger structure. To do so one would state a trigger constraint in the list object, triggering on the selector "swap:with:", defined in the standard Smalltalk system in class SequenceableCollection. Note that there may be other lists in the object which may be not animated to avoid screen clutter. One does not wish to change the behavior of all lists, but only this particular list. If the path to the ready list is, for example, "thing sim Kernell readyList1 list," then a new method will be compiled into the anima with the selector "thingsimkernel1readyList1listswap:with:" which instantiates a pair of Trajectories, asks them to enqueue their events, and then performs the primative swap:with: method on the list. This arrangement requires that any method sending the message "swap:with:" to this list must be relocated so that it employs the extended selector in order to ensure constraint satisfaction. This bit of book keeping is facilitated by a standard Smalltalk system utility that returns a list of message selectors used by a method which can be checked at compile time against a list of triggers.

Relocation functions are provided by adding protocols to the classes used by the Smalltalk compiler itself. The compiler scans a source method as a string and creates a graph of parse tree nodes representing that method. Thus the compiler uses classes such as AssignmentNode, BlockNode, MessageNode, and VariableNode, all subclasses of ParseNode. Each of these classes are provided with methods as needed to respond to protocols such as "relocatePaths: aPathPrefix" which typically will perform a local change to create a new selector by concatenating "aPathPrefix" onto the original selector. The relocation message and path extension are then recursively passed down to descendant nodes in the parse tree, such as to arguments or subexpressions. The processing is thus distributed among objects which perform relatively simple local transformations, and complexity is dealt with in the recursive calls. Each node in this recursive calling sequence returns a new structure with the alterations in place, and these returned structures are assembled into the new transformed MethodNode.

Once methods have been relocated, the selectors that have been designated triggers in TriggerConstraints require special treatment. Without any special treatment, a message such as "listswap: t1 with: t2," would relocate into something like "thing simKernell readyList1 list swap: t1 with: t2". In other words, the reference to the variable "list" is relocated but nothing is done to the selector. But since this selector is to trigger a response, that response has recompiled into the anima under a new selector, such as "thingsimkernel1readyList1list.swap:with:" which does the swap as well as enqueuing the required responses.

Thus during the process of relocation, all designated trigger selectors and the paths to the objects in which those selectors will trigger responses are maintained on a list. When these selectors are encountered, they are replaced by new selectors generated by "compressing" the path into the original selector so that the proper method, including the response, is executed. This compression is accomplished in a manner similar to relocation, by adding methods for the protocol "compressTrigger:triggers" to a number of compiler ParseNode classes. Here "triggers" is a list of selectors and associated paths to parts where those selectors are defined to be triggers. Thus, for example, a MethodNode instance responds to this protocol by testing whether "triggers" includes the selector of that MethodNode instance. If so the method is redirected to the anima (i.e., the receiver is assigned to be "self") and the selector is extended by concatenating the path to the defining part to the selector. Then the "compressTrigger:" message is recursively sent to the arguments to the method (which may be expressions). If the MethodNode selector is not among the triggers, then the selector is left as is, and the "compressTrigger:" message is simply passed to both the receiver expression and the arguments.

SUMMARY EXAMPLE

In order to summarize and clarify the above discussion, it will be useful to present in full the results of method relocation for the previously discussed sorting example of FIGS. 9-13. Recall that the animation flashes the bars representing magnitudes upon comparison and then moves the bars smoothly and simultaneously to show swaps. The algorithmic code contained in the "kit" component SortQueue is coded in a straightforward manner in Smalltalk as follows:

selectionSort
|least|

```
        (1to: list size) do: [:i|
            least ← i.
            (i+1 to: list size)
            do: [:j | (list compare: least with: j) ifTrue:
            [least ← j]].
            least = i
                ifFalse: [list swap: i with: least]]
```

In addition the SortQueue component defines two trigger constraints.

```
TriggerConstraint owner: SortQueue prototype
    to: 'list 'trigger: #compare: with: causes:
        '(Flasher with: (list at: a1)) enqueueEvents.
        (Flasher with: (list at: a2)) enqueueEvents'
TriggerConstraint owner: SortQueue prototype
    to: 'list' trigger: #swap: with: causes:
        '(Trajectory with: (list at: a1)
        destination:(list at:a 2)) enqueueEvents)
        (Trajectory with: (list at: a2)
        destination: (list at: a1)) enqueueEvents)
```

When a SortQueue is inserted as a part of a structure and the anima of that structure is initialized, there will be defined in the class of that anima the method:

```
thingsortQueue3list.selectionSort
    |t1 t2 t3|
    (1 to: thing sortQueue3 list size)
    do: [:t2 |
        t1 ← t2
        (t2 + 1 to: thing sortQueue3 list size)
            do: [: t 3|
                (self thing sortQueue3 list.compare: t1 with: t3)
                ifTrue: [t1 ← t3]]
        t1 = t2
        ifFalse:
        [self thingsortQueue3list.swap: t2 with: t1]].
    self tick: 1.
    ↑ nil
```

Since this method is generated by the system and there is no corresponding source code, the local variables t1, t2, etc. are generated in the decompilation of the compiled method. There are three significant differences to notice between this method and the kit component method. The first is the path extension to all references to local instance variables, as indicated for the variable "list" in this example. Next, the designated trigger selectors have been extended by concatenating the path extension to the original selector in the same way that the "selectionSort" selector itself was changed. Finally an explicit tick message has been inserted to insure that enqueued events occur.

Furthermore the new method called by the method above will be defined in the anima so that they include the specified responses:

```
thingsortQueue3list,swap: t1 with: t2
    (Trajectory with: (thing sortQueue3 list at: t1)
        destination: (thing sortQueue3 list at: t2))
        enqueueEvents.
    (Trajectory with: (thing sortQueue3 list at: t2)
        destination: (thing sortQueue3 list at: t1))
        enqueueEvents.
    selftick: 1
    ↑ thing sortQueue3 list swap: t1 with: t2
thingsortQueue3list.compare: t1 with: t2
    (Flasher with: (thing sortQueue3 list at: t1)
        enqueueEvents.
    (Flasher with: (thing sortQueue3 list at: t2)
        enqueueEvents.
    selftick : 1
    ↑ thing sortQueue3 list compare: t1 with: t2
```

Again notice that the system has inserted the "selftick:" message so that the newly enqueued events are executed forthwith.

Responses

The specification and activation of a temporal constraint involves the realization of a response. Responses in Animus are implemented by classes that are subclasses of the abstract superclass Response. TimeDifferentialConstraints which model continuum processes cause instantiation of ImmediateResponses which are the closest thing to the instantaneous reactions of the continua being modeled. TriggerConstraints often cause more elaborate responses such as instances of Flasher, or Trajectory, detailed hereinbelow. An instance of class Response is an object that represents an abstraction of the event sequence. The particular sequence is generated when the Response is realized by sending it the message "enqueueEvents," or more generally "enqueueEventsAt: aShift with: aStretch," where the parameters are temporal translation and scaling respectively. All instances of response classes understand these messages and react by generating an event stream and placing it time-ordered into the event-queue. The parameters "aShift" and "aStretch" are defaulted to zero and one respectively in the simpler message "enqueueEvents," that is the event stream is to start immediately and to be of the standard duration. Responses can also be realized which are given other parameters such as the object whose image is to be moved. Maintaining descriptions of responses in relatively abstract terms in these classes, rather than concretely instantiated, allows greater flexibility. For example a simple parameter may determine whether an icon is to move along a trajectory in constant time, or at a constant velocity.

Finally, a TriggerConstraint may be created without using the convenience of abstract Responses at all, but rather a "causes:" field may be filled with a string of arbitrary Smalltalk expressions. This is the means by which an arbitrary algorithm may be specified, as in the sorting examples.

Scripts

Any animation system should be able to perform a sequence of actions according to some predefined script. A response of class Script is initialized with a pointer to a file containing an array of strings which can be compiled into messages to create new events. For example, in the previously described Monitored Producer-Consumer animation, one might like the producer and consumer to autonomously produce and consume at certain times according to scripts, rather than the user having to send individual messages to initiate each production and consumption. Thus such a Producer prototype contains the constraint:

```
TriggerConstraintowner: Producer prototype
    to: 'self' trigger: #runScript
    causes:'(Script fromFile: "ProducerScript")
    enqueueEventsTo: self'
``` where the file "ProducerScript" contains strings like:

```
#('Event new atTime: 1 receiver: self
    selector: #produce arguments: #()'
'Event new atTime: 4 receiver: self
    selector: #produce arguments: #()').
```

Each of these events so described in the file must be recompiled and redirected so that at compile time the constraint holds an array of Smalltalk parse trees representing messages to be received by the anima of the Monitored Producer-Consumer animation. Selectors "thingproducer3.produce" are extended to reflect the contexts, and the time stamps are shifted relative to the current time. Notice that the events are rerouted through the anima since that is where the graphical responses have been compiled. That is, the constraint,

```
TriggerConstraint owner: Producer prototype
    to: 'self' trigger: #produce
    causes:' (Trajectory with:
        (Lozenge
            form: (Form dotOfSize: 20)
            frame: (frame corner extent: 20@20)
            label: currentDatum)
        destination: dataLead node) enqueueEvents',
``` has led to the compilation into class MPCAnima of the method,

```
thingproducer3.produce
    (Trajectory with:
        (Lozenge
            form: (Form dotOfSize: 20)
            frame: (thing producer3 frame corner
                extent: 20@20)
            label: thing producer3 currentDatum)
        destination: thing producer3 dataLead node)
            enqueueEvents.
    self tick: 1.
    ↑ thing producer3 produce.
```

This method includes the desired graphical response. To have sent the "produce" message directly to the Producer would effectively subvert the temporal constraint mechanism.

Sequences

Sequences are used when the desired animated effect cannot be simply achieved by making an icon move across the screen, but rather requires that the icon change shape, as for instance when an icon in the form of a human "walks" across the screen. Like a Script, a Sequence is initialized with a pointer to a file containing an array of bitmaps and at compile time these bit maps are stored into the constraint whose response is the sequence. Since the realization of a Sequence does not involve message passing like Scripts, but only display of the bitmaps, there is no need at compile time for methods to be relocated.

Immediate Responses

In a continuum process described by a time differential constraint, the changes so specified occur instantaneously, allowing one to write an equation such as $i = dq/dt$, which in the real world is true at all infinitesimal instants. In the digital world this must be modeled by a sequence of assignments and a finite time granularity. Thus the satisfaction of a TimeDifferentialConstraint, which will be assured at every increment of the clock, involves the instantiation of an ImmediateResponse. An instance of ImmediateResponse enqueues a single event to cause the change specified by the constraint, such as decrementing the charge on the capacitor by $i*dt$ in the RC circuit. Note that since the increment to the charge calculated at time "to", namely $dq = i*dt$, is assigned in the next instant, time "to $+dt$", the essential feature of the approximation has been achieved, the "derivative" value (current) has been considered good for the duration of the time interval in order to get a first approximation to the new value of the differential variable, that charge, after which other values are adjusted according to the constraints for static consistency. This serves to break the instantaneous circular dependency implied in the constraint equation, that the charge depends upon the current which in turn depends upon the charge.

Trajectories

The abstraction of the function of moving icons across the screen is implemented by the class Trajectory. An instance of class Trajectory is created by specifying at least the object whose image is to be moved, and where it is to move. Additional instance creation messages may also specify how it is to move, for example at constant velocity or along a curved path. But the default is that the icon will be moved in constant time, that is, in a constant number of steps along a straight line between its original position and the destination. Trajectories with as many as ten steps and as few as four have been tested. More steps create smoother movements, but typically four steps seem adequate to provide the illusion of smooth motion, the eye seeming to do the interpolation on its own, with only the barest suggestion of intervening positions. The motivation for using fewer steps is that in some cases where a single triggered constraint causes the instantiation of four or five trajectories interleaved at the same time, there is a noticeable delay while forty or fifty events are created, initialized and inserted time-ordered into the eventQueue.

A non-trivial feature of the behavior required of trajectories is that they should not spoil the display as they move across it, but should create the illusion that an icon being moved slides over the display. This means that upon initialization, a trajectory must store a picture of the background of the region across which it will travel and then, at each step of the way it must restore the portion of background upon which the icon had been sitting.

Flashers

Class Flashers provides another useful animation response. A Flasher is instantiated by simply specifying the region of the screen, a rectangle, that is to flash. An instance of Flasher then responds to the message "enqueueEvents" by creating and enqueuing a series of events that will flash the region on the screen. In the previously described sorting algorithm this response is used to point out the bars whose heights are being compared.

User Interface

The user interface to Animus is similar to the ThingLab interface with a few possible changes and additions. The classes AnimusBrowser and AnimusBrowserView are subclasses of ThinglabBrowser and ThinglabBrowserView respectively. The principal desirable difference consists in the addition of a number of "Tools" which appear as items in the third pane of the browser. These tools, described hereinbelow, pertain to the management of simulation time, editing and message sending to parts, and the addition of elements to indexed parts, i.e. lists.

The most fundamental addition to the set of browser tools is the class Driver which is activated by selecting the item "go" in the third pane of the browser. The basic function of the driver is to repeatedly send "tick:dt" messages to the anima of the selected prototype. It has proven useful to add to river capabilities to recognize when a tick of the clock entails no graphical change so that redrawing can be suppressed, significantly improving the response of some simulations. Also it is useful to have the driver check for user input requests at each tick. Driver is a subclass of the ThingLab class Tool and inherits from it the basic scheduling protocols. When the browser is started up, the selected tool executes the method:

```
startUp
    self firstime ifFalse: [ ↑ false].
    [self eachtime] whileTrue.
    ↑ self lasttime.
```

This method allows the elected tool to define particular prelude, execution loop and postlude functions. In response to the "firstime" message, a Driver sends the message "selection anima initialize." This will not necessarily cause the anima to reinitialize and perform the involved method relocation for temporal constraints since the anima keeps an instance variable initialized which is set true upon initialization and reset false when any structural changes are made which would require recompilation of constraint methods. This is to avoid unnecessary recompilation every time the simulation is restarted when no structural changes have been made.

The method "eachtime" defined in Driver sends the selection's anima the message "tick": selection anima deltaT. The time increment is also stored as an instance variable in the anima so that the user may adjust the "granularity" of the animation. The input Sensor (i.e., the Smalltalk object representing the mouse and its state) is then checked to see if the appropriate mouse button is pressed, and if so a pop-up menu is presented for the user to send a message to the selection.

Generality requires that the menu and its actions be defined by the particular thing being displayed, since different user interactions are appropriate for different simulations. However, the selected prototype has been constructed graphically from kit components, and the user has had neither the means nor the opportunity to define menus and their functions. These menus are predefined in the kit components. All that is known in advance about a newly created object is that it is a subclass of AnimusObject. Thus the desired behavior is achieved by defining the protocol "getMenu" in AnimusObject that queries its parts and constructs a menu containing items for interactions with any component kit parts that have such interactive capabilities defined in them.

Finally a Driver keeps a Boolean variable "picturesChanged" set by any response event that moves components around on the screen so that a picture buffer update and redisplay is needed. Otherwise if nothing has happened to alter the picture since the last tick, redrawing is omitted. In some cases it is desirable to be able to directly set the absolute value of time, rather than to simply increment it. This is not generally possible for animations whose state is generated incrementally, but rather only for those whose state is strictly determined as a direct function of time. The system provides the class Setter, a subclass of class Tool which is activated when the user selects "settime" in the third pane of the browser.

A Ticker tool is selected via the item "tick size" in the third pane of the browser and allows the user to adjust the granularity of the time increment that is sent with each new tick message to the anima. Like the Setter this tool prompts the user for a new value in a pop-up window, and whatever the user accepts in that window is assigned as the new value of the time increment used by the anima in "tick:" messages.

Algorithm animation applications typically display data structures such as lists, or arrays, or in Smalltalk terminology, "indexed parts". Smalltalk makes a fundamental distinction between objects whose parts are named instance variables and those whose parts are unnamed and accessible by index. The difference implies that when a user builds an object in Animus, he can either insert a new part as a new named instance variable, or he may add elements to an already present indexed structure such as a list. It happens that protocols provided by ThingLab only allow access to named part via path names such as "circuit capacitor2 lead1 node voltage." But what about a path like "OS kernel pauseQueue2 list4 processPriority," where the "4" refers to the fourth indexed Process in the List managed by a PauseQueue in the OS kernel? Since in ThingLab, interpretation of a path to a part involves the performing of the name as the selector of a message sent (the access functions to named parts already having been automatically compiled into prototypes) this involves the overriding in Animus of the rather fundamental Smalltalk protocol in class Object, "perform: aSelector with: arguments." This method (a primitive) is provided with additional code (should the primitive fail) to interpret a SmallInteger such as 4 as the name of a message selector which returns the fourth indexed part. The interface offers access to indexed parts through class Sticker (detailed in Appendix I), a tool which one selects by choosing "add" in the third pane of the browser. This tool allows the user for example to graphically add elements to an array to be sorted.

A tool called a Kicker (detailed in Appendix I) allows one to send a message to an object on the screen, such as to tell a particular array to sort itself. The choice of "send message" in the third pane, like the ThingLab tool "move," flashes an image of the prototype of the thing to receive the message. The prototype image sticks to an instance on the screen of that type, and the selected instance thereupon relocates into the anima the methods of any triggered selectors. These are the messages one is then allowed to send to that instance, and the user is offered a pop-up menu from which he may select one of the messages. This mechanism underlies the starting up of the previously described sorting example.

Class Picker (detailed in Appendix I) provides the mode of interaction one expects from selecting "edit" in the third pane of the browser. Like the Kicker, Picker shows the user a flashing image of the prototype of the thing one wants to edit which sticks to an instance of that prototype. Thus having made the choice, Animus takes advantage of the general SmallTalk class Inspector, and simply opens up a system inspector on the instance chosen.

SYSTEM OPERATION SUMMARY

Figure 18:
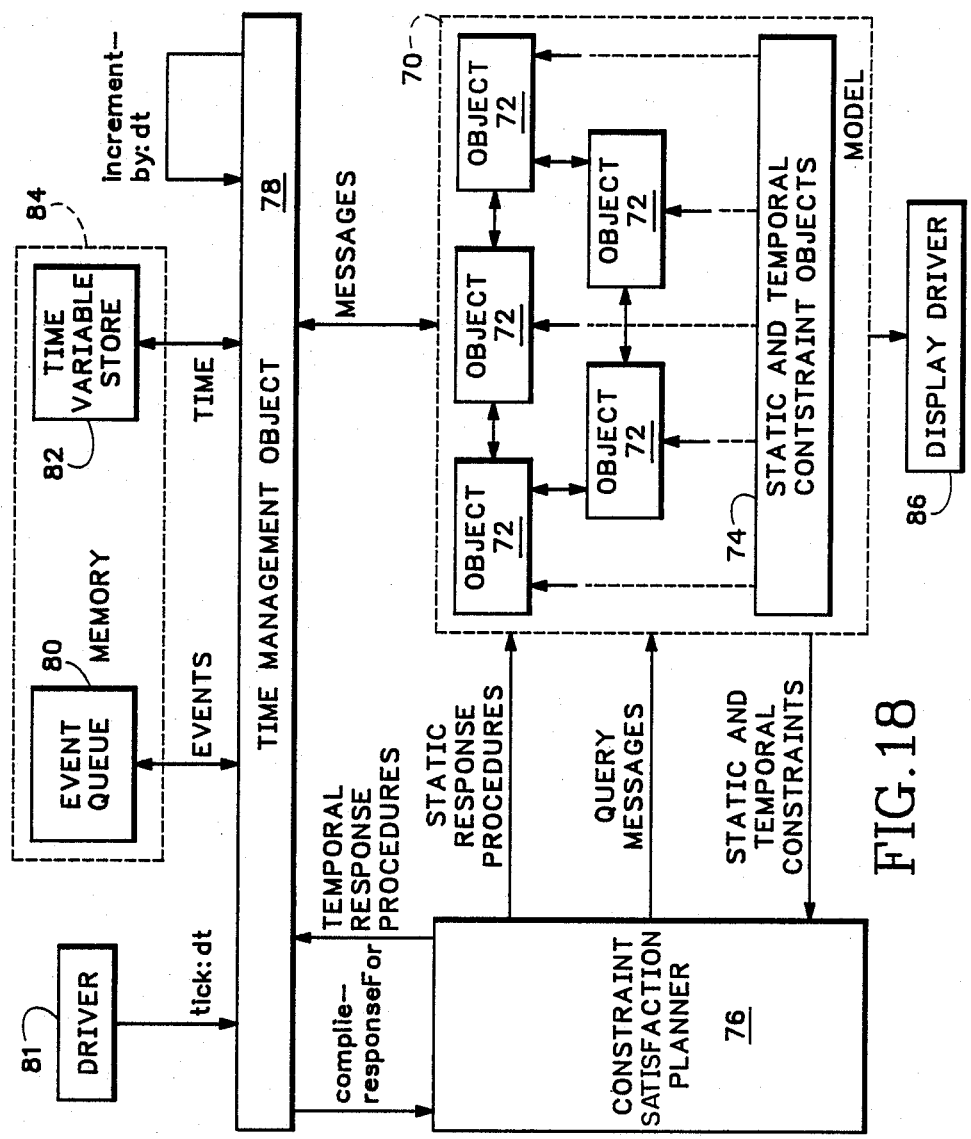
FIG. 18 is a software block diagram of the present invention.

FIG. 18 is a block diagram illustrating organization of software implementing the program animation system of the present invention. A model 70 consists of a group of objects 72 interacting with each other by passing messages 73. Each model object 72 comprises one or more static and/or temporal constraint objects 74 describing the behavior of the model object 72 according to a set of constrains on its behavior. (Dotted arrows in FIG. 18 indicate that various constraint objects 74 are part of model objects 72.) At compile time a constraint satisfaction planner 76 queries objects of model 70 to ascertain static and temporal constraints on the behavior of objects 72 of model 70 and then compiles and returns to objects 72 one or more static response procedures enabling the model to satisfy its static constraints. Planner 76 also compiles temporal response procedures for a time management object 78. At run time, the time management object 78 responds to a tick: dt message from driver 81 by executing a temporal response procedure provided by planner 76. In doing so, the time management object may send messages referenced by events in event queue 80 to model 70, increments a time variable 82, and stores other events in the event queue. The event queue 80 and time variable 82 are stored in a memory 84.

Figure 19:
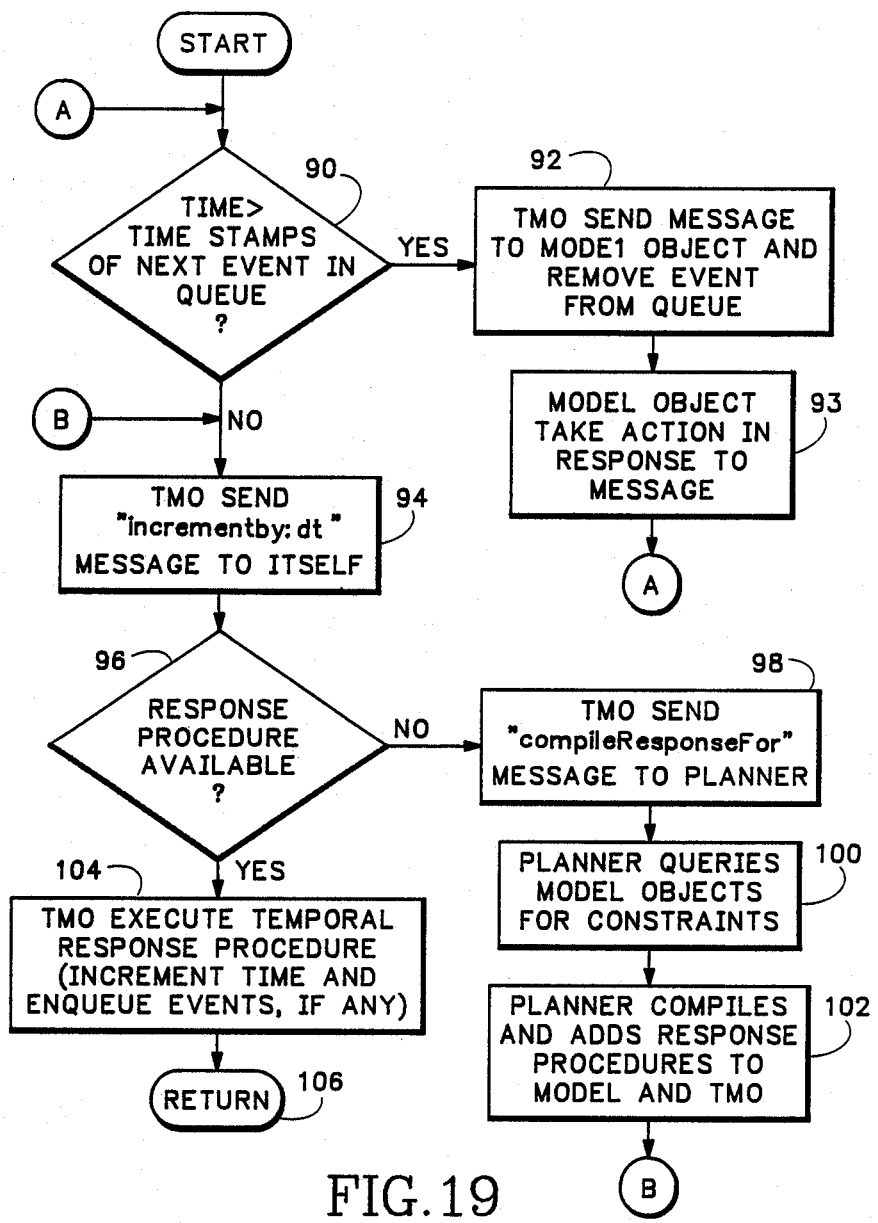
FIG. 19 is a flow chart illustrating the sequence of operations performed by the time management object of FIG. 18.

FIG. 19 is a flow chart illustrating operation of the system of FIG. 18 in response to a tick: dt message from driver 81. Referring to both FIGS. 18 and 19, the driver 81 begins sending tick: dt messages to the time management object when the user selects the "go" browser item. In response to the first tick: dt message, the time management object 78 compares the time variable to the time stamp of the first event in the event queue (if any) to determine if the time stamp indicates a time later than the time indicated by the time variable (step 90). On system startup, when the first tick: dt message is sent, no events are stored in the event queue, and therefore the result of the test of step 90 is "NO". Thereafter, the time management object 78 sends an incrementby: dt message to itself (step 94).

At this point, the time management object determines whether it has a procedure available for responding to the incrementby: dt message (step 96). Initially, the time management object does not have such a procedure, and on failing to find such a procedure, the time management object (TMO) sends a compile Response for message to planner 76 (step 98). Accordingly, planner 76 sends query messages to objects 72 of model 70 requesting these objects to return code fragments representing their static and temporal constraints (step 100). The planner 76 then determines static response procedures for objects 72 and temporal response procedures for time management object 78 which enable the future behavior of model 70 to satisfy the static and temporal constraints (step 102). The static response procedures are added to objects 72 and the temporal response procedures are added to time management object 78. One of the temporal response procedures added to time management object 78 is a procedure for responding to the increment by: dt message.

After planner 76 completes its response to the compile Response for message from time management object 78, the time management object again sends itself the incrementby: dt message (step 94). The time management object now has available a temporal response procedure resulting from the increment by: dt message and it executes that procedure (step 104). In executing the procedure, the time management object 78 increments the value of the time variable 82 stored in memory 80 and may enqueue various events in the event queue 80. Each "event" stored in the event queue includes a representation of a message that the time management object 78 is to send to model 70 at some future time. Each event also includes a time stamp indicting the future time at which the message is to be sent. When the time management object 78 completes its response to the increment by: dt message (step 104), it has also done so with respect to the tick: dt message from driver 81. It returns an acknowledgment of completion to the driver (step 106).

When driver 81 subsequently sends another tick: dt message to the time management object 78, the tie management object checks the time stamp of the first in the queue 80 (step 90) to determine if the time stamp represents a time earlier to equal to the time represented by the time variable 82. If so, the time management object sends a message referenced by the first event if the event queue to an object 72 of model 70 and removes the event from the queue (step 92). The receiving model object 72 replies to the message by executing a static response procedure referenced by the message, the procedure having been previously complied by planner 76. In executing the static response procedure the receiving object 72 carries out some action (step 93) such as altering variables controlling an animated display on a computer terminal screen via a display driver 86, or such as transmitting a message to another object 72 telling it to execute yet another static response procedure. A static response procedure may also cause an object 72 to send a message to the time management object 78 telling it to execute a temporal response procedure whereby it places additional events into the vent queue 80.

Once the model 70 has fully responded to the message from the time management object 78 (step 93), the time management object checks the time stamp associated with the next event in the event queue 80 (step 90). The system continues to loop through steps 90, 92 and 93 until the time management object has sent a message referenced by each event in the event queue having a time stamp representing a time earlier or equal to the time according to the time variable 82. At this point, the time management object sends the increment by: dt message to itself (step 94). Since the response procedure has been previously complied by planner 76, the time management object passes through step 96 to step 104 where it executes the procedure, thereby incrementing time and placing events referenced by the procedure (step 104) into the queue. The response to the tick: dt message then terminates (step 106).

Thus according to the present invention the temporal behavior of a model embodied within an object oriented computer programming system is controlled by a time management object which increments a simulation time by adjusting the value of a variable representing time and which maintains an eventqueue for storing time stamped representations of messages to be sent to the model. The time management object is further adapted to transmit any message representation in the eventqueue to the model when the time represented by the time variable surpasses the time indicated by messages's time stamp and the model is made to respond to a triggering event in a temporal fashion by storing one or more time stamped message representations in the eventqueue so that as the time management object increments the time variable, the messages described by the events ar sent in time stamped order.

APPENDIX I
ANIMUS LISTING
Copyright (c) 1986, Tektronix, Inc.
All rights reserved.

——————————— Things put: IdentityDictionary new! ———————————

Smalltalk at: #Things put: IdentityDictionary new!
Smalltalk at: #ThingDefinitions put: IdentityDictionary new Things put: IdentityDictionary new!

——————————— AccessPath ———————————

AccessPath

Animus-compiling· extendedSelector: aSymbol
    "*this is just like extendSelector but with a : on the end*"
    | wStrm rStrm|
    wStrm ← String newWriteStream: 200.
    rStrm ← aSymbol readStream.
    (rStrm upTo: $.) do:
        [:c | wStrm nextPut: c.].
    (names copyFrom: 1 to: names size) do:
        [:n | wStrm nextPut: $. . wStrm nextPutAll: n].
    rStrm atEnd ifFalse: [wStrm nextPut: $.].
    [rStrm atEnd] whileFalse: .[wStrm nextPut: rStrm next].
    wStrm nextPut: $: .
    ↑wStrm contents asSymbol extendedSelector:

extendSelector: aSymbol
    | wStrm rStrm period |
    wStrm ← String newWriteStream: 200.
    rStrm ← aSymbol readStream.
    (period ← aSymbol includes: $.)
        ifTrue: [(rStrm upTo: $.) do:
            [:c | wStrm nextPut: c.]].
    (names copyFrom: 1 to: names size) do:
        [:n | period ifTrue: [wStrm nextPut: $. ]. wStrm nextPutAll: n].
    rStrm atEnd ifFalse: [wStrm nextPut: $.].
    [rStrm atEnd] whileFalse: [wStrm nextPut: rStrm next].
    ↑wStrm contents asSymbol extendSelector:

incrementLast
    | strm |
    strm ← String newWriteStream: 200.
    (names copyFrom: 1 to: names size-1) do:
        [:n | strm nextPutAll: n. strm space].
    strm nextPutAll: 'increment.'.
    strm nextPutAll: names last.
    strm nextPut: $:.
    ↑strm contents incrementLast

Animus-compiling

AccessPath incrementSelector incrementSelector

```
| strm |
strm ← String newWriteStream: 200.
strm nextPutAll: 'delta.'.
(names copyFrom: 1 to: names size-1) do:
    [:n | strm nextPutAll: n. strm nextPut: $.].
strm nextPutAll: names last.
strm nextPut: $:.
↑strm contents
``` incrementSelectorWithHead: aString                                      incrementSelectorWithHead:
```
| strm |
strm ← String newWriteStream: 200.
strm nextPutAll: aString.
(names copyFrom: 1 to: names size-1) do:
    [:n | strm nextPutAll: n. strm nextPut: $.].
strm nextPutAll: names last.
strm nextPut: $:.
↑strm contents
``` setLast                                                                  setLast
```
| strm |
strm ← String newWriteStream: 200.
(names copyFrom: 1 to: names size-1) do:
    [:n | strm nextPutAll: n. strm space].
strm nextPutAll: 'set.'.
strm nextPutAll: names last.
strm nextPut: $:.
↑strm contents
```

Animus-testing contains: other                                                          contains:
```
self isEmpty ifTrue: [↑false].
↑(self within: other) notNil or: [self tail contains: other]
```

---------------- ActionMenu ----------------

Animus                                                                    ActionMenu selectors                                                                    selectors
    ↑selectors

AssignmentNode

---------------- AssignmentNode ----------------

AssignmentNode
Animus compressTrigger: triggers encoder: encoder                                   compressTrigger:encoder:
    ↑AssignmentNode new
        variable: variable
        value: (value compressTrigger: triggers encoder: encoder)
        from: encoder ---------------- BlockNode ----------------

BlockNode

Animus add: aMessageNode
  |newStatements|
  newStatements ← statements copyFrom: 1 to: statements size - 1.
  newStatements addLast: (ReturnNode new expr: aMessageNode).
  *"newStatements addLast: statements last."*
  statements ← newStatements compressTrigger: triggers encoder: encoder
  ↑BlockNode new
    arguments: (arguments collect: [: a | a compressTrigger: triggers encoder: encoder])
    statements: (statements collect: [: s | s compressTrigger: triggers encoder: encoder])
    returns: false from: encoder sourceEnd: 1 penultAdd: aMessageNode
  |newStatements|
  newStatements ← statements copyFrom: 1 to: statements size - 1.
  newStatements addLast: aMessageNode.
  newStatements addLast: statements last.
  statements ← newStatements preAdd: aMessageNode
  |newStatements|
  newStatements ← statements copyFrom: 1 to: statements size.
  newStatements addFirst: aMessageNode.
  statements ← newStatements add:

compressTrigger:encoder:

penultAdd:

preAdd:

Boolean

——————————— Boolean ———————————

Animus isBoolean
  ↑true

Boolean isBoolean

——————————— Collection ———————————

Animus compare: i with: j
  ↑(self at: i) value > (self at: j) value maxSize
  *"Answer the largest basicSize which is valid for the receiver's class.*
  *Should answer infinity, but this is close enough."*

↑self class maxSize *"for 16 bit 4404"* perform: aSymbol
  *"Send the receiver the unary message indicated by the argument. The argument is*
  *the selector of the message. Invoke messageNotUnderstood: if the number of*
  *arguments expected by the selector is not zero.*

*"Modified for animus access to indexed parts"*

(self isEmpty not and: [aSymbol class = SmallInteger]) ifTrue: [↑self at: aSymbol].
  *"<primitive: 83>"*
  ↑nil *"self perform: aSymbol withArguments: (Array new: 0)" "old default"*

Collection compare:with:

maxSize perform:

_____ Constraint _____

Animus-testing                                                                 Constraint isTemporal                                                        isTemporal
      ↑false methodTrees                                                       methodTrees
      ↑methodTrees ruleTree                                                          ruleTree
      ↑ruleTree Encoder _____ Encoder _____

Encoder
Animus nTempsIncrement                                                   nTempsIncrement
      nTemps ← nTemps + 1 scopeTable                                                         scopeTable
      ↑scopeTable _____ FieldDescription _____

FieldDescription
Animus isIndexed                                                          isIndexed
      *"return true if I hold an indexable part - default is that I do not"*
      ↑ false _____ Form _____

Form
Animus form                                                               form
      ↑self frame                                                              frame
      ↑Rectangle origin: 0@0 extent: self extent from: aForm in: aRectangle                                         from:in:
      *"Create a virtual bit map from a user specified rectangular area in aForm.*
      *Reallocates bitmap only if aRectangle ¬= the receiver's extent."*

(width = aRectangle width and: [height = aRectangle height])
         ifFalse: [self extent: aRectangle extent].
     self
         copyBits: (aRectangle origin extent: self extent)
         from: aForm
         at: 0 @ 0
         clippingBox: Display boundingBox
         rule: Form over
         mask: Form black showsHistory                                                       showsHistory
      ↑true ——————————— Form class ———————————

Form class

Animus dotOfSize: diameter dotOfSize:

"*Create a form which contains a round black dot.*"

| radius form bite circle |
radius ← diameter//2.
form ← self new extent: diameter@diameter offset: (0@0) - (radius@radius).
diameter <= 32 ifTrue: "*special case for speed*"
    [form black.
    diameter <= 2 ifTrue: [↑form].
    bite ← diameter//3.
    form white: (0@0 extent: bite@1).
    form white: (0@(diameter-1) extent: bite@1).
    form white: (diameter-bite@0 extent: bite@1).
    form white: (diameter-bite@(diameter-1) extent: bite@1).
    form white: (0@0 extent: 1@bite).
    form white: (0@(diameter-bite) extent: 1@bite).
    form white: (diameter-1@0 extent: 1@bite).
    form white: (diameter-1@(diameter-bite) extent: 1@bite).
    ↑form].

radius ← diameter-1//2. "*so circle fits entirely*"
(Circle new center: radius@radius radius: radius) displayOn: form.
form convexShapeFill: Form black. "*fill the circle with black*"
↑form "*(Form dotOfSize: 20) displayAt: Sensor cursorPoint*"

dotWith: aCharacter dotWith:

| aForm |
aForm ← self dotOfSize: 32.
aCharacter asSymbol asString asDisplayText displayOn: aForm at: 8@8.
↑aForm ——————————— Integer ———————————

Integer

Animus asPath asPath

↑AccessPath new names: (Array with: self)

——————————— MessageNode ———————————

MessageNode

Animus compressTrigger: triggers encoder: encoder compressTrigger:encoder:

(triggers includes: selector key) ifTrue:
        [↑MessageNode new
            receiver: (encoder encodeVariable: 'self')
            selector: (receiver asPath extendSelector: selector key)
            arguments: (arguments collect: [: a | a compressTrigger: triggers encoder: encoder])
            precedence: precedence
            from: encoder]

```
ifFalse: [↑MessageNode new
        receiver: (receiver compressTrigger: triggers encoder: encoder)
        selector: selector key
        arguments: (arguments collect: [: a | a compressTrigger: triggers encoder: encoder])
        precedence: precedence
        from: encoder]
``` key                                                                                               key ↑self asPath applyTo: TheBrowser prototype anima ────────────── MessagePlan ──────────────

MessagePlan

Animus

```
code: encoder                                                                                  code:
    | sel |
    compileTimeOnly ifTrue: [↑encoder encodeVariable: 'nil'].
    sel ← self selector.
    ↑MessageNode new
        receiver: (receiver code: encoder)
        selector: sel
        arguments: (arguments collect:
            [: a | a class = String ifTrue: [encoder encodeVariable: a]
                                    ifFalse: [encoder encodeLiteral: a]])
        precedence: sel precedence
        from: encoder
```

────────────── MethodNode ──────────────

MethodNode

Animus

```
compressTrigger: triggers encoder: passedEncoder                          compressTrigger:encoder:
    ↑MethodNode new
        selector: selectorOrFalse
        arguments: arguments
        precedence: precedence
        temporaries: temporaries
        block: (block compressTrigger: triggers encoder: passedEncoder)
        encoder: passedEncoder
        primitive: primitive relocate: aPathPrefix                                                                     relocate:
    ↑self selector: (aPathPrefix extendSelector: self selector)
        arguments: arguments precedence: precedence
        temporaries: temporaries
        block: (block relocatePaths: aPathPrefix encoder: encoder)
        encoder: encoder primitive: primitive relocatePaths: aPathPrefix encoder: anEncoder                              relocatePaths:encoder:
    ↑self selector: (aPathPrefix extendSelector: self selector)
        arguments: (arguments do: [: a | a relocatePaths: aPathPrefix encoder: anEncoder])
        precedence: precedence
        temporaries: (temporaries do: [: temp | (encoder scopeTable includesKey: temp key) ifFalse: [encoder
bindTemp: temp key]])
        block: (block relocatePaths: aPathPrefix encoder: anEncoder)
        encoder: anEncoder primitive: primitive
``` relocatePaths:part:encoder:

relocatePaths: aPathPrefix part: aPathSuffix encoder: anEncoder

```
↑self selector: ((aPathPrefix concat: aPathSuffix) extendSelector: self selector)
    arguments: (arguments do: [: a | a relocatePaths: aPathPrefix encoder: anEncoder])
    precedence: precedence
    temporaries: (temporaries do: [: temp | (encoder scopeTable includesKey: temp key) ifFalse: [encoder
bindTemp: temp key]])
        block: (block relocatePaths: aPathPrefix encoder: anEncoder)
        encoder: anEncoder primitive: primitive
```

---

_____ Object _____

Object

Animus constraints compileSmashCodeFor: sel fields: fields compileSmashCodeFor:fields:

*"compile code to change the values of some of my parts.*
*other parts may need to be altered to satisfy constraints.*
*sel should be of the form*
*    smash.part1.subpart: part2.subpart.subsubpart: part3:*
*fields is a collection of arrays of my field properties corresponding to*
*those subparts to be set"*

```
| planner encoder args statements fs tempName arg changeMessage
    setSel setNode returnNode block methodNode |
planner ← AnimusSatisfactionPlanner for: self message: sel.
encoder ← planner encoder.
args ← OrderedCollection new.
statements ← OrderedCollection new.
1 to: fields size do:
    [: i | fs ← fields at: i.
    tempName ← 't' , i printString.
    arg ← encoder bindTemp: tempName.
    args add: arg.
```
*"make a message that describes the change being made, tell the planner about it,*
*and add methods from affected constraints.*
```
    changeMessage ← MessagePlan new
        context: self
        receiver: (fs collect: [: f | f name]) asPath
        constraint: nil
        owner: EmptyPath
        keywords: #('alter')
        arguments: #()
        uniqueState: true
        referenceOnly: false
        compileTimeOnly: true.
    planner add: changeMessage.
    changeMessage addMethods: planner].
```
*"delete duplicate messages"*
```
planner deleteDuplicates.
```
*"first add a set statement to to collection of statements"*
```
setSel ← ('set' , (sel copyFrom: 7 to: sel size)) asSymbol.
setNode ← MessageNode new
    receiver: (encoder encodeVariable: 'self')
    selector: setSel
    arguments: args
    precedence: setSel precedence
    from: encoder.
statements add: setNode.
statements addAll: (self buildPlan: planner).
returnNode ← ReturnNode new expr: (encoder encodeVariable: 'self').
```

```
statements add: returnNode.
block ← BlockNode new statements: statements returns: true.
methodNode ← MethodNode new selector: sel
    arguments: args precedence: sel precedence temporaries: #()
    block: block encoder: encoder primitive: 0.
methodNode compileIn: self class
``` makeMethodFor: message                                                                                           makeMethodFor:
```
"Compile a method for receiving message"
| planner |
planner ← AnimusSatisfactionPlanner for: self message: message keywords first asSymbol.
message arguments do: [: a | planner encoder bindTemp: a].
self expand: message planner: planner.
"If there is only one message in the planner's queue, and if that
```

Animus constraints                                                                                            Object

```
message doesn't interact with any of my constraints or merges,
then use a simple method."
(self testSimple: planner)
    ifTrue: [↑self simpleMethod: message planner: planner].
"situation not simple - find all the relevant messages. Note that a copy of the
planner is used because stuff is being added during the 'do:' "
planner copy do: [: m | m addMethods: planner].
"delete duplicate messages"
planner deleteDuplicates.
"if there is only 1 message in the planner's queue, use a cheap method"
planner size = 1
    ifTrue: [↑self oneMessageMethod: message planner: planner]
    ifFalse: [↑self complexMethod: message planner: planner]
```

Animus editing ancestral: classNameString                                                                                       ancestral:
```
↑(TheBrowser prototype instancePaths: (Compiler evaluate: classNameString)) first applyTo: TheBrowser
prototype
``` ancestral: classNameString send: selectorString                                                                  ancestral:send:
```
| pathToReceiver |
pathToReceiver ← (TheBrowser prototype instancePaths: (Compiler evaluate: classNameString)) first.
TheBrowser prototype anima perform: (('thing' asPath concat: pathToReceiver) extendSelector: selectorString
asSymbol)
``` ancestral: classNameString send: selectorString with: argument                                                   ancestral:send:with:
```
| pathToReceiver |
pathToReceiver ← (TheBrowser prototype instancePaths: (Compiler evaluate: classNameString)) first.
TheBrowser prototype anima perform: (('thing' asPath concat: pathToReceiver) extendSelector: selectorString
asSymbol) with: argument
``` ancestralAnima                                                                                                   ancestralAnima
```
"looks for any object in the hierarchy which is an instance of a subclass of Anima"
↑(TheBrowser prototype instanceAnimaPaths) first applyTo: TheBrowser prototype
``` animusToolsFor: format                                                                                           animusToolsFor:
```
"return a vector of classes of editing tools"
format isPicture ifFalse: [↑ Array new].
↑ (Array with: Inserter with: Deleter with: Sticker),
    (Array with: Ticker with: Setter with: Driver with: Kicker),
    (Array with: Picker with: Mover with: TextEditor)
``` doNothing                                                                                                        doNothing
```
↑self
``` editor
↑nil expand: message planner: planner                                    expand:planner:

| keyword | keyword = 'moveby:'
    ifTrue: [message receivingObject expandMove: message planner: planner. ↑self].
keyword = 'scaleby:'
    ifTrue: [message receivingObject expandMove: message planner: planner. ↑self].
keyword = 'incrementby:'
    ifTrue: [message receivingObject expandIncrement: message planner: planner. ↑self].
keyword = 'setTo:'
    ifTrue: [message receivingObject expandSetTo: message planner: planner. ↑self].
keyword = 'fixedLocation'
    ifTrue: [message receivingObject expandFixedLocation: message planner: planner. ↑self].
(keyword size > 12 and: [(keyword copyFrom: 1 to: 12) = 'moveInserter'])
    ifTrue: [message receivingObject expandMoveAttacher: message planner: planner attachers: self inserters. ↑self].
(keyword size > 15 and: [(keyword copyFrom: 1 to: 15) = 'moveConstrainer'])
    ifTrue: [message receivingObject expandMoveAttacher: message planner: planner attachers: self constrainers. ↑self].
planner add: message expandIncrement: message planner: planner                            expandIncrement:planner:
"send this message to each of my times
| m |
m ← MessagePlan new context: message context receiver: (message receiver add: #time) constraint: message constraint owner: message owner keywords: message keywords arguments: message arguments uniqueState: message uniqueState referenceOnly: message referenceOnly compileTimeOnly: message compileTimeOnly.
self time expand: m planner: planner the above code should actually only be for Anima. for all else:"
self expandMove: message planner: planner expandSetTo: message planner: planner                                expandSetTo:planner:
planner add: (MessagePlan new
    context: message context
    receiver: message receiver
    constraint: message constraint
    owner: message owner
    keywords: #('primitiveSetTo:')
    arguments: message arguments
    uniqueState: message uniqueState
    referenceOnly: message referenceOnly
    compileTimeOnly: message compileTimeOnly)

getTimeConstraintsOnPath: aPath                                      getTimeConstraintsOnPath:
| constraintsWithPaths |
Transcript show: aPath printString.
    constraintsWithPaths ← OrderedCollection new.
    constraintsWithPaths addAllLast: ((self constraints select: [ :c | c isTemporal]) collect:
      [:c | c path: aPath]).
    self parts with: self partNames do:
      [ : aPart : aName | constraintsWithPaths addAllLast:
        (aPart getTimeConstraintsOnPath: (aPath add: aName))].
↑constraintsWithPaths

Animus editing                                                                Object getTimeConstraintsOnPath: aPath constraints: tConstraints    getTimeConstraintsOnPath:constraints:
  ((self constraints select: [ :c | c isTemporal]) collect: [:c | c copy path: aPath])
        do: [: each | tConstraints add: each.].
  self parts with: self partNames do:
        [ : aPart : aName | aPart getTimeConstraintsOnPath: (aPath add: aName) constraints: tConstraints.].
  ↑tConstraints getTimeConstraintsOnPath: aPath index: index    getTimeConstraintsOnPath:index:
  | constraintsWithPaths idx |
  constraintsWithPaths ← OrderedCollection new.
  idx ← index.
  constraintsWithPaths addAllLast: ((self constraints select: [ :c | c isTemporal]) collect:
        [: c | c path: aPath.
                c animaIndex: idx.
                idx ← idx + 1.
                c]).
  self parts with: self partNames do:
        [ : aPart : aName | constraintsWithPaths addAllLast:
                (aPart getTimeConstraintsOnPath: (aPath add: aName) index:
                        (constraintsWithPaths isEmpty ifFalse: [constraintsWithPaths last animaIndex + 1]
                                ifTrue: [idx]))].
  ↑constraintsWithPaths incrementby: delta    incrementby:
  self interpret: 'incrementby:' with: delta instanceAnimaPaths    instanceAnimaPaths
  "like instancePaths: except uses isKindOf: instead of isMemeberOf:"
  "return a vector of paths to instances of class cl or its subclasses"
  "First check if I'm an instance of cl.
  Find a path to each of my parts which is an instance of cl.
  InstancePathsDict is disabled for Animus since things don't tend to stay put."
  | partsDict paths prefix subPaths strm subPart part |
  (self anima isKindOf: Anima) ifTrue: [↑'anima' asPath].
  partsDict ← IdentityDictionary new.
  self fieldDescriptions do: [: f | f isPart
        ifTrue:
                [subPaths ← (self perform: f name)
                        instancePaths: Anima.
                prefix ← f asPath.
                part ← self instVarAt: f index.
                subPaths do:
                        [: p |
                        subPart ← p applyTo: part.
                        partsDict at: subPart put: (prefix concat: p)]]].
  strm ← Array newWriteStream: 10.
  partsDict do: [: x | strm nextPut: x].
  paths ← strm contents.
  ↑paths

Animus editing    Object instancePaths: cl    instancePaths:
  "return a vector of paths to instances of class cl or its subclasses"
  "First check if I'm an instance of cl.
  Find a path to each of my parts which is an instance of cl.
  InstancePathsDict is disabled for Animus since things don't tend to stay put."
  | partsDict paths prefix subPaths strm subPart part |
  (self isMemberOf: cl) ifTrue: [↑Array with: EmptyPath].
  partsDict ← IdentityDictionary new.
  self fieldDescriptions do: [: f | f isPart
        ifTrue:

```
        [subPaths ← (self perform: f name)
                    instancePaths: cl.
        prefix ← f asPath.
        part ← self instVarAt: f index.
        subPaths do:
            [: p |
            subPart ← p applyTo: part.
            partsDict at: subPart put: (prefix concat: p)]]].
    strm ← Array newWriteStream: 10.
    partsDict do: [: x | strm nextPut: x].
    paths ← strm contents.
    ↑paths
``` instanceSuperPaths: cl                                                instanceSuperPaths:
*"like instancePaths: except uses isKindOf: instead of isMemeberOf:"*
*"return a vector of paths to instances of class cl or its subclasses"*
*"First check if I'm an instance of cl.*
*Find a path to each of my parts which is an instance of cl.*
*InstancePathsDict is disabled for Animus since things don't tend to stay put."*
```
    | partsDict paths prefix subPaths strm subPart part |
    (self isKindOf: cl) ifTrue: [↑Array with: EmptyPath].
    partsDict ← IdentityDictionary new.
    self fieldDescriptions do: [: f | f isPart
        ifTrue:
            [subPaths ← (self perform: f name)
                        instancePaths: cl.
            prefix ← f asPath.
            part ← self instVarAt: f index.
            subPaths do:
                [: p |
                subPart ← p applyTo: part.
                partsDict at: subPart put: (prefix concat: p)]]].
    strm ← Array newWriteStream: 10.
    partsDict do: [: x | strm nextPut: x].
    paths ← strm contents.
    ↑paths
``` offset: aThing                                                              offset:
*"default"*
↑0@0

Animus editing                                                              Object partNames                                                                   partNames
↑(self fieldDescriptions select: [ : f | f isPart]) collect: [ : g | g name]

primitiveSetTo: dt                                                          primitiveSetTo:
    self become: dt tick: delta                                                                 tick:
TheBrowser prototype anima tick: delta

Animus operations

14 aSymbol                                                                  14
*"perform aSymbol, which is a unary selector name, as a binary function"*
↑self perform: aSymbol

Animus testing isAnimusObject                                                              isAnimusObject
↑false

| | OrderedCollection | |
|---|---|---|
| | | OrderedCollection |

Animus isBoolean
↑false filledSize                                                                                                 filledSize
    ↑(self select: [:each | each value isNil not]) size firstIndex                                                                                                  firstIndex
    ↑firstIndex lastIndex                                                                                                   lastIndex
    ↑lastIndex lastIndex: integer                                                                       lastIndex:
    lastIndex ← integer lastIndexOf: anElement                                                 lastIndexOf:
(1 to: self size)
    reverseDo: [:i | (self at: i) = anElement ifTrue: [↑i]].
↑0

ParseNode

_____ ParseNode _____

ParseNode

Animus basicPrintString                                                                      basicPrintString
    *"Answer a String whose characters are a description of the receiver."*

| aStream |
    aStream ← WriteStream on: (String new: 16).
    self printOn: aStream indent: 0.
    ↑aStream contents compressTrigger: triggers encoder: encoder            compressTrigger:encoder:
    ↑self _____ Path class _____

Path class

Animus with: aPoint with: anotherPoint                                  with:with:
    | newSelf |
    newSelf ← self new.
    newSelf add: aPoint.
    newSelf add: anotherPoint.
    ↑newSelf _____ Pen _____

Pen

Animus showPicture: medium
    ↑self showPicture:

---
QueuedMethodDescription
---

QueuedMethodDescription

Animus canBeSentNext: queue | path |
    *"return true if I can be sent next"*
    *"The following conditions must be true for me to be sent next:*
        *my constraint uniquely determines the state of my receiver;*
        *my receiver or one of its parts isn't already unalterable;*
        *and all the objects that I reference are unalterable.* canBeSentNext:queuePoint

Animus (constraint isMemberOf: SetMembershipConstraint) ifTrue: [↑true].
    (constraint isMemberOf: TimeDifferentialConstraint) ifTrue: [↑true].
    (constraint isMemberOf: FunctionConstraint) ifTrue: [↑true].
    (constraint isMemberOf: TriggerConstraint) ifTrue: [↑true].
    uniqueState ifFalse: [↑false].
    (queue testForUnalterablePart: receiver) ifTrue: [↑false].
    constraint == nil ifTrue: [↑true].
    *"If any of the objects that I reference may still change, return false"*
    constraint methodDescriptions do:
        [: descr | path ← owner concat: descr receiver.
        path = receiver
        ifFalse:
            [ *"it's the one I alter"*
            (queue testIfUnalterable: path)
            ifFalse:
                [ *"last chance! If this description is reference only, and there are*
        *no altering descriptions to it in the queue, it won't change."*
                (descr referenceOnly and: [(queue noAlteringMessagesTo: path)])
                ifFalse: [↑false]]]].

(constraint isKindOf: SetConstraint)
    ifTrue: [(queue findConstraint: constraint owner: owner) do:
        [: descr | descr == self
        ifFalse:
            [(queue testIfUnalterable: descr receiver)
                ifFalse: [↑false]]]].
    ↑true ---
Rectangle
---

Rectangle

Animus frame
        ↑self frame

---
Rectangle class
---

Rectangle class

Animus bottomLeft: aPoint extent: anotherPoint      bottomLeft:extent:
↑self origin: aPoint x @ (aPoint y - anotherPoint y) extent: anotherPoint x @ (0 - anotherPoint y)

Relaxer

_____ Relaxer _____

Relaxer

Animus compiling pickErrors: planner oldUnalterable: oldUnalterable      pickErrors:oldUnalterable:
    "*Find the vectors of constraint owners, errors and tests.*
    *Delete these messages from the queue.*
    *Choose only one error and test per constraint*"
    | picked |
    picked ← ConstraintSatisfactionPlanner for: context.
    constraintOwners ← OrderedCollection new.
    errors ← OrderedCollection new.
    tests ← OrderedCollection new.
    planner unalterable do:
        [: path | (oldUnalterable includes: path)
          ifFalse: [(planner findReceiver: path) do:
            [: message | planner remove: message.
            (picked hasConstraint: message constraint owner: message owner)
              ifFalse:
                ["*delete messages from this constraint to objects in oldUnalterable,*
    *since the errors for their constraint will be taken care of by the relaxer*"
              picked add: message.
              constraintOwners add: message owner.
              errors add: (self compileError: message encoder: planner encoder).
              tests add: (self compileTest: message encoder: planner encoder).
              (planner findConstraint: message constraint owner: message owner) do:
                [: m | (oldUnalterable includes: m receiver)
                  ifTrue: [planner remove: m]]]]]].
    constraintOwnerVecs add: constraintOwners asArray.
    errorVecs add: errors asArray.
    testVecs add: tests asArray _____ SequenceableCollection _____

SequenceableCollection

Animus instancePaths: cl      instancePaths:
    "*return a vector of paths to instances of class cl or its subclasses*"
    "*First check if I'm an instance of cl. If not, then check in my dictionary*
    *of instance paths to see if there is an entry for cl. If that fails too, then*
    *find a path to each of my parts which is an instance of cl. If there is*
    *more than one path to that part, put only one of them in the vector.*"
    | instancePathsDict partsDict paths prefix subPaths strm subPart part |
    (self isMemberOf: cl) ifTrue: [↑Array with: EmptyPath].
        partsDict ← IdentityDictionary new.
    (1 to: self size) do: [: indx | subPaths ← (self at: indx )
                instancePaths: cl.
          prefix ← indx asPath.
          part ← self at: indx .
          subPaths do:
            [: p |
            subPart ← p applyTo: part.

Animus

```
                        partsDict at: subPart put: (prefix concat: p))]].
strm ← Array newWriteStream: 10.
partsDict do: [: x | strm nextPut: x].
paths ← strm contents.
↑paths
```

---------------- String ----------------

SequenceableCollection

String

Animus selectorWithArgs
```
        | strm string index |
(self last=$:) ifFalse: [↑self] ifTrue:
    [strm ← self readStream.
    string ← String newWriteStream: 64.
    index ← 1.
    [strm atEnd] whileFalse:
        [string nextPutAll: (strm upTo: $:).
        string nextPutAll: ': a' , index printString , ' '.
        index ← index + 1].
    ↑string contents]
    "'swap:with:' selectorWithArgs"
```

String selectorWithArgs

---------------- ThingLabObject ----------------

Animus anima
  ↑nil

ThingLabObject anima

---------------- Tool ----------------

Animus willChangeStructure
```
    "The structure of the selection is about to be changed. Make sure its a prototype"
selection anima isNil ifFalse: [selection anima deInitialize].
    selection isPrototype ifFalse:
        [self error: 'not a prototype'.

selection ← selection asPrototype.
        editedView picturePane update.
        editedView buffer update]
```

Tool willChangeStructure

---------------- UndefinedObject ----------------

Animus asPath
  ↑EmptyPath

UndefinedObject asPath

```
do: aBlock
    "do nothing"
    ↑self set.value: ignored
    ↑self value
    ↑nil
``` do:

set value

```
ThingLabBrowser subclass: #AnimusBrowser
    instanceVariableNames: 'anima '
    classVariableNames: 'FieldDescriptions '
    poolDictionaries: ''
    category: 'Animus-Views'
```

─────────────── AnimusBrowser ─────────────── prototypes

AnimusBrowser

```
defineNewThing
    | nameString name animaClassName |
    nameString ← FillInTheBlank request: 'Enter name of new thing' default: 'NameOfThing'.
    nameString size=0 ifTrue: [↑self].
    nameString at: 1 put: (nameString at: 1) asUppercase.
    name ← self makeClassName: nameString.
    animaClassName ← (nameString , 'Anima') asSymbol.
    (Smalltalk includesKey: name) ifTrue: [↑self notify: name , ' is a name used elsewhere'].
    self prototypeSuperclass subclass: name
            instanceVariableNames: ''
            classVariableNames: ''
            poolDictionaries: ''
            category: 'Prototypes'.
    Anima subclass: animaClassName
            instanceVariableNames: ''
            classVariableNames: ''
            poolDictionaries: ''
            category: 'Animae'.
    (Smalltalk at: name) prototype anima: (Smalltalk at: animaClassName) new.
    "leave text editing mode, and update the selection pane"
    prototypeClass ← name.
    self changed: #prototypeClassList
prototypeSuperclass
    ↑AnimusObject removeThing
    (self confirm: 'Do you really want to remove
' , prototypeClass , ' from the system?') ifFalse: [↑ self].
    self browsedPrototype anima isNil
        ifFalse: [self browsedPrototype anima nilFields.
            self browsedPrototype anima class removeFromSystem.
            self browsedPrototype nilFields].
    self browsedDictionary removeKey: prototypeClass ifAbsent: [].
    self browsedPrototype class removeFromSystem.
    "update the selection pane"
    prototypeClass ← nil.
    self changed: #prototypeClassList
``` defineNewThing prototypeSuperclass removeThing tool toolList
```
(prototype == nil or: [aspect == nil]) ifTrue: [↑ nil].
self showSelector == #showPicture: ifFalse: [↑ nil].
↑ prototype animusToolsFor: aspect
``` access anima
```
↑anima
``` anima: anAnima
```
anima ← anAnima
```

─────────────── Driver ───────────────

Tool subclass: #Driver

```
instanceVariableNames: ''
classVariableNames: 'PicturesChanged '
poolDictionaries: ''
category: 'Animus-Views'
``` tool Protocol action
```
↑'go'
``` performAction
```
Transcript show: selection anima time printString
``` scheduling eachtime
```
| menu message |
selection anima tick: selection anima deltaT.
Sensor redButtonPressed
    ifTrue: [menu ← ActionMenu labels: 'FileOp
PaneOp
Remote
MenuChange
Auto
Start/Stop' selectors: #('FileOp' 'PaneOp' 'Remote' 'MenuChange' 'Auto' 'Start/Stop').
message ← menu selectorAt: menu startUp.
TheBrowser prototype anima thing simKernel3 sendX: message toExchange: 'UIHX' sender: SimProcess
prototype]
    ifFalse: [selection parts first class == SimKernel ifTrue: [PicturesChanged isNil ifFalse: [self class
resetPicturesChanged.
            self updatePictures]]
        ifFalse: [self updatePictures]].
"Transcript show: selection anima thing simKernel3 readyList list printString , selection anima thing simKernel3
pauseList list printString , selection anima thing simKernel3 signalList list printString. Transcript show: selection
anima thing simKernel3 deviceList printString."
↑editedView containsPoint: Sensor cursorPoint
``` firsttime
```
selection anima initialize.
super firsttime.
↑true
```

_____ Driver class _____

Driver class
    instanceVariableNames: '' access resetPicturesChanged
    PicturesChanged ← nil setPicturesChanged
    PicturesChanged ← true _____ Sticker _____

Inserter subclass: #Sticker instanceVariableNames: ''
    classVariableNames: ''
    poolDictionaries: ''
    category: 'Animus-Views' tool protocol action
    ↑'add' performAction
    | xOffset aList |
    aList ← (selectionMerges first allButLast applyTo: selection) list.
    aList add: carrier.

xOffset ← (selectionMerges first allButLast applyTo: selection) location x + 10.
    (1 to: aList size - 1) do: [: i | xOffset ← xOffset + 8 + (aList at: i) frame width].
    aList last set.frame: (aList last frameTranslateBy: ((xOffset - aList last frame origin x) @ 0)).
    (selectionMerges first allButLast applyTo: selection) addPoint moveby: (carrier frame width + 8 @ 0).
    (carrier isKindOf: SimProcess) ifTrue: [selection simKernel3 deviceList add: (Association key: carrier processName , 'X' value: carrier device)].
    self showBuffered _____ Kicker _____

Tool subclass: #Kicker instanceVariableNames: ''
    classVariableNames: 'KickPictures '
    poolDictionaries: ''
    category: 'Animus-Views' tool protocol action
    ↑'send message' oldFirsttime
    |menu selector|
    selection anima initialize.
    super firsttime.
    menu ← ActionMenu
        labels: (selection anima triggers
            inject: '' into: [: string : trigger | string , trigger first asString ,

```
                    (trigger = selection anima triggers last ifTrue: [''] ifFalse: ['
    '])])    selectors: (selection anima triggers collect: [: trigger | trigger last extendSelector: trigger first]).
        selector ← menu selectorAt: menu startUp.
        selection anima perform: selector.
        Sensor cursorPoint: (editedView superView subViews at: 3) insetDisplayBox center.
        ↑false
``` performAction                                                                                           performAction

```
        |menu selector receiverTriggers args|
        selectionMerges do: [: m | m == nil
            ifFalse: [selection anima initialize.
                receiverTriggers ← selection anima triggers select: [: trigger | trigger last contains: m].
                menu ← ActionMenu
                    labels: (receiverTriggers
                        inject: '' into: [: string : trigger | string , trigger first asString ,
                            (trigger = receiverTriggers last ifTrue: [''] ifFalse: ['
    '])])    selectors: (receiverTriggers collect: [: trigger | trigger last extendSelector: trigger first]).
                self showBuffered.
                selector ← menu selectorAt: menu startUp.
                selector isKeyword
                    ifTrue: [args ←Compiler evaluate: (FillInTheBlank request: 'argArray?').
                        selection anima perform: selector withArguments: args.
                        selection anima tick: 1.
                        selection anima tick: 1]
                    ifFalse: [selection anima perform: selector].
                self showBuffered.
                Sensor cursorPoint: (editedView superView subViews at: 3) insetDisplayBox center.]]
```

——————————————— Kicker class ———————————————

Kicker class                                                                                                Kicker class
    instanceVariableNames: '' access resetPicturesChanged                                                                                    resetPicturesChanged
    KickPictures ← nil setPicturesChanged                                                                                      setPicturesChanged
    KickPictures ← true
Tool subclass: #Picker                                                                                      Picker instanceVariableNames: ''
    classVariableNames: ''
    poolDictionaries: ''
    category: 'Animus-Views' tool protocol action                                                                                                  action
    ↑'edit' performAction                                                                                           performAction
    (selectionMerges first applyTo: selection) inspect.
    self showBuffered ——————————————— Setter ———————————————

Tool subclass: #Setter                                                                                      Setter instanceVariableNames: ''
    classVariableNames: '' poolDictionaries: ''
category: 'Animus-Views' tool Protocol action  action

↑'set time' firsttime  firsttime selection anima time set.value: (FillInTheBlank request: 'Edit time value'
  initialAnswer: selection anima time value printString) asNumber.
Sensor cursorPoint: (editedView superView subViews at: 3) insetDisplayBox center.
↑false ———————————————— Ticker ————————————————

Tool subclass: #Ticker  Ticker instanceVariableNames: ''
classVariableNames: ''
poolDictionaries: ''
category: 'Animus-Views' tool Protocol action  action

↑'tick size' firsttime  firsttime selection anima deltaT: (FillInTheBlank request: 'Edit time increment, dt:'
  initialAnswer: selection anima deltaT printString) asNumber.
Sensor cursorPoint: (editedView superView subViews at: 3) insetDisplayBox center.
↑false ———————————————— AnimusBrowserView ————————————————

ThingLabBrowserView subclass: #AnimusBrowserView  AnimusBrowserView instanceVariableNames: ''
classVariableNames: ''
poolDictionaries: ''
category: 'Animus-Views'

———————————————— AnimusBrowserView class ————————————————

AnimusBrowserView class  AnimusBrowserView class
  instanceVariableNames: ''

Initialization open  Create

"*AnimusBrowserView open*"

| topView browser |
TheBrowser ← AnimusBrowser new.
topView ← self model: TheBrowser
    label: 'Animus Browser'
    minimumSize: 300 @ 200.

```
topView addSubView:
        (ListViewWithBlock on: TheBrowser aspect: #prototypeClass printItems: true)
    in: (0@0 extent: 0.25@0.22) borderWidth: 1.
topView addSubView:
        (ListViewWithBlock on: TheBrowser aspect: #aspect printBlock: [:x | x name])
    in: (0.25@0 extent: 0.25@0.22) borderWidth: 1.
topView addSubView:
        (ListViewWithBlock on: TheBrowser aspect: #tool printBlock: [:x | x new action])
    in: (0.5@0 extent: 0.25@0.22) borderWidth: 1.
topView addSubView:
        (ListViewWithBlock on: TheBrowser aspect: #filter printItems: true)
    in: (0.75@0 extent: 0.25@0.22) borderWidth: 1.
topView addSubView:
        (TextView on: TheBrowser aspect: #text change: #acceptText: from:
            menu: #textMenu)
    in: (0@0.22 extent: 1@0.78) borderWidth: 1.
topView controller open Object variableSubclass: #Case
    instanceVariableNames: 'keyArray responseArray item currentEvent currentArray '
    classVariableNames: 'FieldDescriptions '
    poolDictionaries: ''
    category: 'Animus-Responses'
```

Initialization                                           - 30 -                               AnimusBrowserView class ———————————————— Case ————————————————

Initialization

Case item: anItem
    item ← anItem item:

keyArray: anItem
    keyArray ← anItem keyArray:

responseArray: anItem
    responseArray ← anItem responseArray:

operations first
    | index |
    (keyArray includes: item value) ifTrue: [index ← (keyArray indexOf: item value)]
        ifFalse: [index ← responseArray size].
    currentArray ← responseArray at: index.
    currentArray isEmpty ifTrue: [↑nil] ifFalse: [↑currentEvent ← currentArray first]

first next
    (currentEvent == currentArray last) ifTrue: [ ↑nil].
    ↑currentEvent ← currentArray at: (currentArray indexOf: currentEvent) + 1 next value
    | index |
    (keyArray includes: item ) ifTrue: [index ← (keyArray indexOf: item )]
        ifFalse: [index ← responseArray size].
    ↑currentArray ← responseArray at: (index min: responseArray size)

value printing printOn: strm
    strm nextPutAll: 'Case' , item value printString , ' of ' , keyArray printString , '
    ' , responseArray printString printOn:

---

_____ Case class _____

Case class
    instanceVariableNames: ''

Case class

Case class

Instance creation item: anItem of: keyArray is: responseArray
    | newGuy |
    newGuy ← self new.
    newGuy item: anItem.
    newGuy keyArray: keyArray.
    newGuy responseArray: responseArray.
    ↑newGuy item:of:is:

_____ EventQueue _____

LinkedList variableSubclass: #EventQueue instanceVariableNames: ''
    classVariableNames: ''
    poolDictionaries: ''
    category: 'Animus-Responses'

EventQueue tests check: aTime
    |eventArray|
    eventArray ← OrderedCollection new.
    self isEmpty ifTrue: [↑eventArray].
    [self first timeStamp <= aTime value]
        whileTrue: [eventArray addLast: self first.
                  self removeFirst.
                  self isEmpty ifTrue: [↑eventArray]].
    ↑eventArray check:

enqueuing enqueue: anEventArray
    anEventArray do: [: anEvent | self insertTimeOrdered: anEvent]

enqueue:

enqueueShifted: anEventArray
    | currentTime anEvent |
    anEventArray isNil ifTrue: [↑nil].
    currentTime ← TheBrowser prototype anima time value.
    anEventArray do: [: anEventNode | anEvent ← Event new perform: anEventNode selector key
        withArguments: (anEventNode arguments
            collect: [ :each | each key]) asArray.
    self insertTimeOrdered: (anEvent atTime: anEvent timeStamp + currentTime)]

enqueueShifted:

insertTimeOrdered: anEvent
    | previous next | insertTimeOrdered:

```
self isEmpty
    ifTrue: [↑self addFirst: anEvent].
anEvent timeStamp < self first timeStamp
    ifTrue: [↑self addFirst: anEvent].
anEvent timeStamp >= self last timeStamp
    ifTrue: [↑self addLast: anEvent].
next ← self first.
[anEvent timeStamp >= next timeStamp]
    whileTrue: [previous ← next.
                next ← next nextLink
                ].
anEvent nextLink: next.
previous nextLink: anEvent
```

─────────────────── Event ───────────────────

Link variableSubclass: #Event                                              Event instanceVariableNames: 'timeStamp receiver selector arguments '
    classVariableNames: 'FieldDescriptions '
    poolDictionaries: ''
    category: 'Animus-Responses'
Event comment:
'The receiver of an Event is an actual object pointer and the arguments are an array
of such pointers. The selector is a symbol. This is contrasted to EventPrototypes (see their comment)' happening happen                                                                 happen
receiver perform: selector withArguments: arguments happen: dt                                                             happen:
receiver perform: selector with: dt access atTime: anInteger                                                      atTime:
    timeStamp ← anInteger atTime: t receiver: r selector: s arguments: a              atTime:receiver:selector:arguments:
    timeStamp ← t.
    receiver ← r.
    selector ← s.
    arguments ← a receiver: r selector: s arguments: a                          receiver:selector:arguments:
    receiver ← r.
    selector ← s.
    arguments ← a timeStamp                                                              timeStamp
    ↑timeStamp printing printOn: aStream                                                       printOn:
    aStream nextPutAll: '(' , receiver printString , ' ' , selector printString ,
        arguments printString , ')' , timeStamp printString _____ Event class _____

Event class
    instanceVariableNames: ''

Initialization noop
    "*a no-op event*"

null
    "*return a no-op event*"
    ↑self new receiver: self selector: #noop arguments: #()

_____ OSEvent _____

Event variableSubclass: #OSEvent instanceVariableNames: ''
    classVariableNames: ''
    poolDictionaries: ''
    category: 'Animus-Responses' happening happen
    | returnValue |
returnValue ← receiver perform: selector withArguments: arguments.
(receiver isKindOf: SimProcess) ifTrue:
        [returnValue isBoolean ifFalse: [returnValue ← false].
        TheBrowser prototype anima thing simKernel3 setJump: returnValue]

_____ Lozenge _____

Object variableSubclass: #Lozenge instanceVariableNames: 'frame form '
    classVariableNames: 'FieldDescriptions '
    poolDictionaries: ''
    category: 'Animus-Responses' moving display
    form displayAt: frame origin frameTranslateBy: delta
    ↑frame translateBy: delta access form
    ↑form form: aForm
    form ← aForm frame
    ↑frame frame: aRect frame ← aRect

---------- Lozenge class ----------

Lozenge class                                                                                    Lozenge class
    instanceVariableNames: ''

Instance creation form:frame:label:
form: form frame: rect label: string
    | newLozenge tempForm |
    newLozenge ← self new.
    tempForm ← (form reverse) offset: 0@0.
    ((Paragraph withText: string asText style: (TextStyle default alignment: 2)) asForm) displayOn: tempForm
medium at: (3@2) rule: Form over mask: Form black.
    newLozenge form: tempForm reverse.
    newLozenge frame: rect.
    ↑newLozenge

Instance creation                              - 37 -                                         Lozenge class fromFrame:
fromFrame: rect
    | newLozenge tempForm |
    newLozenge ← self new.
    newLozenge form: (Form fromDisplay: (rect translateBy: TheBrowser dependents last insetDisplayBox origin)).
    newLozenge frame: rect.
    TheBrowser dependents last displayView.
    ↑newLozenge ---------- ProcessSet ----------

Object variableSubclass: #ProcessSet                                                             ProcessSet instanceVariableNames: 'frame form processCollection '
    classVariableNames: 'FieldDescriptions '
    poolDictionaries: ''
    category: 'Animus-Responses' access form                                                                                             form
    ↑form form: aForm                                                                                       form:
    form ← aForm frame                                                                                             frame
    ↑frame frame: aRect                                                                                      frame:
    frame ← aRect processCollection                                                                                 processCollection
    ↑processCollection processCollection: aCollection                                                                    processCollection:
    processCollection ← aCollection moving frameTranslateBy: delta  *frameTranslateBy:*
    processCollection do: [: each | each set.frame: (each frame translateBy: delta)].
    ↑frame translateBy: delta

---

ProcessSet class

ProcessSet class  *ProcessSet class*
    instanceVariableNames: ''

Initialize frame: aRect  *frame:*
    |newSelf|
    newSelf ← self new.
    newSelf frame: aRect;
        form: (Form fromDisplay: (aRect translateBy: TheBrowser dependents last insetDisplayBox origin) rounded).
    ↑newSelf from: aProc to: another in: aList  *from:to:in:*
    |newSelf|
    newSelf ← self new.
    newSelf processCollection: (aList copyFrom: (aList indexOf: aProc) to: (aList indexOf: another)).
    newSelf frame: (aProc frame merge: another frame).
    newSelf form: (Form fromDisplay: (newSelf frame translateBy: TheBrowser dependents last insetDisplayBox origin) rounded).
    ↑newSelf

---

Response

Object variableSubclass: #Response  *Response* instanceVariableNames: 'responseMethod '
    classVariableNames: ''
    poolDictionaries: ''
    category: 'Animus-Responses' access responseMethod  *responseMethod*
    ↑responseMethod responseMethod: aMethodNode  *responseMethod:*
    responseMethod ← aMethodNode

---

Response class

Response class  *Response class*
    instanceVariableNames: ''

Instance creation with: aMethodTree  *with:*
    ↑self new responseMethod: aMethodTree

ImmediateResponse

Response variableSubclass: #ImmediateResponse          ImmediateResponse instanceVariableNames: ''
    classVariableNames: ''
    poolDictionaries: ''
    category: 'Animus-Responses' printing printOn: aStream                                        printOn:
    aStream nextPutAll: 'enqueue immediately '.
    responseMethod printOn: aStream

Script

Response variableSubclass: #Script                      Script instanceVariableNames: 'eventArray '
    classVariableNames: ''
    poolDictionaries: ''
    category: 'Animus-Responses' access eventArray                                              eventArray
    ↑eventArray eventArray: array                                       eventArray:
    eventArray ← array

Script class

Script class                                            Script class
    instanceVariableNames: '' instance creation with: response eventArray: messageNodeArray             with:eventArray:
    | script |
    script ← self with: response.
    script eventArray: messageNodeArray.
    ↑script

TriggeredResponse

Response variableSubclass: #TriggeredResponse           TriggeredResponse instanceVariableNames: ''
    classVariableNames: ''
    poolDictionaries: ''
    category: 'Animus-Responses' printing printOn: aStream                                        printOn:

aStream nextPutAll: 'triggered '.
responseMethod printOn: aStream

_____ Flasher _____

TriggeredResponse variableSubclass: #Flasher                                    Flasher instanceVariableNames: 'thing '
    classVariableNames: ''
    poolDictionaries: ''
    category: 'Animus-Responses' access thing: aThing                                                                    thing:
    thing ← aThing responding enqueueEvents                                                                    enqueueEvents
    | eventCollection |
    TheBrowser prototype anima thingEvents enqueue:
        [eventCollection ← OrderedCollection new.
        (1 to: 2)
            do: [: i | eventCollection add: (Event new
                atTime: TheBrowser prototype anima time value
                    + (TheBrowser prototype anima deltaT / 10 * i)
                receiver: self
                selector: #showBlack:
                arguments: #(nil)).
            eventCollection add: (Event new
                atTime: TheBrowser prototype anima time value + 0.005
                    + (TheBrowser prototype anima deltaT / 10 * i)
                receiver: self
                selector: #showWhite:
                arguments: #(nil))].
        eventCollection add: (Event new
            atTime: TheBrowser prototype anima time value + 0.6
            receiver: TheBrowser dependents last
            selector: #displayViewOn:
            arguments: (Array with: Display)).
        eventCollection] value showBlack: ingnored                                                              showBlack:
    Display fill: (thing frame translateBy: TheBrowser dependents last insetDisplayBox origin) mask: Form black.
    (Delay forMilliseconds: 50) wait showWhite: ingnored                                                              showWhite:
    | frm |
    frm ← thing frame translateBy: TheBrowser dependents last insetDisplayBox origin.
    Display fill: frm mask: Form white.
    Display border: frm width: 3.
    (Delay forMilliseconds: 50) wait _____ Flasher class _____

Flasher class                                                                    Flasher class
    instanceVariableNames: ''

Instance creation with: aThing                                                                     with:
    ↑self new thing: aThing _____ Trajectory _____

TriggeredResponse variableSubclass: #Trajectory                                    Trajectory instanceVariableNames: 'thing destination delta form background tempbackground '
    classVariableNames: ''
    poolDictionaries: ''
    category: 'Animus-Responses' access destination: aPoint                                                    destination:
        destination ← aPoint thing: aThing                                                         thing:
        thing ← aThing responding enqueueEvents                                                          enqueueEvents
        | eventCollection |
    "2 timesRepeat:[ Display flash: (0@0 corner: 800@800)].
    Sensor waitButton.
    Sensor redButtonPressed ifTrue: [ self halt ]."
        TheBrowser prototype anima thingEvents enqueue:
            [eventCollection ← OrderedCollection new.
            eventCollection add: (Event new
                atTime: TheBrowser prototype anima time value
                receiver: self
                selector: #initialize:
                arguments: #(nil)).
        (1 to: 8)
            do: [: i | eventCollection add: (Event new
                atTime: TheBrowser prototype anima time value
                  + (TheBrowser prototype anima deltaT / 10 * i)
                receiver: self
                selector: #step:
                arguments: (Array with: i))].
        eventCollection] value initialize: ignored                                                     initialize:
        | mergeRect |
    delta ← destination frame bottomLeft - thing frame bottomLeft / 8.0.
    form ← thing form.
    tempbackground ← (thing class == Lozenge)
        ifTrue: [Form fromDisplay: (thing frame translateBy: TheBrowser dependents last insetDisplayBox origin) rounded]
        ifFalse: [(Form extent: form extent) white].
    mergeRect ← ((thing frame merge: (destination frame origin + (destination offset: thing) extent: thing frame extent)) translateBy: TheBrowser dependents last insetDisplayBox origin) rounded.
    background ← (Form fromDisplay: mergeRect).
    tempbackground displayOn: background at: (thing frame origin + TheBrowser dependents last insetDisplayBox origin - mergeRect origin).
    TheBrowser tool setPicturesChanged".

responding                                                                      Trajectory

*10 timesRepeat:[ Display flash: mergeRect].*
*background displayAt: 300@200.*
*tempbackground displayAt: 300@300.*
*Sensor waitButton.*
*Sensor redButtonPressed ifTrue: [ self halt ]"* step: index                                                                                              step:
    tempbackground displayAt: thing frame origin + TheBrowser dependents last insetDisplayBox origin.
    thing setframe: (thing frameTranslateBy: delta).
    form displayAt: thing frame origin + TheBrowser dependents last insetDisplayBox origin.
    tempbackground ← (Form extent: form extent) from: background in:
        (((((delta x > 0 ifTrue: [0] ifFalse: [background width - form width]) @
          (delta y > 0 ifTrue: [0] ifFalse: [background height - form height])) + (index * delta)) extent: form
    extent)".
    *tempbackground displayAt: 300@300 + (0 @ index * 80).*
    *Sensor waitButton.*
    *Sensor redButtonPressed ifTrue: [ self halt ]"* printing printOn: strm                                                                                            printOn:
    strm nextPutAll: 'TrajFromTo: ' , thing printString , destination printString ———————————————— Trajectory class ————————————————

Trajectory class                                                                             Trajectory class
    instanceVariableNames: ''

Instance creation with: aThing destination: anotherThing                                                       with:destination:
    |temp|
    temp ← self new thing: aThing.
    temp destination: anotherThing.
    ↑temp ThingLabObject subclass: #AnimusObject
    instanceVariableNames: 'anima historyDescription '
    classVariableNames: 'FieldDescriptions '
    poolDictionaries: ''
    category: 'Animus-Objects'

AnimusObject

———————————————— AnimusObject ————————————————

AnimusObject
access anima                                                                                                    anima
    ↑anima anima: anAnima                                                                                           anima:
    anima ← anAnima tests isAnimusObject                                                                                   isAnimusObject
    ↑true _____ AnimusObject class _____

AnimusObject class
    instanceVariableNames: ''

AnimusObject class file out fileOutAnimus                                                                                  AnimusObject
    | sourceFile toInitialize meta |
    *"toInitialize is a collection of classes that need to have their prototypes initialized"*
    toInitialize ← OrderedCollection new.
    *"file out changes to existing classes (should all be in protocols that start with 'Animus') "*
    sourceFile ← FileStream newFileNamed: 'animus.st'.
    sourceFile timeStamp.
    sourceFile cr; nextPutAll: 'Smalltalk at: #Things put: IdentityDictionary new!'; cr.
    sourceFile cr; nextPutAll: 'Smalltalk at: #ThingDefinitions put: IdentityDictionary new!'; cr; cr.
    *"don't file out changes for prototype classes or classes in Animus categories"*
    Smalltalk allClassesDo:
        [: class |
        ('Animus*' match: class category) | (#Prototypes = class category) ifFalse:
            [(Array with: class with: class class) do: *"Both class and meta"*
                [: each | each organization categories do:
                      [: cat | ('Animus*' match: cat) ifTrue: *"File out Animus categories"*
                          [each fileOutCategory: cat on: sourceFile moveSource: false toFile: 0.
                          *"check if this class needs to have its prototype initialized"*
                          each isMeta & (each includesSelector: #initializePrototype) ifTrue:
                              [toInitialize add: each]]]]]].
    sourceFile cr. sourceFile cr.
    *"file out new Animus classes (should all be in categories that start with 'Animus') "*
    (SystemOrganization categories select: [: x | 'Animus*' match: x]) do:
        [: cat | sourceFile cr. sourceFile cr.
        SystemOrganization fileOutCategory: cat onFile: sourceFile.
        sourceFile cr].
    *"add messages to initialize prototypes. Initializations of existing system classes
    are done first to avoid ordering problems"*
    sourceFile cr. sourceFile cr.

file out

AnimusObject class

Smalltalk allClassesDo:
        [: each | meta ← each class.
            (meta includesSelector: #initializePrototype) & (toInitialize includes: meta) not
                ifTrue: [toInitialize add: meta]].
    toInitialize do:
        [: c | sourceFile nextPutAll: c soleInstance name , ' initializePrototype!'.
        sourceFile cr].
    sourceFile close file in fileInBasics                                                                       fileInBasics
    *"AnimusObject fileInBasics"*
    (FileStream oldFileNamed: 'currentThings/ElectricalObject.thing') fileIn.
    (FileStream oldFileNamed: 'currentThings/ElectricalNode.thing') fileIn.
    (FileStream oldFileNamed: 'currentThings/ElectricalLead.thing') fileIn.
    (FileStream oldFileNamed: 'currentThings/TwoLeadedObject.thing') fileIn.
    (FileStream oldFileNamed: 'currentThings/Resistor.thing') fileIn.
    (FileStream oldFileNamed: 'currentThings/Wire.thing') fileIn.
    (FileStream oldFileNamed: 'currentThings/Ground.thing') fileIn.
    (FileStream oldFileNamed: 'currentThings/Meter.thing') fileIn.
    (FileStream oldFileNamed: 'currentThings/Capacitor.thing') fileIn.
    (FileStream oldFileNamed: 'currentThings/Scope.thing') fileIn.
    (FileStream oldFileNamed: 'currentThings/Inductor.thing') fileIn.

fileInElectrical
    *"AnimusObject fileInElectrical"*
    (FileStream oldFileNamed: 'currentThings/ElectricalObject.thing') fileIn.
    (FileStream oldFileNamed: 'currentThings/ElectricalNode.thing') fileIn.
    (FileStream oldFileNamed: 'currentThings/ElectricalLead.thing') fileIn.
    (FileStream oldFileNamed: 'currentThings/TwoLeadedObject.thing') fileIn.
    (FileStream oldFileNamed: 'currentThings/Resistor.thing') fileIn.
    (FileStream oldFileNamed: 'currentThings/Wire.thing') fileIn.
    (FileStream oldFileNamed: 'currentThings/Ground.thing') fileIn.
    (FileStream oldFileNamed: 'currentThings/Meter.thing') fileIn.
    (FileStream oldFileNamed: 'currentThings/Capacitor.thing') fileIn.
    (FileStream oldFileNamed: 'currentThings/Scope.thing') fileIn.
    (FileStream oldFileNamed: 'currentThings/Inductor.thing') fileIn.

fileInMechanical
    *"AnimusObject fileInMechanical"*
    (FileStream oldFileNamed: 'currentThings/MechanicalNode.thing') fileIn.
    (FileStream oldFileNamed: 'currentThings/MechanicalRod.thing') fileIn.
    (FileStream oldFileNamed: 'currentThings/TwoRodedObject.thing') fileIn.
    (FileStream oldFileNamed: 'currentThings/Mass.thing') fileIn.
    (FileStream oldFileNamed: 'currentThings/Spring.thing') fileIn.

fileInOS
    *"AnimusObject fileInOS"*
    (FileStream oldFileNamed: 'OSaux.st') fileIn.
    (FileStream oldFileNamed: 'currentThings/ABaseQueue.thing') fileIn.
    (FileStream oldFileNamed: 'currentThings/APriorityQueue.thing') fileIn.
    (FileStream oldFileNamed: 'currentThings/APauseQueue.thing') fileIn.
    (FileStream oldFileNamed: 'currentThings/SimDevice.thing') fileIn.
    (FileStream oldFileNamed: 'currentThings/SimProcess.thing') fileIn.

file in          AnimusObject class (FileStream oldFileNamed: 'currentThings/ProcAC.thing') fileIn.
    (FileStream oldFileNamed: 'currentThings/ProcMM.thing') fileIn.
    (FileStream oldFileNamed: 'currentThings/ProcFS.thing') fileIn.
    (FileStream oldFileNamed: 'currentThings/ProcUIH.thing') fileIn.
    (FileStream oldFileNamed: 'currentThings/ProcPP.thing') fileIn.
    (FileStream oldFileNamed: 'currentThings/ProcGA.thing') fileIn.
    (FileStream oldFileNamed: 'currentThings/ProcHDW.thing') fileIn.
    (FileStream oldFileNamed: 'currentThings/SimKernel.thing') fileIn ---------------- AMagnitude ----------------

AnimusObject subclass: #AMagnitude          AMagnitude instanceVariableNames: 'value '
        classVariableNames: 'FieldDescriptions InstancePathsDict Methods '
        poolDictionaries: ''
        category: 'Animus-Objects' access value                                                                         value
        ↑value value: anInteger                                        value:
        value ← anInteger printing

```
printOn: aStream                                                              printOn:
    aStream nextPutAll: ' a Magnitude of ' , value printString
``` compiling

```
expandIncrement: message planner: planner                        expandIncrement:planner:
    planner add: (MessagePlan new
        context: message context
        receiver: message receiver
        constraint: message constraint
        owner: message owner
        keywords: #('primitiveIncrement:')
        arguments: message arguments
        uniqueState: message uniqueState
        referenceOnly: message referenceOnly
        compileTimeOnly: message compileTimeOnly)

primitiveIncrement: dt                                                  primitiveIncrement:
    value ← value + dt primitivesetTo: dt                                                        primitivesetTo:
    value ← value + dt primitiveSetTo: dt                                                        primitiveSetTo:
    value ← dt
```

_____ AMagnitude class _____

```
AMagnitude class                                                          AMagnitude class
    instanceVariableNames: ''
```

Instance creation

```
value: anInteger                                                                  value:
    ↑self new value: anInteger
```

_____ Anima _____

```
AnimusObject subclass: #Anima                                                      Anima instanceVariableNames: 'thing deltaT time constraints thingEvents triggers encoder initialized '
    classVariableNames: 'FieldDescriptions '
    poolDictionaries: ''
    category: 'Animus-Objects'
``` evolution

```
expandIncrement: message planner: planner                        expandIncrement:planner:
    "send this message to each of my times"
    | m |
    m ← MessagePlan new context: message context receiver: (message receiver add: #time) constraint: message
constraint owner: message owner keywords: message keywords arguments: message arguments uniqueState:
message uniqueState referenceOnly: message referenceOnly compileTimeOnly: message compileTimeOnly.
    self time expand: m planner: planner expandSetTo: message planner: planner                              expandSetTo:planner:
    "send this message to each of my times"
    | m |
    m ← MessagePlan new context: message context receiver: (message receiver add: #time) constraint: message
constraint owner: message owner keywords: message keywords arguments: message arguments uniqueState:
message uniqueState referenceOnly: message referenceOnly compileTimeOnly: message compileTimeOnly.
    self time expand: m planner: planner
``` tick: dt
    | eventsToDo |
    self incrementby: dt.
    eventsToDo ← thingEvents check: time.
    eventsToDo do: [: anEvent | anEvent happen].

constraints compileResponsesFor: tConstraints
    | responseMethod moreMessage transform respEncoder triggerNames|
    tConstraints do:
        [: tc | Transcript show: 'compiling response for: ' , tc ruleTree printString , ' '.
        respEncoder ← tc response responseMethod encoder.
        respEncoder scopeTable associationsDo: [: assoc | (encoder scopeTable includesKey: assoc key)
            ifFalse: [encoder scopeTable add: assoc. encoder nTempsIncrement]].
        *"(1 to: tc response responseMethod arguments size) do:*
            *[:i | (encoder scopeTable includesKey: 't' , i printString) ifFalse: [encoder bindTemp: 't' , i printString]].*
        *(encoder scopeTable includesKey: 'delta') ifFalse: [encoder bindTemp: 'delta'].*"
        triggerNames ← triggers collect: [:t | t first].
        responseMethod ← tc relocateResponse: encoder triggers: triggerNames.
        (triggerNames includes: tc trigger)
            ifTrue: [responseMethod block penultAdd: (self tickMessage)].
        tc isPostlude ifTrue: [responseMethod block preAdd: (tc basicMethod: encoder in: self)]
            ifFalse: [responseMethod block add: (tc basicMethod: encoder in: self)].
        responseMethod compileIn: self class]

constraints
Anima getTimeConstraints
    | tConstraints |
    tConstraints ← OrderedCollection new.
    thing getTimeConstraintsOnPath:
        (AccessPath new names: (Array with: #thing)) constraints: tConstraints.
    *tConstraints addAllLast: (thing getTimeConstraintsOnPath:*
        *(AccessPath new names: (Array with: #thing))).*
    *constraints ← tConstraints.*
    tConstraints do: [: c | c isTriggered ifTrue: [triggers add:
        (Array with: c trigger with: (c path concat: c ruleTree receiver asPath))]].
    self compileResponsesFor: tConstraints.
    ↑tConstraints getTimeConstraintsOnPath: aPath
    | tConstraints |
    tConstraints ← OrderedCollection new.
    thing getTimeConstraintsOnPath:
        ((AccessPath new names: (Array with: #thing)) concat: aPath) constraints: tConstraints.
    constraints ← tConstraints.
    tConstraints do: [: c | c isTriggered ifTrue: [triggers add:
        (Array with: c trigger with: (c path concat: c ruleTree receiver asPath))]].
    self compileResponsesFor: tConstraints.
    ↑tConstraints tickMessage
    ↑MessageNode new
        receiver: ( encoder encodeVariable: 'self')
        selector: #tick:
        arguments: (Array with: (encoder encodeLiteral: 1))
        precedence: #tick: precedence
        from: encoder initialization basicInitialize  basicInitialize
*"TheBrowser anima initialize"*
initialized isNil ifTrue: [Transcript show: '
  initializing ' , self printString , '; please be patient.
'.
self forgetConstraintMethods.
    thing ← TheBrowser prototype.
    triggers ← OrderedCollection new.
    time ← AMagnitude value: 0.
    thingEvents ← EventQueue new.
    deltaT isNil ifTrue: [ deltaT ← 1].
    encoder ← Encoder new init: self class context: nil notifying: self.
    initialized ← false]

deInitialize  deInitialize
initialized ← nil

Initialization  Anima forgetConstraintMethods  forgetConstraintMethods
   Methods ← Dictionary new.

initialize  Initialize
*"TheBrowser anima initialize"*
initialized isNil ifTrue: [Transcript show: '
  initializing ' , self printString , '; please be patient.
'.
self forgetConstraintMethods.
    thing ← TheBrowser prototype.
    triggers ← OrderedCollection new.
    time ← AMagnitude value: 0.
    thingEvents ← EventQueue new.
    deltaT isNil ifTrue: [ deltaT ← 1].
    encoder ← Encoder new init: self class context: nil notifying: self.
    self getTimeConstraints.
    initialized ← true]

showing showPicture: medium  showPicture:
   *"do nothing"*
   ↑self access constraints  constraints
   ↑constraints deltaT  deltaT
   ↑deltaT deltaT: aNumber  deltaT:
   deltaT ← aNumber encoder  encoder
   ↑encoder merges  merges
   ↑Array new receiver  receiver

"need this for Compiler evaluate: in:"
↑self recopy: dict
    ↑self thing
    ↑thing
access thingEvents
    ↑thingEvents time
    ↑time triggers
    ↑triggers recopy:

thing
Anima thingEvents time triggers

ConstraintSatisfactionPlanner variableSubclass: #AnimusSatisfactionPlanner
    instanceVariableNames: 'message '
    classVariableNames: ''
    poolDictionaries: ''
    category: 'Animus-Constraints'

―――――――――――― AnimusSatisfactionPlanner ――――――――――――

AnimusSatisfactionPlanner access message
    ↑message message: aMessage
    message ← aMessage message message:

―――――――――――― AnimusSatisfactionPlanner class ――――――――――――

AnimusSatisfactionPlanner class
    instanceVariableNames: ''

AnimusSatisfactionPlanner class

Instance creation for: anObject message: aMessage
    | planner |
    planner ← super for: anObject.
    planner message: aMessage.
    ↑planner for:message:

―――――――――――― TemporalConstraint ――――――――――――

Constraint subclass: #TemporalConstraint

TemporalConstraint instanceVariableNames: 'path response animaIndex '
classVariableNames: 'FieldDescriptions '
poolDictionaries: ''
category: 'Animus-Constraints' access animaIndex  
    ↑animaIndex animaIndex: anIndex  
    animaIndex ← anIndex path  
    ↑path path: aPath  
    path ← aPath response  
    ↑response response: aResponsePrototype  
    response ← aResponsePrototype trigger  
    ↑nil animaIndex animaIndex:

path path:

response response:

trigger compiling addMethods:context:owner:receiver:

addMethods: queue context: context owner: owner receiver: receiver  
    *"add my messages to the queue"*

| queuedDescr eventQueueingMessage |  
    (self overlaps: receiver)  
        ifFalse: [↑nil].  
    *"see if I have already been told to add messages to the queue"*  
    (self shouldNotAddTo: queue owner: owner receiver: receiver)  
        ifTrue: [↑nil].  
    methodDescriptions with: methodTrees do: [: descr : method | descr referenceOnly  
        ifFalse:  
            [*"make a message plan with the correct*  
            *context, receiver, and owner."*  
            queuedDescr ← QueuedMethodDescription new  
                context: context  
                receiver: path asPath  
                constraint: self  
                owner: owner compiling

TemporalConstraint uniqueState: descr uniqueState  
            referenceOnly: descr referenceOnly  
            compileTimeOnly: descr compileTimeOnly  
            constraintMethod: (self relocatedResponseEncoder: context encoder).  
    queue add: queuedDescr.  
    queuedDescr addMethods: queue]]

basicMethod: encoder in: anAnima                                     basicMethod:in:
    ↑encoder encodeVariable: 'nil' relocatedResponseEncoder: encoder                                    relocatedResponseEncoder:
    | sel |
    sel ← (self relocateResponseEncoder: encoder) selector.
    ↑MessageNode new
        receiver: (encoder encodeVariable: 'self')
        selector: sel
        arguments: #()
        precedence: sel precedence
        from: encoder relocateResponse: encoder triggers: triggers                         relocateResponse:triggers:
    ↑self relocateResponseEncoder: encoder relocateResponseEncoder: encoder                                     relocateResponseEncoder:
    ↑response responseMethod copy relocatePaths: path encoder: encoder testing isPostlude                                                       isPostlude
        ↑false isTemporal                                                       isTemporal
        ↑true isTriggered                                                      isTriggered
        ↑false shouldNotAddTo: queue owner: owner                                   shouldNotAddTo:owner:
        ↑(queue hasConstraint: self owner: owner)

shouldNotAddTo: queue owner: owner receiver: receiver                shouldNotAddTo:owner:receiver:
        ↑(queue hasConstraint: self owner: owner) or: [(receiver firstName = #time) not]

---------------------------- TemporalConstraint class ----------------------------

TemporalConstraint class                                             TemporalConstraint class
    instanceVariableNames: ''

Initialization owner: owner rule: ruleString                                        owner:rule:
        self owner: owner rule: ruleString test: nil error: nil methods: #('self responding') response:
    (ImmediateResponse with: (Compiler new parse: 'responding ' , ruleString in: owner class notifying: nil))

owner:rule:test:error:methods:response:
    owner: owner rule: ruleString test: testString error: errorString methods: methodString response: resp
        | timeConstraint |
        timeConstraint ← self owner: owner rule: ruleString test: testString error: errorString methods: methodString.
        timeConstraint response: resp.
        ↑timeConstraint ---------------------------- FunctionConstraint ----------------------------

TemporalConstraint subclass: #FunctionConstraint                     FunctionConstraint instanceVariableNames: 'function '
    classVariableNames: '' poolDictionaries: ''
category: 'Animus-Constraints' testing overlaps: otherPath                                                                                   overlaps:
↑otherPath names first = #time "*or: [ruleTree receiver asPath overlaps: otherPath]*"

compiling addMethods:context:owner:receiver:
addMethods: queue context: context owner: owner receiver: receiver
"*add my messages to the queue*"

```
| queuedDescr eventQueueingMessage |
(self overlaps: receiver)
    ifFalse: [↑nil].
"see if I have already been told to add messages to the queue"
(queue hasConstraint: self owner: owner)
    ifTrue: [↑nil].
methodDescriptions with: methodTrees do: [: descr : method | descr referenceOnly
    ifFalse:
        ["make a message plan with the correct
        context, receiver, and owner."
        queuedDescr ← QueuedMethodDescription new
            context: context
            receiver: receiver
            constraint: self
            owner: owner
            uniqueState: descr uniqueState
            referenceOnly: descr referenceOnly
            .compileTimeOnly: descr compileTimeOnly
            constraintMethod: (self makeEnqueuingMethodIn: context).
    queue add: queuedDescr.
    queuedDescr addMethods: queue]]
``` basicMethod: encoder in: anAnima                                                                     basicMethod:in:
↑(anAnima transform: (MessagePlan new context: anAnima receiver: (path concat: ruleTree receiver asPath)
constraint: nil owner: EmptyPath keywords: #('setTo:' ) arguments: #( 'delta' ) uniqueState: true referenceOnly:
false compileTimeOnly: false)) code: encoder makeEnqueuingMethodIn: context                                                                makeEnqueuingMethodIn:
| newEventNode incrementedTimeNode eventNode eventArrayNode selectorNode argArrayNode |
(context encoder scopeTable includesKey: 'arg1') ifTrue: [nil] ifFalse: [context encoder bindTemp: 'arg1'].
newEventNode ← MessageNode new
    receiver: (context encoder encodeLiteral: Event)
    selector: #new compiling                                                                                  FunctionConstraint

```
arguments: #()
precedence: #new precedence
from: context encoder.
incrementedTimeNode ← MessageNode new
    receiver: ((AccessPath new names: #(time value)) code: context encoder)
    selector: #+
    arguments: (Array with: (context encoder encodeVariable: 'arg1'))
    precedence: #+ precedence
    from: context encoder.
selectorNode ← MessageNode new
```

```
            receiver: (context encoder encodeLiteral: (path concat: ruleTree receiver asPath) incrementSelector)
            selector: #asSymbol
            arguments: #()
            precedence: #asSymbol precedence
            from: context encoder.
    argArrayNode ← MessageNode new
            receiver: (context encoder encodeLiteral: Array)
            selector: #with:
            arguments: (Array with: (context encoder encodeVariable: 'arg1'))
            precedence: #with: precedence
            from: context encoder.
    eventNode ← MessageNode new
            receiver: newEventNode
            selector: #atTime:receiver:selector:arguments:
            arguments: (Array with: incrementedTimeNode with: (context encoder encodeVariable: 'self')
                with: selectorNode
                with: argArrayNode)
            precedence: #atTime:receiver:selector:arguments: precedence
            from: context encoder.
    eventArrayNode ← MessageNode new
            receiver: (context encoder encodeLiteral: Array)
            selector: #with:
            arguments: (Array with: eventNode)
            precedence: #with: precedence
            from: context encoder.
    ↑MessageNode new
            receiver: (context encoder encodeVariable: 'thingEvents')
            selector: #enqueue:
            arguments: (Array with: eventArrayNode)
            precedence: #enqueue: precedence
            from: context encoder
```

---

FunctionConstraint class

FunctionConstraint class
    instanceVariableNames: ''

FunctionConstraint class

FunctionConstraint class

Initialization

```
    owner: owner to: partPathString function: functionString                    owner:to:function:
        | methodString constraint functionMethod | functionMethod ← (Compiler new parse: partPathString asPath incrementSelector , ' ignored
        | delta |
        delta ← TheBrowser prototype anima time value ' , functionString in: owner class notifying: nil).
        methodString ←'self respond'.
        constraint ← self owner: owner rule: partPathString , ' followsTimeFunction: #' , functionString
            test: nil error: nil methods: (Array with: methodString) response:
                (ImmediateResponse with: functionMethod).
        ↑constraint
```

---

TimeFunctionConstraint

FunctionConstraint subclass: #TimeFunctionConstraint              TimeFunctionConstraint instanceVariableNames: ''
    classVariableNames: ''
    poolDictionaries: ''
    category: 'Animus-Constraints'

TimeFunctionConstraint class

TimeFunctionConstraint class
    instanceVariableNames: ''

TimeFunctionConstraint class

Initialization owner: owner to: partPathString function: functionString
    | methodString constraint functionMethod | owner:to:function:

functionMethod ← (Compiler new parse: partPathString asPath incrementSelector , ' ignored
    | delta |
    delta ← TheBrowser prototype anima time value ' , functionString in: owner class notifying: nil).
    methodString ← 'self respond'.
    constraint ← self owner: owner rule: partPathString , 'value followsTimeFunction: #' , functionString
        test: nil error: nil methods: (Array with: methodString) response:
        (ImmediateResponse with: functionMethod).
    ↑constraint

ScriptConstraint

TemporalConstraint subclass: #ScriptConstraint

ScriptConstraint instanceVariableNames: 'script '
    classVariableNames: ''
    poolDictionaries: ''
    category: 'Animus-Constraints' testing overlaps: otherPath
    ↑ruleTree receiver asPath overlaps: otherPath overlaps:

printing printOn: strm
    super printOn: strm.
    script printOn: strm.
    ↑strm contents printOn:

compiling relocateResponseEncoder: encoder
    (path applyTo: TheBrowser prototype anima) setScript: (response eventArray collect: [: eventTree | eventTree
    copy relocatePaths: path encoder: encoder]).
        ↑response responseMethod copy relocatePaths: path encoder: encoder relocateResponseEncoder:

ScriptConstraint class

ScriptConstraint class
    instanceVariableNames: ''

ScriptConstraint class

Initialization owner: owner fromFile: fileName owner:fromFile:

| response methodString events constraint |

↑self owner: owner to: owner script: (Compiler evaluate: (FileStream fileNamed: fileName) contentsOfEntireFile)

owner: owner to: partPathString script: eventStringArray owner:to:script:

| response methodString constraint events | events ← (1 to: eventStringArray size) collect: [ :i | (Compiler new parse: 'method' , i printString , '
' , (eventStringArray at: i) in: owner class notifying: nil) block statements first].
methodString ← 'self respond'. *animaThingEvents enqueue: (self' , triggerSelectorString selectorWithArgs, ')".
constraint ← self owner: owner rule: 'self followsScript: #' , eventStringArray printString
test: nil error: nil methods: (Array with: methodString) response:
(Script with:

Initialization

ScriptConstraint class (Compiler new parse: 'respond
TheBrowser prototype anima thingEvents enqueueShifted: self script.
self set.script: nil'
   in: owner class notifying: nil) eventArray: events).
↑constraint ——————————— TimeDifferentialConstraint ———————————

TemporalConstraint subclass: #TimeDifferentialConstraint

TimeDifferentialConstraint instanceVariableNames: ''
classVariableNames: 'FieldDescriptions '
poolDictionaries: ''
category: 'Animus-Constraints' compiling addMethods:context:owner:receiver:

addMethods: queue context: context owner: owner receiver: receiver
   "add my messages to the queue"

| queuedDescr eventQueueingMessage |
(self overlaps: receiver)
   ifFalse: [↑nil].
"see if I have already been told to add messages to the queue"
(queue hasConstraint: self owner: owner)
   ifTrue: [↑nil].
methodDescriptions with: methodTrees do: [:descr : method | descr referenceOnly
   ifFalse:
      ["make a message plan with the correct
      context, receiver, and owner."
      queuedDescr ← QueuedMethodDescription new
         context: context
         receiver: receiver
         constraint: self
         owner: owner
         uniqueState: descr uniqueState
         referenceOnly: descr referenceOnly
         compileTimeOnly: descr compileTimeOnly
         constraintMethod: (self makeEnqueuingMethodIn: context).
      queue add: queuedDescr.
      queuedDescr addMethods: queue]]

basicMethod: encoder in: anAnima                                             basicMethod:in:
    ↑(anAnima transform: (MessagePlan new context: anAnima receiver: (path concat: ruleTree receiver asPath)
constraint: nil owner: EmptyPath keywords: #('incrementby:') arguments: #( 'delta' ) uniqueState: true
referenceOnly: false compileTimeOnly: false)) code: encoder makeEnqueuingMethodIn: context                                               makeEnqueuingMethodIn:
    | newEventNode incrementedTimeNode eventNode eventArrayNode selectorNode argArrayNode |
    (context encoder scopeTable includesKey: 'arg1') ifTrue: [nil] ifFalse: [context encoder bindTemp: 'arg1'].
    newEventNode ← MessageNode new
        receiver: (context encoder encodeLiteral: Event)
        selector: #new
        arguments: #()
        precedence: #new precedence
        from: context encoder.
    incrementedTimeNode ← MessageNode new
        receiver: ((AccessPath new names: #(time value)) code: context encoder)

compiling                                                                 TimeDifferentialConstraint selector: #+
        arguments: (Array with: (context encoder encodeVariable: 'arg1'))
        precedence: #+ precedence
        from: context encoder.
    selectorNode ← MessageNode new
        receiver: (context encoder encodeLiteral: (path concat: ruleTree receiver asPath) incrementSelector)
        selector: #asSymbol
        arguments: #()
        precedence: #asSymbol precedence
        from: context encoder.
    argArrayNode ← MessageNode new
        receiver: (context encoder encodeLiteral: Array)
        selector: #with:
        arguments: (Array with: (context encoder encodeVariable: 'arg1'))
        precedence: #with: precedence
        from: context encoder.
    eventNode ← MessageNode new
        receiver: newEventNode
        selector: #atTime:receiver:selector:arguments:
        arguments: (Array with: incrementedTimeNode with: (context encoder encodeVariable: 'self')
            with: selectorNode
            with: argArrayNode)
        precedence: #atTime:receiver:selector:arguments: precedence
        from: context encoder.
    eventArrayNode ← MessageNode new
        receiver: (context encoder encodeLiteral: Array)
        selector: #with:
        arguments: (Array with: eventNode)
        precedence: #with: precedence
        from: context encoder.
    ↑MessageNode new
        receiver: (context encoder encodeVariable: 'thingEvents')
        selector: #enqueue:
        arguments: (Array with: eventArrayNode)
        precedence: #enqueue: precedence
        from: context encoder relocateResponse: encoder triggers: triggers                                 relocateResponse:triggers:
    ↑self relocateResponseEncoder: encoder relocateResponseEncoder: encoder                                             relocateResponseEncoder:
    ↑response responseMethod copy relocatePaths: path encoder: encoder testing overlaps: otherPath                                                                                     overlaps:
  otherPath firstName = #time
    ifTrue:[↑true].
  ↑false ---------------- TimeDifferentialConstraint class ----------------

TimeDifferentialConstraint class                                   TimeDifferentialConstraint class
  instanceVariableNames: ''

Initialization owner:rule:test:error:timeDerivativeOf:equals:
owner: owner rule: ruleString test: testString error: errorString timeDerivativeOf: differentialString equals:
        equalsString | differentialMethod differentialPath differentialMethodString | differentialPath ← differentialString asPath.
differentialMethodString ← differentialPath incrementSelector , ' t1
    | delta |
    delta ← ' , equalsString , ' * t1'.
differentialMethod ← Compiler new parse: differentialMethodString in: owner class notifying: nil.

↑self owner: owner rule: ruleString test: testString error: errorString methods: #('self responding') response:
(ImmediateResponse with: differentialMethod)

owner:timeDerivativeOf:equals:
owner: owner timeDerivativeOf: differentialString equals: equalsString
↑self owner: owner rule: ( differentialString , ' derivativeWRTtime: ' , equalsString)
    test: nil error: nil timeDerivativeOf: differentialString equals: equalsString ---------------- TriggerConstraint ----------------

TemporalConstraint subclass: #TriggerConstraint                           TriggerConstraint instanceVariableNames: 'trigger postlude '
  classVariableNames: ''
  poolDictionaries: ''
  category: 'Animus-Constraints' testing isPostlude                                                                                    isPostlude
  ↑postlude isTriggered                                                                               isTriggered
  ↑true overlaps: otherPath                                                                          overlaps:
  ↑ruleTree receiver asPath overlaps: otherPath shouldNotAddTo: queue owner: owner                                 shouldNotAddTo:owner:
  ↑((queue message = trigger) not) or: [(queue hasConstraint: self owner: owner)
    or: [((path extendedSelector: ruleTree arguments first key) = queue message) not]]

shouldNotAddTo: queue owner: owner receiver: receiver         shouldNotAddTo:owner:receiver:
  ↑((queue message = trigger) not) or: [(queue hasConstraint: self owner: owner)
    or: [((path extendedSelector: ruleTree arguments first key) = queue message) not]]

compiling basicMethod: encoder in: anAnima                                                    basicMethod:in:
   ↑MessageNode new
      receiver: ((path concat: ruleTree receiver asPath) code: encoder)
      selector: response responseMethod selector
      arguments: response responseMethod arguments
      precedence: response responseMethod selector precedence
      from: encoder makeEnqueuingMethodFrom: encoder                                                    makeEnqueuingMethodFrom:
   | newCollectionNode assignNode intervalNode fractionNode multiplyNode incrementedTimeNode
   selectorNode newEventNode eventNode addNode innerBlocknode doNode eventArrayNode outerBlockNode
   innerBlockNode constraintIndexNode respondentNode initialNode addInitialNode |
      (encoder scopeTable includesKey: 't1') ifTrue: [nil] ifFalse: [encoder bindTemp: 't1'].
      (encoder scopeTable includesKey: 'eventCollection') ifTrue: [nil] ifFalse: [encoder bindTemp:
   'eventCollection'].
      (encoder scopeTable includesKey: 'i') ifTrue: [nil] ifFalse: [encoder bindTemp: 'i'].
      newCollectionNode ← MessageNode new
         receiver: (encoder encodeLiteral: OrderedCollection)
         selector: #new
         arguments: #()
         precedence: #new precedence
         from: encoder.
      assignNode ← AssignmentNode new
         variable: (encoder encodeVariable: 'eventCollection')

compiling                                                                            TriggerConstraint value: newCollectionNode
         from: encoder.
      constraintIndexNode ← MessageNode new
         receiver: (encoder encodeVariable: 'constraints')
         selector: #at:
         arguments: (Array with: (encoder encodeLiteral: animaIndex))
         precedence: #at: precedence
         from: encoder.
      respondentNode ← MessageNode new
         receiver: constraintIndexNode
         selector: #response
         arguments: #()
         precedence: #response precedence
         from: encoder.
      intervalNode ← MessageNode new
         receiver: (encoder encodeLiteral: 1)
         selector: #to:
         arguments: (Array with: (encoder encodeLiteral: 25))
         precedence: #to: precedence
         from: encoder.
      fractionNode ← MessageNode new
         receiver: (encoder encodeVariable: 'deltaT')
         selector: #/
         arguments: (Array with: (encoder encodeLiteral: 26))
         precedence: #/ precedence
         from: encoder.
      multiplyNode ← MessageNode new
         receiver: fractionNode
         selector: #*
         arguments: (Array with: (encoder encodeVariable: 'i'))
         precedence: #* precedence
         from: encoder.

```
incrementedTimeNode ← MessageNode new
    receiver: ((AccessPath new names: #(time value)) code: encoder)
    selector: #+
    arguments: (Array with: multiplyNode)
    precedence: #+ precedence
    from: encoder.
newEventNode ← MessageNode new
    receiver: (encoder encodeLiteral: Event)
    selector: #new
    arguments: #()
    precedence: #new precedence
    from: encoder.
initialNode ← MessageNode new
    receiver: newEventNode
    selector: #atTime:receiver:selector:arguments:
    arguments: (Array with: ((AccessPath new names: #(time value)) code: encoder)
        with: respondentNode
        with: (encoder encodeLiteral: #initialize:)
        with: (encoder encodeLiteral: #()))
    precedence: #atTime:receiver:selector:arguments: precedence
    from: encoder.
addInitialNode ← MessageNode new
    receiver: (encoder encodeVariable: 'eventCollection')
``` compiling                                                    TriggerConstraint

```
        selector: #add:
        arguments: (Array with: initialNode)
        precedence: #add: precedence
        from: encoder.
    eventNode ← MessageNode new
        receiver: newEventNode
        selector: #atTime:receiver:selector:arguments:
        arguments: (Array with: incrementedTimeNode with: respondentNode
            with: (encoder encodeLiteral: #step:)
            with: (encoder encodeLiteral: #()))
        precedence: #atTime:receiver:selector:arguments: precedence
        from: encoder.
    addNode ← MessageNode new
        receiver: (encoder encodeVariable: 'eventCollection')
        selector: #add:
        arguments: (Array with: eventNode )
        precedence: #add: precedence
        from: encoder.
    innerBlockNode ← BlockNode new
        arguments: (Array with: (encoder encodeVariable: 'i'))
        statements: (Array with: addNode)
        returns: false from: encoder sourceEnd: 1.
    doNode ← MessageNode new
        receiver: intervalNode
        selector: #do:
        arguments: (Array with: innerBlockNode)
        precedence: #do: precedence
        from: encoder.
    outerBlockNode ← BlockNode new
        statements: (Array with: assignNode with: addInitialNode with: doNode with: (encoder encodeVariable:
'eventCollection'))
        returns: false.
    eventArrayNode ← MessageNode new
        receiver: outerBlockNode
        selector: #value
        arguments: #()
```

```
        precedence: #value precedence
        from: encoder.
self halt. ↑MessageNode new
        receiver: (encoder encodeVariable: 'thingEvents')
        selector: #enqueue:
        arguments: (Array with: eventArrayNode)
        precedence: #enqueue: precedence
        from: encoder
``` relocateResponse: encoder triggers: triggers                                                              relocateResponse:triggers:
    | tree |
    tree ← response responseMethod copy relocatePaths: path part: ruleTree receiver asPath encoder: encoder.
    ↑tree compressTrigger: triggers encoder: encoder TriggerConstraint printing printOn: strm                                                                                             printOn:
    super printOn: strm.
    path printOn: strm.
    ↑strm contents access postlude: boolean                                                                                         postlude:
    postlude ← boolean trigger                                                                                                   trigger
    ↑trigger trigger: aSymbol                                                                                          trigger:
    trigger ← aSymbol _____ TriggerConstraint class _____

TriggerConstraint class
TriggerConstraint class
    instanceVariableNames: ''

Initialization owner:to:trigger:causes:
owner: owner to: partPathString trigger: triggerSelectorString causes: aResponseString
    | response methodString responseMethod constraint | responseMethod ← Compiler new parse: triggerSelectorString selectorWithArgs, aResponseString in: owner
        class notifying: nil.
    methodString ← 'self respond'. "anima thingEvents enqueue: (self' , triggerSelectorString selectorWithArgs,
')'".
        constraint ← self owner: owner rule: ( partPathString , ' triggersOn: #' ; triggerSelectorString)
            test: nil error: nil methods: (Array with: methodString) response: (TriggeredResponse new
            responseMethod: responseMethod).
        constraint trigger: triggerSelectorString asSymbol.
        constraint postlude: false.
        ↑constraint owner:to:trigger:causes:postlude:

owner: owner to: partPathString trigger: triggerSelectorString causes: aResponseString postlude: boolean
| c |
c ← self owner: owner to: partPathString trigger: triggerSelectorString causes: aResponseString.
c postlude: boolean.
↑c ---------------- AlgorithmConstraint ----------------

TriggerConstraint subclass: #AlgorithmConstraint          AlgorithmConstraint instanceVariableNames: ''
   classVariableNames: ''
   poolDictionaries: ''
   category: 'Animus-Constraints' compiling basicMethod: encoder in: anAnima                          basicMethod:in:
  ↑encoder encodeVariable: 'nil'

PartDescription subclass: #IndexedPartDescription
   instanceVariableNames: ''
   classVariableNames: ''
   poolDictionaries: ''
   category: 'Animus-Fields'

---------------- IndexedPartDescription ----------------

IndexedPartDescription
testing isIndexed                                                 isIndexed
  ↑true Rectangle initializePrototype
LineSegment initializePrototype
Point initializePrototype
TextThing initializePrototype Furthermore, the temporal behavior of the model is described according to a set of temporal constraints invoked in response to triggering messages. When a triggering message is sent to the model for which no procedure has been compiled for satisfying temporal constraints triggered by the message, a response procedure is compiled and executed which stores the appropriate message representations in the eventqueue such that as the time management object increments the simulation time, it transmits the appropriate messages at the appropriate time to cause the model to carry out procedures in satisfaction of its temporal constraints. Therefore the present invention not only temporizes the behavior of the model through the use of the eventqueue, it also compiles methods for satisfying the temporal constraints on the behavior of the model.

While a preferred embodiment of the present invention has been illustrated and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method for controlling behavior of model embodiment as a group of interactive objects in an object oriented computer programming system, wherein the method is executed by a computer, comprising the steps of:

storing in memory means data describing the behavior of said model according to set of constraint on said behavior of said model, at least one of said constraints describing a temporal behavior of said model;

determining actions to be performed by said interactive objects and times at which said actions are to be performed according to said set of constraints;

generating events, each event comprising a representation of a message to be sent to said model for causing said model to perform one of said actions; each event further comprising a time stamp representing a time at which the message is to be sent; and generating a visible output in response to at least one of said actions performed by said interactive objects 2. The method according to claim 1 further comprising the steps of:

storing said events in an event queue;

incrementing a variable representing time; and transmitting to said model a message representing by an event stored in said event queue when the value of time represented by said time variable rises at least to the time indicated by the time stamp.

3. A method for controlling behavior of a model embodied as interactive objects in an object oriented computer programming system, wherein the method is executed by a computer, comprising the steps of:

defining the behavior of said model in response to a triggering event by a network of constraints, including temporal constraints, on the state of said model following said triggering event;

creating and storing in a memory, representations of messages to be sent to said model;

creating and storing in said memory a separate time stamp associated with each message representation, each said message causing aids model to perform an appropriate action at a time indicated by the associated time stamp to satisfy said network of constraints;

incrementing a variable representing time;

transmitting each of said messages stored in memory to said model when time represented by said time variable rises at least to the time indicated by the time stamp associated with the message; and generating a visible output in response to at least one of said actions performed by said interactive objects.

4. A method for simulating interactive elements utilizing a model embodied within an object oriented computer programming system wherein said model exhibits temporal behavior, wherein the method is execute by a computer, comprising the steps of:

instantiating a time management object for executing procedures embodying the temporal behavior of said model, including adjusting the value of a variable representing time and maintaining an event queue for storing events, wherein an event comprises a representation of a message and wherein an event further comprises a time stamp indicating a time at which said message is to be sent, said time management object being adapted to send a message to said model when the time represented by said time variable rises at least to the time indicated by the time stamp;

instantiating a temporal constraint object comprising a description of a triggering message for the model and a description of a temporal constraint on the behavior of the model in response to said triggering message;

compiling a response procedure to be executed by said time management object for storing a response event in said event queue, said response event comprising a time stamp indicating a future time and representation of a temporal constraint satisfaction message to be sent to said model for causing said model to satisfy said temporal constraint; and generating a visible output in response to said behavior of said model.

5. The method according to claim 4 wherein said response procedure is compiled in response to said triggering message.

6. The method according to claim 4 further comprising the step of executing said response procedure whereby said time management object stores said response event in said event queue and then sends said temporal constraint satisfaction message to said model when said time represented by said time variable surpasses said future time.

7. The method according to claim 4 wherein said triggering message described by said temporal constraint object comprises a message sent to said model and wherein said temporal constraint is a relationship between objects comprising said model which said model satisfy when the time represented by said time variable is incremented by a predetermined amount.

8. The method according to claim 4 wherein said triggering message described by said temporal constraint object comprises a time incrementing message sent to said time management object for incrementing time represented by said time variable.

9. The method according to claim 4 wherein the step of generating a visible output in response to said behavior of said model comprises displaying an image on a screen of a computer terminal, the appearance of said image being controlled according to the behavior of said image being controlled according to the behavior of said model.

10. A method for simulating a collection of interactive elements utilizing a model embodied within an object oriented computer programming system, wherein said model exhibits temporal behavior, the method being executed by a computer and comprising the steps of:

instantiating a time management object for executing procedures embodying the temporal behavior of said model, including adjusting the value of a time variable representing time and maintaining an event queue for storing events, wherein an event comprises a representation of a message and a time stamp indicating a time at which said message is to be sent, said time management object sending said message to said model when the time represented by said time variable rises at least to the time indicated by said time stamp;

instantiating a temporal constraint object comprising a description of a triggering message and a description of a temporal constraint on the behavior of time model in response to said triggering message;

compiling a response procedure to be executed by said time management object for storing a response event in said event queue, said response event comprising a time stamp indicating a future time and a representation of temporal constraint satisfaction message to said model for causing said model to satisfy said temporal constraint, said response procedure being compiled in response to said triggering message;

executing said response procedure whereby said time management object stores said response event in said event queue and then sends said temporal constraint satisfaction message to said model when said time represented by said time variable rises at least to said future time; and displaying an image on a screen of a computer terminal, the appearance of said image being controlled according to the temporal behavior of said model.

11. A method for animating the operation of an algorithm utilizing a model embodiment within an object oriented computer programming system, wherein said model exhibits temporal behavior in response to messages sent thereto, the method being executed by a computer and comprising the steps of:

instantiating a time management object for executing procedures embodying the temporal behavior of said model, including adjusting the value of at time variable representing time and maintaining an event queue for storing events, wherein an event comprises a representation of a message and wherein an event further comprises a time stamp indicating a time at which said message is to be sent, said time management object sending said message to said model when the time represented by said time variable rises at least at least to the time indicated by said time stamp;

instantiating a temporal constraint object comprising a description of a triggering message indicating performance of an action performed by said algorithm and a description of a temporal constraint on the behavior of said model in response to said triggering message;

compiling a response procedure to be executed by said time management object for storing a response event in said event queue, said response event comprising a time stamp indicating a future time and a representation of a temporal constraint satisfaction message to said model for causing said model to satisfy said temporal constraint; and generating a visible output in response to said behavior of said model, said visible output representing operation of said model.

12. The method according to claim 11 wherein said response procedure is compiled in response to said triggering message.

13. The method according to claim 11 further comprising the step of executing said response procedure whereby said time management object stores said response event in said event queue and then sends said temporal constraint satisfaction message to said model when said time represented by said time variable rises at least to said future time.

14. The method according to claim 11 wherein said triggering message described by said temporal constraint object comprises a message sent to said model and wherein said temporal constraint is a relationship between objects comprising said model which said model must satisfy when the time represented by said time variable is incremented by a predetermined amount.

15. The method according to claim 11 further comprising the step of displaying an image on a screen, the appearance of said image being controlled according to the temporal behavior of said model and representing said action performed by said algorithm.

16. A method for animating the operation of an algorithm utilizing a model embodied within an object oriented computer programming system, wherein said model exhibits temporal behavior, the method being executed by a computer and comprising the steps of:

instantiating a time management object for executing procedures embodying the temporal behavior of said model, including adjusting the value of a time variable representing time and maintaining an event queue for storing events, wherein an event comprises a representation of a message and a time stamp indicating a time at which said message is to be sent, said time management object being adapted to send said message to said model when the time represented by said time variable rises at least to the time indicated by said time stamp;

instantiating a temporal constraint object comprising a description of a triggering message indicating performance of an action performed by said algorithm and a description of a temporal constraint on the behavior of said model in response to said triggering message;

compiling a response procedure to be executed by said time management object for storing a response event in said event queue, said response event comprising a time stamp indicating a future time and said response event future comprising a representation of a temporal constraint satisfaction message to said model for causing said model to satisfy said temporal constraint, said response procedure being compiled in response to said triggering message;

executing said response procedure whereby said time management object stores said response event in said queue and then sends said temporal constrain satisfaction message to said model when said time represented by said time variable rises at least to said future time; and displaying an image on a screen of a computer terminal, the appearance of said image being controlled according to the temporal behavior of said model and representing said action performed by said algorithm.

* * * * *